(12) United States Patent
Ihara et al.

(10) Patent No.: US 12,159,434 B2
(45) Date of Patent: Dec. 3, 2024

(54) IMAGE PROCESSING APPARATUS AND METHOD

(71) Applicant: SONY CORPORATION, Tokyo (JP)

(72) Inventors: Toshinori Ihara, Tokyo (JP); Takuya Kitamura, Tokyo (JP); Takefumi Nagumo, Tokyo (JP)

(73) Assignee: SONY CORPORATION, Tokyo (JP)

( * ) Notice: Subject to any disclaimer, the term of this patent is extended or adjusted under 35 U.S.C. 154(b) by 850 days.

(21) Appl. No.: 17/058,015

(22) PCT Filed: May 17, 2019

(86) PCT No.: PCT/JP2019/019641
§ 371 (c)(1),
(2) Date: Nov. 23, 2020

(87) PCT Pub. No.: WO2019/230442
PCT Pub. Date: Dec. 5, 2019

(65) Prior Publication Data
US 2021/0375003 A1    Dec. 2, 2021

(30) Foreign Application Priority Data

Jun. 1, 2018   (JP) .................................. 2018-106012

(51) Int. Cl.
*G06T 9/00*     (2006.01)
*G06T 3/40*     (2024.01)
*H04N 5/30*     (2006.01)

(52) U.S. Cl.
CPC .................. *G06T 9/00* (2013.01); *G06T 3/40* (2013.01); *H04N 5/30* (2013.01)

(58) Field of Classification Search
CPC ................ G06T 9/00; G06T 3/40; H04N 5/30
See application file for complete search history.

(56) References Cited

U.S. PATENT DOCUMENTS

| | | | | |
|---|---|---|---|---|
| 5,204,756 A | * | 4/1993 | Chevion | ................... G06T 9/00 382/209 |
| 7,177,481 B2 | * | 2/2007 | Kaji | ....................... H04N 1/407 382/265 |

(Continued)

FOREIGN PATENT DOCUMENTS

| | | |
|---|---|---|
| CN | 1674559 A | 9/2005 |
| JP | 2001-251646 A | 9/2001 |

(Continued)

OTHER PUBLICATIONS

International Search Report and Written Opinion of PCT Application No. PCT/JP2019/019641, issued on Jul. 16, 2019, 09 pages of ISRWO.

(Continued)

*Primary Examiner* — Qun Shen
(74) *Attorney, Agent, or Firm* — CHIP LAW GROUP

(57) ABSTRACT

The present disclosure relates to an image processing apparatus and an image processing method capable of reducing an increase in a load imposed by processing of multispectral image data. Multispectral image data including components in four or more wavelength bands is simple-coded at a fixed compression rate. Alternatively, coded data generated by simple coding at a fixed compression rate for multispectral image data including components in four or more wavelength bands is simple-decoded. For example, the present disclosure is applicable to an image processing apparatus, an image coding apparatus, an image decoding apparatus, an imaging element, an imaging apparatus, or the like.

10 Claims, 35 Drawing Sheets

| METHOD | CONTENTS | EFFECTS |
|---|---|---|
| #1 | CODE AND DECODE MULTISPECTRAL IMAGE | REDUCTION OF DATA VOLUME INCREASE AND LOAD |
| #2 | ARRANGE COLOR FILTERS CORRESPONDING TO PREDICTION SYSTEM | REDUCTION OF DATA VOLUME INCREASE, LOAD, AND CODING EFFICIENCY DECREASE |
| #3 | PREDICTION SYSTEM CORRESPONDING TO COLOR FILTER ARRANGEMENT | REDUCTION OF DATA VOLUME INCREASE, LOAD, AND CODING EFFICIENCY DECREASE |
| #4 | APPLY PLURAL PREDICTION SYSTEMS | REDUCTION OF DATA VOLUME INCREASE, LOAD, AND CODING EFFICIENCY DECREASE |

(56) References Cited

U.S. PATENT DOCUMENTS

| | | | | |
|---|---|---|---|---|
| 9,756,263 | B2* | 9/2017 | Kester | G01J 5/0014 |
| 10,055,648 | B1* | 8/2018 | Grigsby | G06F 18/24 |
| 2002/0039143 | A1* | 4/2002 | Sasaki | H04N 25/00 |
| | | | | 348/E5.081 |
| 2007/0047646 | A1* | 3/2007 | Koh | H04N 19/149 |
| | | | | 375/E7.157 |
| 2011/0292247 | A1 | 12/2011 | Gharavi-Alkhansari et al. | |
| 2011/0317232 | A1* | 12/2011 | Aoyagi | H04N 19/85 |
| | | | | 358/518 |
| 2012/0219231 | A1 | 8/2012 | Gharavi-Alkhansari et al. | |
| 2013/0188065 | A1* | 7/2013 | Wegener | H04N 23/661 |
| | | | | 348/207.99 |
| 2014/0028800 | A1* | 1/2014 | Tin | G01B 11/2509 |
| | | | | 348/46 |
| 2015/0110381 | A1* | 4/2015 | Parvin | G06V 20/698 |
| | | | | 382/133 |
| 2015/0281539 | A1 | 10/2015 | Ueki et al. | |
| 2017/0230674 | A1 | 8/2017 | Ino | |
| 2019/0045189 | A1 | 2/2019 | Ihara et al. | |

FOREIGN PATENT DOCUMENTS

| | | | |
|---|---|---|---|
| JP | 2005-286415 | A | 10/2005 |
| JP | 2008-136251 | A | 6/2008 |
| JP | 2014-103543 | A | 6/2014 |
| JP | 2017-143355 | A | 8/2017 |
| JP | 2017-201317 | A | 11/2017 |
| WO | 2017/154608 | A1 | 9/2017 |

OTHER PUBLICATIONS

Takebe, et al., "Information compression of multi-spectral images", Journal of Signal Processing, ISSN 1342-6230, vol. 06, No. 06, Nov. 2002, pp. 337-346.

Zhang, et al., "An Efficient Reordering Prediction-Based Loss less Compression Algorithm for Hyperspectral Images", IEEE Geoscience and Remote Sensing Letters, vol. 4, No. 2, Apr. 2007, pp. 283-287.

* cited by examiner

FIG. 1

| METHOD | CONTENTS | EFFECTS |
|---|---|---|
| #1 | CODE AND DECODE MULTISPECTRAL IMAGE | REDUCTION OF DATA VOLUME INCREASE AND LOAD |
| #2 | ARRANGE COLOR FILTERS CORRESPONDING TO PREDICTION SYSTEM | REDUCTION OF DATA VOLUME INCREASE, LOAD, AND CODING EFFICIENCY DECREASE |
| #3 | PREDICTION SYSTEM CORRESPONDING TO COLOR FILTER ARRANGEMENT | REDUCTION OF DATA VOLUME INCREASE, LOAD, AND CODING EFFICIENCY DECREASE |
| #4 | APPLY PLURAL PREDICTION SYSTEMS | REDUCTION OF DATA VOLUME INCREASE, LOAD, AND CODING EFFICIENCY DECREASE |

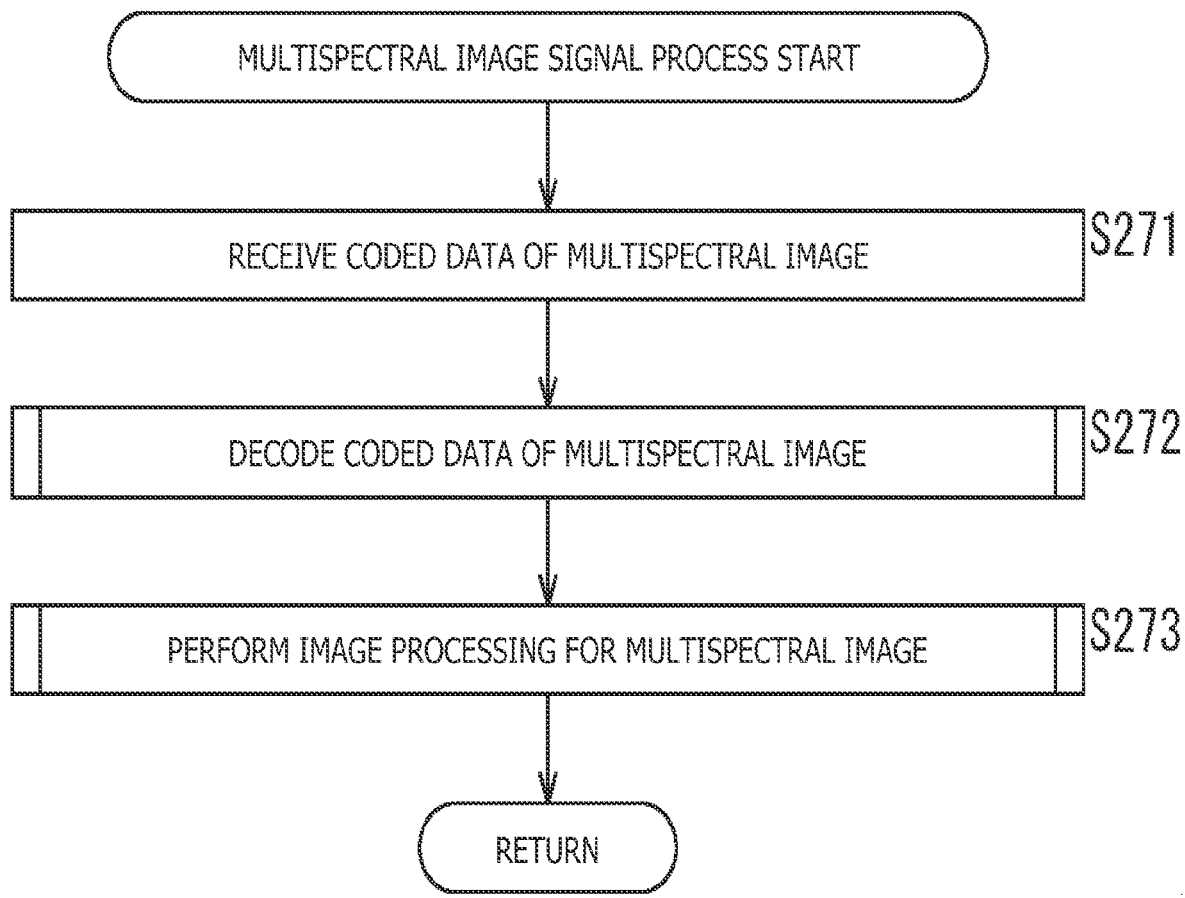

ALL REFERENCES IN SAME WAVELENGTH BAND

FIG. 24B

HORIZONTAL REFERENCE: WAVELENGTH BAND TWO BANDS AWAY
VERTICAL REFERENCE: WAVELENGTH BAND EIGHT BANDS AWAY
OBLIQUE REFERENCE: WAVELENGTH BAND SIX OR TEN BANDS AWAY

|   |   |   |   |   |   |   |   |
|---|---|---|---|---|---|---|---|
| 0 | 4 | 1 | 5 | 0 | 4 | 1 | 5 |
| 8 | 12| 9 | 13| 8 | 12| 9 | 13|
| 2 | 6 | 3 | 7 | 2 | 6 | 3 | 7 |
| 10| 14| 11| 15| 10| 14| 11| 15|
| 0 | 4 | 1 | 5 | 0 | 4 | 1 | 5 |
| 8 | 12| 9 | 13| 8 | 12| 9 | 13|
| 2 | 6 | 3 | 7 | 2 | 6 | 3 | 7 |
| 10| 14| 11| 15| 10| 14| 11| 15|

304

HORIZONTAL REFERENCE: NEXT WAVELENGTH BAND
VERTICAL REFERENCE: WAVELENGTH BAND TWO BANDS AWAY
OBLIQUE REFERENCE: NEXT WAVELENGTH BAND OR WAVELENGTH BAND THREE BANDS AWAY

HORIZONTAL REFERENCE: WAVELENGTH BAND TWO BANDS AWAY
VERTICAL REFERENCE: WAVELENGTH BAND EIGHT BANDS AWAY
OBLIQUE REFERENCE: WAVELENGTH BAND SIX OR TEN BANDS AWAY
<PIXELS AT POSITIONS CORRESPONDING TO R AND B>

HORIZONTAL REFERENCE: WAVELENGTH BAND TWO BANDS AWAY
VERTICAL REFERENCE: WAVELENGTH BAND EIGHT BANDS AWAY
OBLIQUE REFERENCE: WAVELENGTH BAND RANGING FROM NEXT BAND TO ELEVEN BANDS AWAY
<PIXELS AT POSITIONS CORRESPONDING TO G>

FIG. 27

| 0 | 6 | 0 | 7 | 0 | 6 | 0 | 7 |
|---|---|---|---|---|---|---|---|
| 4 | 12 | 4 | 13 | 4 | 12 | 4 | 13 |
| 2 | 8 | 2 | 9 | 2 | 8 | 2 | 9 |
| 10 | 14 | 10 | 15 | 10 | 14 | 10 | 15 |
| 0 | 6 | 0 | 7 | 0 | 6 | 0 | 7 |
| 4 | 12 | 4 | 13 | 4 | 12 | 4 | 13 |
| 2 | 8 | 2 | 9 | 2 | 8 | 2 | 9 |
| 10 | 14 | 10 | 15 | 10 | 14 | 10 | 15 |

305

HORIZONTAL REFERENCE: NEXT WAVELENGTH BAND
VERTICAL REFERENCE: WAVELENGTH BAND TWO BANDS AWAY
OBLIQUE REFERENCE: NEXT WAVELENGTH BAND OR WAVELENGTH BAND THREE BANDS AWAY
<PIXELS AT POSITIONS CORRESPONDING TO R AND B>

HORIZONTAL REFERENCE: NEXT WAVELENGTH BAND
OBLIQUE REFERENCE: WAVELENGTH BAND RANGING FROM NEXT BAND TO FIVE BANDS AWAY
<PIXELS AT POSITIONS CORRESPONDING TO G>

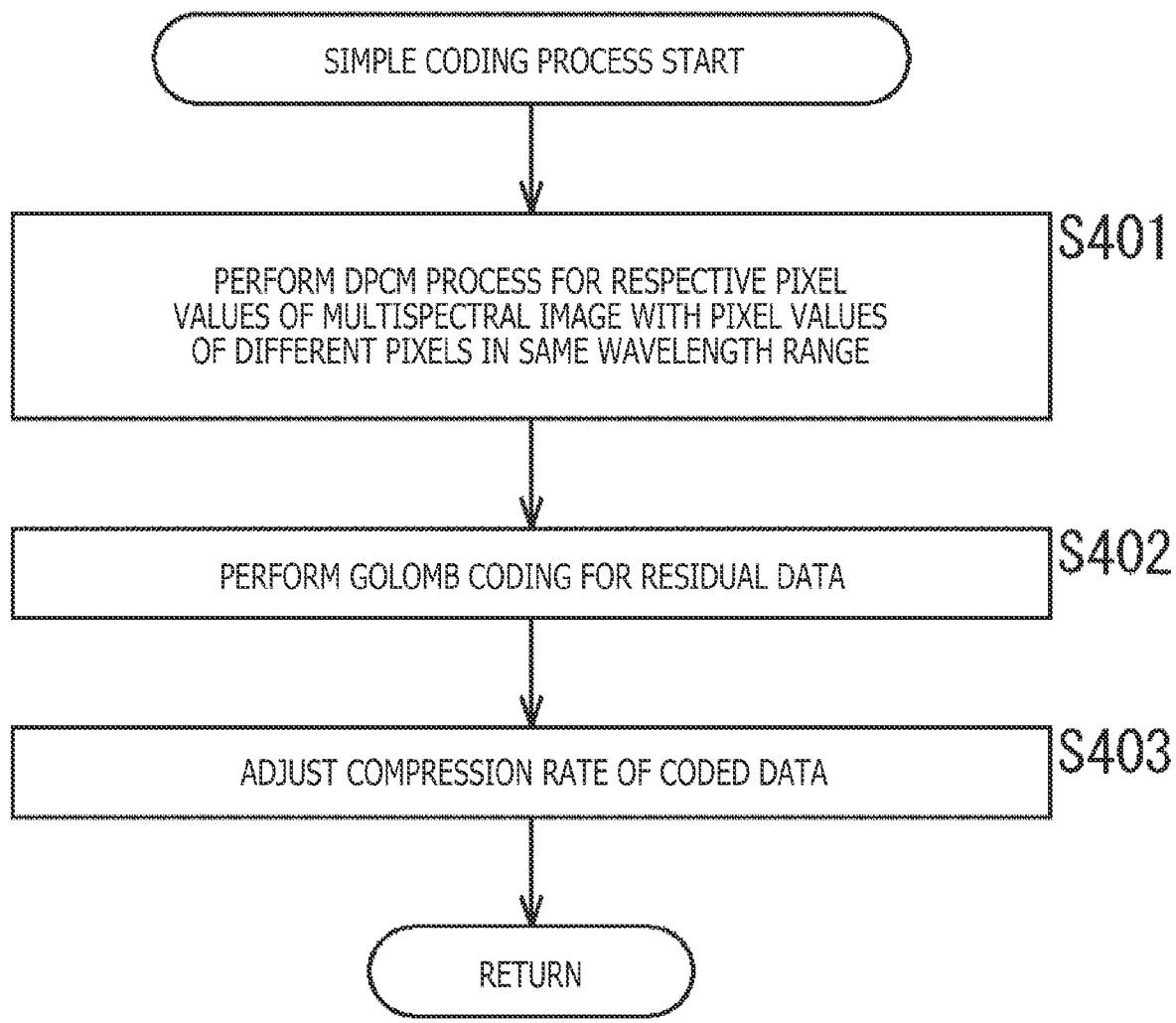

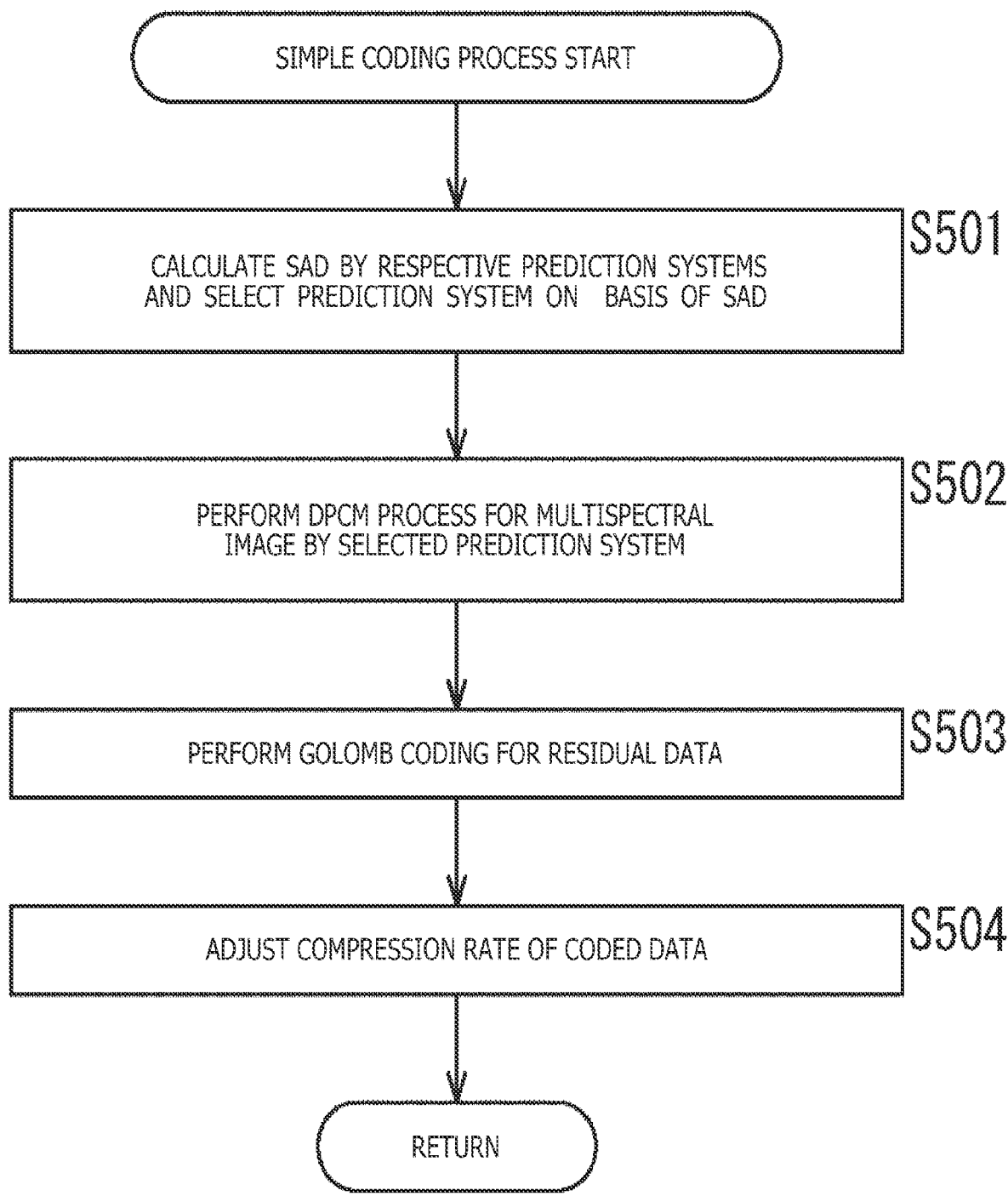

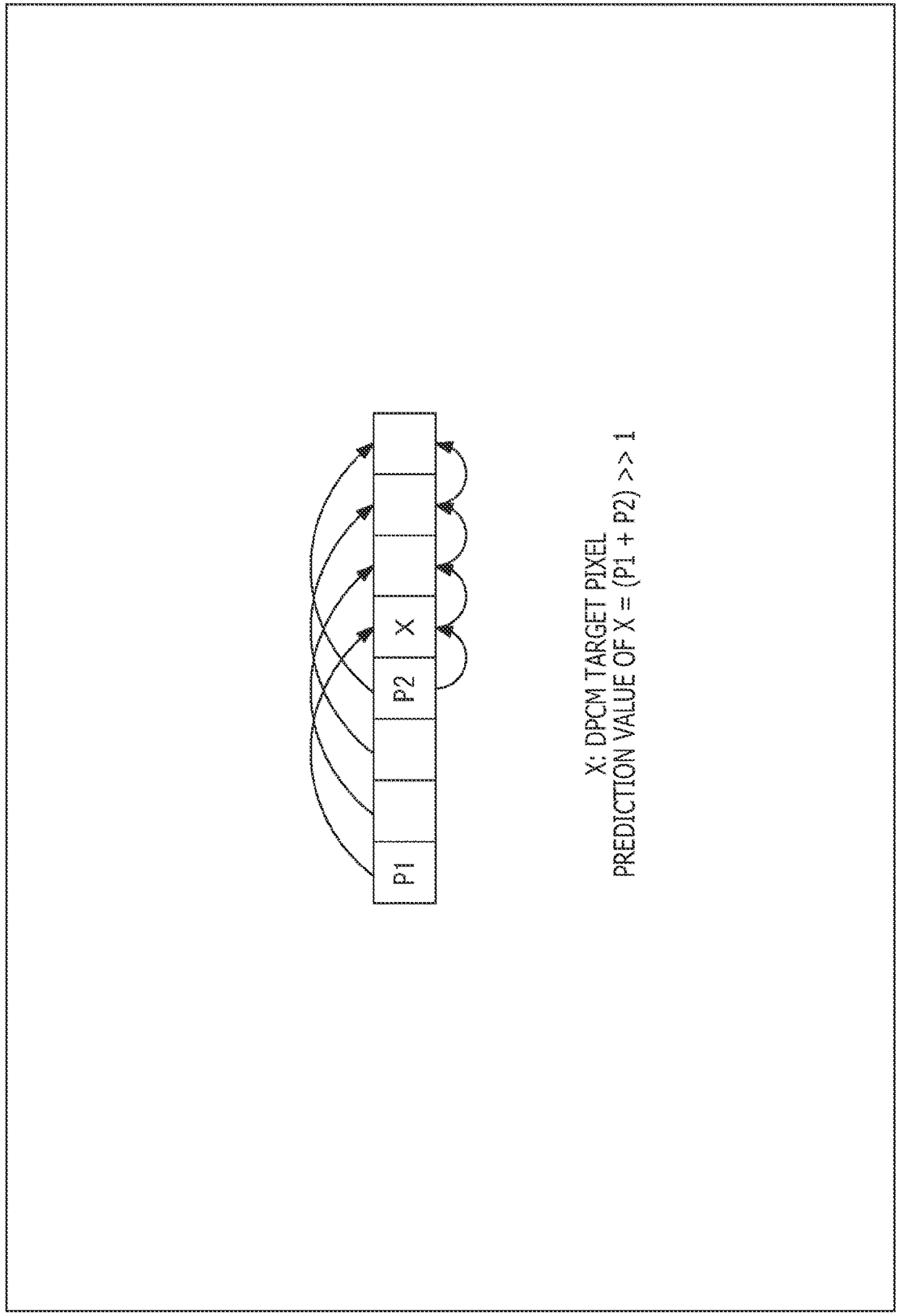

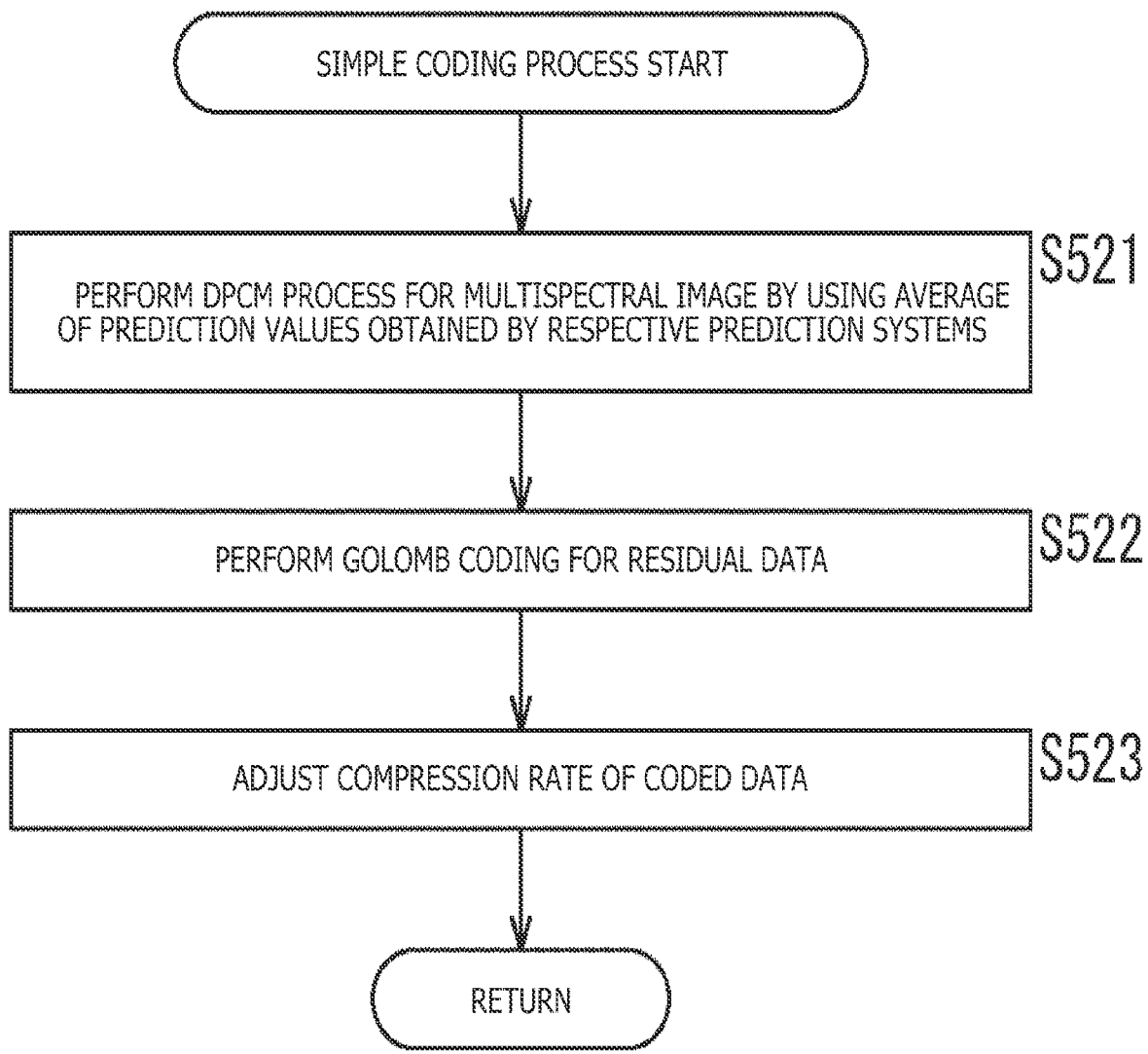

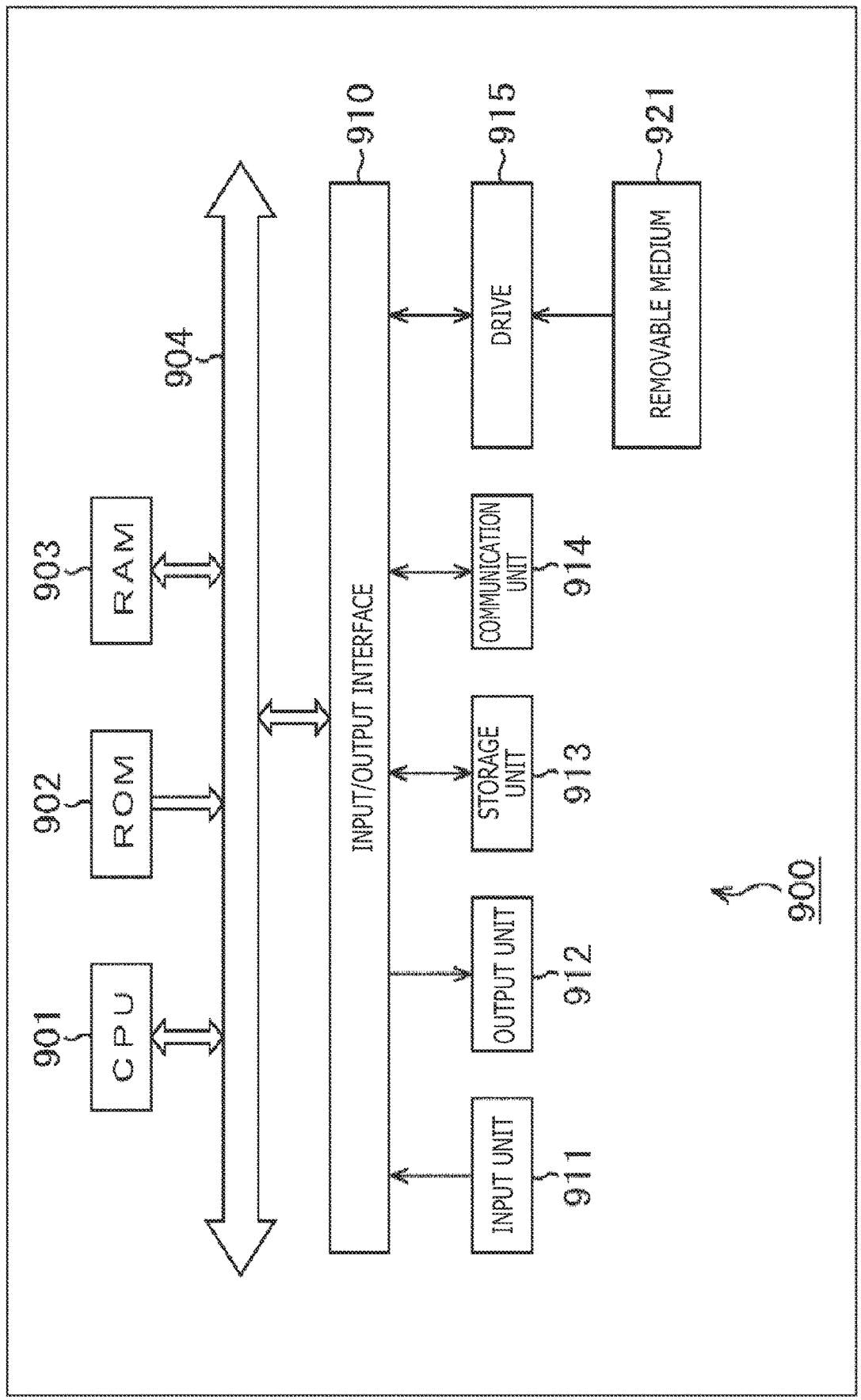

IMAGE PROCESSING APPARATUS AND METHOD

CROSS REFERENCE TO RELATED APPLICATIONS

This application is a U.S. National Phase of International Patent Application No. PCT/JP2019/019641 filed on May 17, 2019, which claims priority benefit of Japanese Patent Application No. JP 2018-106012 filed in the Japan Patent Office on Jun. 1, 2018. Each of the above-referenced applications is hereby incorporated herein by reference in its entirety.

TECHNICAL FIELD

The present disclosure relates to an image processing apparatus and an image processing method and particularly to an image processing apparatus and an image processing method capable of reducing an increase in a load produced by processing of multispectral image data.

BACKGROUND ART

Conventionally, there has been such an imaging element capable of imaging an object and acquiring a multispectral image including components in four or more wavelength bands (e.g., see PTL 1 and PTL 2).

Similarly to an ordinary imaging element, realization of a higher resolution and a higher frame rate has also been promoted for the imaging element of the type acquiring a multispectral image. It has therefore been demanded for the imaging element of this type to process a larger volume of data at a higher speed (increase a data processing volume per unit time).

CITATION LIST

Patent Literature

[PTL 1]
  JP 2008-136251A
[PTL 2]
  JP 2017-201317A

SUMMARY

Technical Problems

However, when a load (e.g., processing volume per unit time) produced by processing data of a multispectral image (also referred to as multispectral image data) increases, a bandwidth or a usage rate of a communication interface or a memory interface necessary for the processing may increase. For example, for avoiding a bottleneck produced by these interfaces, a bandwidth and a transfer speed which are available need to increase. This necessity may raise costs.

The present disclosure has been developed in consideration of the abovementioned circumstances and achieves reduction of an increase in a load produced by processing of multispectral image data.

Solution to Problems

An image processing apparatus according to one aspect of the present technology is directed to an image processing apparatus including a coding unit that performs simple coding at a fixed compression rate for multispectral image data including components in four or more wavelength bands.

An image processing method according to one aspect of the present technology is directed to an image processing method including simple coding at a fixed compression rate for multispectral image data including components in four or more wavelength bands.

An image processing apparatus according to a different aspect of the present technology is directed to an image processing apparatus including a decoding unit that performs simple decoding for coded data generated by simple coding at a fixed compression rate for multispectral image data including components in four or more wavelength bands.

An image processing method according to a different aspect of the present technology is directed to an image processing method including simple decoding for coded data generated by simple coding at a fixed compression rate for multispectral image data including components in four or more wavelength bands.

According to the image processing apparatus and the image processing method of the one aspect of the present technology, multispectral image data including components in four or more wavelength bands is simple-coded at a fixed compression rate.

According to the image processing apparatus and the image processing method of the different aspect of the present technology, coded data generated by simple coding at a fixed compression rate for multispectral image data including components in four or more wavelength bands is simple-decoded.

Advantageous Effects of Invention

According to the present disclosure, image processing is achievable. Particularly achievable is reduction of an increase in a load produced by processing of multispectral image data.

BRIEF DESCRIPTION OF DRAWINGS

FIG. 1 is a diagram depicting a list of processing methods to which the present technology is applied.

FIG. 20 is a flowchart explaining an example of a flow of a multispectral image signal process.

FIGS. 24A and 24B depict diagrams illustrating an example of coding of a multispectral image.

FIG. 25 is a diagram depicting an example of coding of a multispectral image.

FIGS. 26A, 26B, and 26C depict diagrams illustrating an example of coding of a multispectral image.

FIG. 27 is a diagram depicting an example of coding of a multispectral image.

FIG. 31 is a flowchart explaining an example of a flow of a simple coding process.

FIG. 33 is a flowchart explaining an example of a flow of a simple coding process.

FIG. 34 is a diagram depicting an example of coding of a multispectral image.

FIG. 35 is a flowchart explaining an example of a flow of a simple coding process.

FIG. 39 is a block diagram depicting an example of a main configuration of a computer.

DESCRIPTION OF EMBODIMENTS

Figure 2:
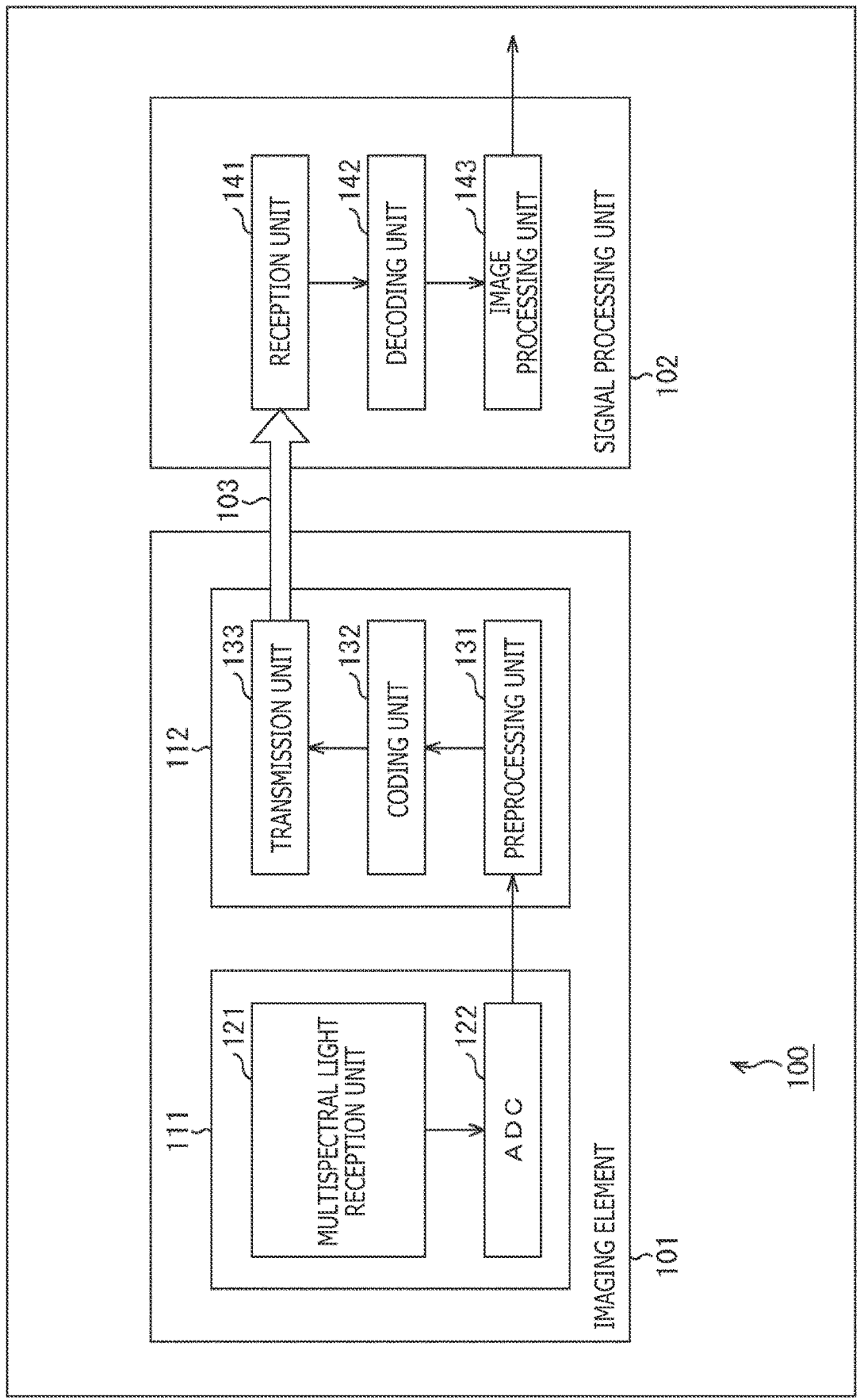
FIG. 2 is a block diagram depicting an example of a main configuration of an imaging apparatus achieving a method #1.

Modes for carrying out the present disclosure (hereinafter referred to as embodiments) will hereinafter be described. Note that the description will be presented in the following order.

1. Coding and decoding technology
2. Concept (outline of respective methods)
3. First embodiment (details of method #1)
4. Second embodiment (details of method #2)
5. Third embodiment (details of method #3)
6. Fourth embodiment (details of method #4)
7. Supplementary notes 1. Coding and Decoding Technology <References, Etc. Supporting Technical Contents and Technical Terms>

A range disclosed by the present technology contains not only contents described in the embodiments but also contents described in the following pieces of literature known at the time of filing of the present application.

PTL 1: (described above)
PTL 2: (described above)
PTL 3: JP 2010-103543A
PTL 4: US 2011/0292247
PTL 5: US 2012/0219231

Accordingly, contents described in the above pieces of literature are also considered as grounds for determining supporting requirements.

<Multispectral Image>

Conventionally, as described in PTL 1 and PTL 2, for example, there has been such an imaging element capable of imaging an object and acquiring a multispectral image including components in four or more wavelength bands.

Similarly to an ordinary imaging element, realization of a high resolution and a high frame rate has also been promoted for the imaging element of the type acquiring a multispectral image. It has therefore been demanded for the imaging element of this type to process a larger volume of data at a higher speed (increase a data processing volume per unit time).

<Cost Increase in Association with Load Increase>

However, when a load produced by processing of multispectral image data (e.g., processing volume per unit time) increases, a load imposed on a communication interface or a memory interface (such as a bandwidth and a transfer speed of a bus required for transfer or reading and writing of multispectral image data) may increase. For example, for avoiding a bottleneck produced by these interfaces, a bandwidth and a transfer speed which are available by (buses of) these interfaces need to increase. This necessity may raise costs.

2. Concept

<Coding of Multispectral Image>

Accordingly, multispectral image data including components in four or more wavelength bands is coded by simple coding at a fixed compression rate (method #1 in table of FIG. 1). For example, an image processing apparatus includes a coding unit which performs simple coding at a fixed compression rate for multispectral image data including components in four or more wavelength bands. Note that simple coding is a type of coding (compression) method. Details of this method will be described below.

This configuration can reduce a data volume of multispectral image data and can therefore reduce an increase in a load produced by processing of a multispectral image. For example, this configuration can reduce a load imposed on a communication interface used during transmission or reception of multispectral image data or a memory interface used during writing of multispectral image data to a memory or reading of multispectral image data stored in a memory (or buses of these interfaces). In other words, this configuration can reduce an increase in a bandwidth and a transfer speed of (the buses of) these interfaces required during transfer of multispectral image data or reading and writing from and to a memory. Accordingly, reduction of a cost increase is achievable.

Note that coded data generated by performing simple coding for multispectral image data as described above may be transmitted. For example, the image processing apparatus may further include a transmission unit which transmits coded data generated by performing simple coding for multispectral image data by the coding unit. This configuration can reduce an increase in a load imposed on a communication interface used during transmission of multispectral image data to the outside.

In addition, coded data generated by performing simple coding for multispectral image data may be stored in a storage unit. For example, the image processing apparatus may further include a storage unit which stores coded data generated by performing simple coding for multispectral image data by the coding unit. This configuration can reduce an increase in a load imposed on a memory interface used during storage of multispectral image data in the storage unit.

Further, an object may be imaged to generate multispectral image data, and simple coding may be performed for the generated multispectral image data. For example, the image processing apparatus may further include an imaging unit which images an object and generates multispectral image data. In this case, the coding unit may perform simple coding for the multispectral image data generated by the imaging unit. This configuration can reduce an increase in a load produced by processing of a multispectral image which is a captured image.

<Decoding of Multispectral Image>

Further, coded data generated by performing simple coding of multispectral image data including components in four or more wavelength bands at a fixed compression rate is decoded by simple decoding (method #1 in table of FIG. 1). For example, the image processing apparatus includes a decoding unit which performs simple decoding for coded data obtained by simple coding of multispectral image data including components in four or more wavelength bands at a fixed compression rate. Note that simple decoding is a type of decoding (decompression) method. Details of this method will be described below.

This configuration can decode coded data of multispectral image data to acquire multispectral image data. In other words, this configuration allows use of coded data of multispectral image data. Accordingly, this configuration can reduce an increase in a load imposed on a communication interface used during transmission or reception of multispectral image data or a memory interface used during writing of multispectral image data to a memory or reading multispectral image data stored in a memory (or buses of these interfaces) (i.e., an increase in a bandwidth and a transfer speed necessary for processing), and can therefore reduce a cost increase.

Note that coded data may be received and that the received coded data may be decoded by simple decoding. For example, the image processing apparatus may further include a reception unit which receives coded data, and the decoding unit may decode the coded data received by the reception unit by simple decoding. This configuration can reduce an increase in a load imposed on the communication interface used during reception of multispectral image data from the outside.

Moreover, coded data of multispectral image data read from a storage unit may be decoded by simple decoding. For example, the image processing apparatus may further include a storage unit which stores coded data of multispectral image data. In this case, the decoding unit may perform simple decoding for the coded data of the multispectral image data read from the storage unit. This configuration can reduce an increase in a load imposed on the memory interface used during reading of multispectral image data from the storage unit.

In addition, an object may be imaged to generate multispectral image data, the generated multispectral image data may be coded by simple coding to generate coded data, and the coded data thus generated may be decoded by simple decoding. For example, the image processing apparatus may further include an imaging unit which images an object and generates multispectral image data and a coding unit which performs simple coding at a fixed compression rate for the multispectral image data generated by the imaging unit and generates coded data. In this case, the decoding unit may perform simple decoding for the coded data generated by the coding unit. This configuration can code and decode the multispectral image as a captured image at desired processing stages and can therefore reduce an increase in a load produced by processing of the multispectral image data.

<Color Filter Arrangement Corresponding to Prediction System>

Further, a decrease in coding efficiency can be reduced by performing coding and decoding of multispectral image data with use of a system which calculates a difference between pieces of pixel data (predicts pixel data) and by arranging color filters of the imaging unit in correspondence with the prediction system (method #2 in table of FIG. 1).

For example, the imaging unit may include a pixel array which includes plural pixel patterns each including five or more pixels arranged under a predetermined rule and performing photoelectric conversion of light in wavelength bands different from each other. In this case, the coding unit may perform simple coding for multispectral image data generated by the imaging unit, by using a system which codes different image data generated by a different imaging unit including a different pixel array where plural different pixel patterns different from the pixel patterns of the imaging unit in pixel arrangement and number of constituent pixels are arranged, with use of a difference in pixel data between a pair of pixels belonging to the above different pixel patterns different from each other and included in the same wavelength band.

As described above, the prediction system used for coding of multispectral image data may correspond to different pixel patterns different from the pixel patterns of the imaging unit. In this manner, multispectral image data can be coded using an existing coding unit without the necessity of designing a coding unit in line with pixel patterns of the imaging unit. Accordingly, an increase in such costs as development and manufacturing costs can be reduced. In addition, for example, multispectral image data generated by respective imaging units having pixel patterns different from each other can be coded by a common coding unit. Accordingly, a cost increase produced in a case of use of plural types of imaging unit can be reduced.

However, when the degree of correspondence between the prediction system and the pixel patterns of the imaging unit decreases, coding efficiency of multispectral image data may decrease. Accordingly, the imaging unit may be designed such that the pixel patterns match a prediction system of an existing coding unit (in a manner achieving more approximation in a feasible range). For example, the imaging unit may have a pixel pattern which includes 16 pixels photoelectrically converting light included in wavelength bands different from each other and arranged such that pixels photoelectrically converting light in adjacent wavelength bands are arranged two pixels away from each other. In this case, the coding unit may perform simple coding for multispectral image data generated by the imaging unit, with use of a difference in pixel data between a pair of pixels arranged two pixels away from each other. In this manner, a decrease in coding efficiency can be reduced.

Moreover, for example, the imaging unit may include a pixel array which includes plural pixel patterns each including five or more pixels arranged under a predetermined rule and performing photoelectric conversion of light in wavelength bands different from each other. In this case, the coding unit may perform simple coding for multispectral image data generated by the imaging unit, by using a system which codes different image data generated by a different imaging unit including a different pixel array where plural different pixel patterns different from the pixel patterns of the imaging unit in pixel arrangement and number of constituent pixels are arranged, with use of a difference in pixel data between a pair of pixels belonging to the above different pixel patterns different from each other and included in the same wavelength band. In addition, the decoding unit may perform simple decoding for coded data generated by the coding unit, by using a system which decodes coded data of the above different image data with use of a difference in pixel data between a pair of pixels belonging to the above different pixel patterns different from each other and included in the same wavelength band.

As described above, the prediction system used for decoding of multispectral image data may correspond to different pixel patterns different from the pixel patterns of the imaging unit. In this manner, multispectral image data can be coded using an existing decoding unit without the necessity of designing a decoding unit in line with pixel patterns of the imaging unit. Accordingly, an increase in such costs as development and manufacturing costs can be reduced. In addition, for example, coded data of multispectral image data generated by respective imaging units having pixel patterns different for each imaging unit can be decoded by a common decoding unit. Accordingly, a cost increase produced in a case of use of plural types of imaging unit can be reduced.

However, when the degree of correspondence between the prediction system and the pixel patterns of the imaging unit decreases, coding efficiency of multispectral image data may decrease. Accordingly, the imaging unit may be designed such that the pixel patterns match a prediction system of an existing decoding unit (in a manner achieving more approximation in a feasible range). For example, the imaging unit may have a pixel pattern which includes 16 pixels photoelectrically converting light included in wavelength bands different from each other and arranged such that pixels photoelectrically converting light in adjacent wavelength bands are arranged two pixels away from each other. In this case, the coding unit may perform simple coding for multispectral image data generated by the imaging unit, with use of a difference in pixel data between a pair of pixels arranged two pixels away from each other. In addition, the decoding unit may perform simple decoding for the coded data generated by the coding unit, with use of a difference in pixel data between a pair of pixels arranged two pixels away from each other. In such a manner, a decrease in coding efficiency can be reduced.

<Prediction System Corresponding to Color Filter Arrangement>

Further, a decrease in coding efficiency can be reduced by performing coding and decoding of multispectral image data with use of a system which calculates a difference between pieces of pixel data (predicts pixel data) by a method corresponding to the arrangement of the color filters of the imaging unit (method #3 in table of FIG. 1).

For example, the imaging unit may include a pixel array which includes plural pixel patterns each including five or more pixels arranged under a predetermined rule and performing photoelectric conversion of light in wavelength bands different from each other. In this case, the coding unit may perform simple coding for multispectral image data generated by the imaging unit, with use of a difference in pixel data between a pair of pixels belonging to pixel patterns different from each other and included in the same wavelength band. In such a manner, a decrease in coding efficiency can be reduced.

In addition, for example, the imaging unit may include a pixel array which includes plural pixel patterns each including five or more pixels arranged under a predetermined rule and performing photoelectric conversion of light in wavelength bands different from each other. In this case, the coding unit may perform simple coding for multispectral image data generated by the imaging unit, with use of a difference in pixel data between a pair of pixels belonging to pixel patterns different from each other and included in the same wavelength band. In addition, the decoding unit may perform simple decoding for the coded data generated by the coding unit, with use of a difference in pixel data between a pair of pixels belonging to pixel patterns different from each other and included in the same wavelength band. In such a manner, a decrease in coding efficiency can be reduced.

<Application of Plural Prediction Systems>

Further, a decrease in coding efficiency can be reduced by applying plural types of system which calculates a difference between pieces of pixel data (performs prediction of pixel data) for performing coding and decoding of multispectral image data (method #4 in table of FIG. 1).

For example, the imaging unit may include a pixel array which includes plural pixel patterns each including five or more pixels arranged under a predetermined rule and performing photoelectric conversion of light in wavelength bands different from each other. In this case, the coding unit may perform simple coding for multispectral image data generated by the imaging unit, with use of differences in pixel data between plural pairs of pixels located at relative positions different from each other. In this manner, prediction accuracy can be increased, and a decrease in coding efficiency can be reduced.

For example, the coding unit may perform simple coding for multispectral image data generated by the imaging unit, with use of a difference in pixel data between a pair of pixels belonging to pixel patterns different from each other and included in the same wavelength bands and a difference in pixel data between a pair of pixels adjacent to each other. In this manner, prediction accuracy can be increased, and a decrease in coding efficiency can be reduced.

In addition, for example, the imaging unit may include a pixel array which includes plural pixel patterns each including five or more pixels arranged under a predetermined rule and performing photoelectric conversion of light in wavelength bands different from each other. In this case, the coding unit may perform simple coding for multispectral image data generated by the imaging unit, with use of differences in pixel data between plural pairs of pixels located at relative positions different from each other. In addition, the decoding unit may perform simple decoding for the coded data generated by the coding unit, with use of differences in pixel data between plural pairs of pixels located at relative positions different from each other. In this manner, prediction accuracy can be increased, and a decrease in coding efficiency can be reduced.

For example, the coding unit may perform simple coding for multispectral image data generated by the imaging unit, with use of a difference in pixel data between a pair of pixels belonging to pixel patterns different from each other and included in the same wavelength band and a difference in pixel data between a pair of pixels adjacent to each other, and the decoding unit may perform simple decoding for the coded data generated by the coding unit, with use of a difference in pixel data between a pair of pixels belonging to pixel patterns different from each other and included in the same wavelength band, and a difference in pixel data between a pair of pixels adjacent to each other. In this manner, prediction accuracy can be increased, and a decrease in coding efficiency can be reduced.

3. First Embodiment

<Imaging Apparatus>

Next, the respective methods of FIG. 1 will be described more specifically. The method #1 will be explained in the present embodiment. FIG. 2 is a block diagram depicting an example of a configuration of an imaging apparatus in one aspect of an image processing apparatus to which the present technology is applied. An imaging apparatus 100 depicted in FIG. 2 is an apparatus which images an object, generates data indicating a multispectral image (multispectral image data) including components in four or more wavelength bands as a captured image, and outputs the multispectral image data.

The imaging apparatus 100 includes an imaging element 101 which images an object and a signal processing unit 102 which performs signal processing for the captured image data generated by the imaging element 101. The imaging element 101 includes a semiconductor substrate 111 and a semiconductor substrate 112 which are sealed and integrated into a module (also referred to as an LSI (Large Scale Integration) chip).

The semiconductor substrate 111 and the semiconductor substrate 112 thus formed may be overlapped on each other to constitute a multilayer structure (laminated structure). In such a case, a circuit formed on the semiconductor substrate 111 and a circuit formed on the semiconductor substrate 112 are connected to each other by a via (VIA) or the like. According to such a structure, a larger-scale circuit is mountable without increasing the size of the imaging element 101. In other words, a larger-scale circuit is mountable while a cost increase is reduced.

The semiconductor substrate 111 includes a multispectral light reception unit 121 and an ADC (Analog Digital Converter) 122. In addition, the semiconductor substrate 112 includes a preprocessing unit 131, a coding unit 132, and a transmission unit 133.

The multispectral light reception unit 121 images an object, generates a multispectral image including components in four or more wavelength bands as a captured image, and outputs data indicating the multispectral image (multispectral image data).

The multispectral light reception unit 121 includes plural unit pixels each including a photoelectric conversion element such as a photodiode, for example. Each of the unit pixels is configured to receive light in a predetermined frequency band by using a filter or the like. The multispectral light reception unit 121 receives light in four or more wavelength bands. A charge corresponding to incident light is accumulated in each of the unit pixels by photoelectric conversion. The multispectral light reception unit 121 photoelectrically converts incident light at each of the unit pixels, accumulates a charge corresponding to a light amount of the incident light, and supplies the charge to the ADC 122 as an electric signal (pixel signal).

The ADC 122 generates pixel data in the form of digital data by A/D conversion of each of the pixel signals supplied from the multispectral light reception unit 121. The ADC 122 supplies a set of pixel data indicating the respective unit pixels thus generated to the preprocessing unit 131 of the semiconductor substrate 112 as image data (multispectral image data).

The preprocessing unit 131 performs predetermined signal processing as preprocessing for the multispectral image data (RAW data) supplied from the ADC 122. Contents of this preprocessing may be any contents. For example, the preprocessing may be defect correction for correcting pixel data having an abnormal value, defective position detection for detecting a position of a pixel from which pixel data having the abnormal value is output, noise reduction processing for reducing predetermined noise, or processing other than these. In addition, plural processes such as defect correction and noise reduction processing may be performed. The preprocessing unit 131 supplies the multispectral image data subjected to the preprocessing to the coding unit 132.

The coding unit 132 codes (compresses) the multispectral image data supplied from the preprocessing unit 131 by using a predetermined method, to generate coded data. A data volume of this coded data is smaller than the volume of the multispectral image data yet to be subjected to coding (compression). In other words, the coding unit 132 is capable of reducing the data volume of the multispectral image data. The coding unit 132 supplies the generated coded data to the transmission unit 133.

The transmission unit 133 transmits the coded data supplied from the coding unit 132. The coded data transmitted from the transmission unit 133 is supplied to the reception unit 141 of the signal processing unit 102 via a bus 103.

The signal processing unit 102 performs signal processing for the multispectral image data obtained at the imaging element 101. The signal processing unit 102 includes a reception unit 141, a decoding unit 142, and an image processing unit 143.

The reception unit 141 receives the coded data transferred via the bus 103 and supplies the coded data to the decoding unit 142.

The decoding unit 142 decodes (decompresses) the coded data supplied from the reception unit 141, by using a decoding method corresponding to the coding method of the coding unit 132, to restore the multispectral image data. The decoding unit 142 supplies the restored multispectral image data to the image processing unit 143.

The image processing unit 143 performs predetermined image processing for the supplied multispectral image data. Contents of this image processing may be any contents. For example, demosaic processing, filtering, or other processes may be performed. The image processing unit 143 outputs the multispectral image data subjected to the image processing to the outside of the imaging apparatus 100.

As described above, the coding unit 132 generates coded data by coding (compressing) multispectral image data, and the decoding unit 142 restores the multispectral image data by decoding (decompressing) the coded data. In this manner, an increase in a load imposed on a communication interface (the transmission unit 133, the bus 103, and the reception unit 141), which is provided between the imaging element 101 and the signal processing unit 102 for transfer of the multispectral image data, can be reduced. Accordingly, an increase in a bandwidth and a transfer speed of the communication interface required for transfer of multispectral image data can be reduced, and therefore, reduction of a cost increase is achievable.

In other words, the imaging element 101 is capable of reducing an increase in a load associated with transmission of multispectral image data and is thus capable of transmitting (outputting) a larger volume of data at a higher speed. In addition, the signal processing unit 102 is capable of reducing an increase in a load associated with reception of multispectral image data and is thus capable of receiving (inputting) a larger volume of data at a higher speed.

Further, the imaging apparatus 100 is capable of performing preprocessing and image processing for multispectral image data while reducing an increase in these loads. In other words, the imaging element 101 is capable of preprocessing and transmitting a larger volume of multispectral image data at a higher speed. In addition, the signal processing unit 102 is capable of receiving a larger volume of multispectral image data and performing image processing for the data at a higher speed.

Specifically, the imaging apparatus 100 is capable of reducing an effect of such limitations as those imposed on a bandwidth and a transfer speed of the communication interface without increasing costs and is capable of increasing a resolution of images, increasing a processing speed from imaging to recording of still images, improving a continuous shooting number and a continuous shooting speed, increasing a frame rate of moving images, and improving such imaging performance as imaging of moving images and still images.

<Coding and Decoding Method>

As depicted in FIG. 2, the coding unit 132 is mounted on the imaging element 101, while the decoding unit 142 is mounted on the signal processing unit 102. Specifically, the coding unit 132 and the decoding unit 142 are implemented as circuits built in the imaging element 101 or the signal processing unit 102, or as software executed inside the imaging element 101 or the signal processing unit 102. Accordingly, the method for coding (compressing) by the coding unit 132 and the method for decoding (decompression) by the decoding unit 142 may basically be any method, as long as each of the methods can be implemented in the imaging element 101 or the signal processing unit 102 (i.e., within a module) as described above.

Typical examples of the coding and decoding methods of image data include JPEG (Joint Photographic Experts Group) and MPEG (Moving picture Experts Group). These methods are sophisticated but require complicated processes and thus, are large in circuit scale and costly. Accordingly, it is normally difficult to implement these sophisticated methods in the imaging element 101 as circuits or software. Moreover, even if these methods are implemented, practicability of the methods may be insufficient in view of a problem that a delay time is likely to increase according to a longer processing time (clock number), a problem that the coding process may not be completed in time at a designated frame rate, and other problems. Further, a best-effort compression rate set in these methods may not contribute to reduction of the pin number and the bus band.

Accordingly, each of the coding unit 132 and the decoding unit 142 performs coding (compression) and decoding (decompression) of image data by using a method that requires only simpler processing and shorter processing time (clock number) than those of sophisticated compression methods such as JPEG and MPEG, for example, and that can be implemented at least in the imaging element 101 (semiconductor substrate 111 or semiconductor substrate 112) and the signal processing unit 102. The coding (compression) performed in the manner described above will hereinafter also be referred to as simple coding (simple compression). In addition, the decoding (decompression) performed in the manner described above will also be referred to as simple decoding (simple decompression). Specifically, the coding unit 132 generates coded data by performing simple coding (simple compression) for multispectral image data (RAW data) supplied from the preprocessing unit 131. In addition, the decoding unit 142 restores multispectral image data by performing simple decoding (simple decompression) for coded data supplied from the reception unit 141.

Specific methods for these simple coding and simple decoding may basically be any methods as long as the conditions described above are met. For example, these methods may be either reversible methods or irreversible methods. However, costs normally increase when the semiconductor substrate 112 or the signal processing unit 102 is enlarged. In addition, the delay time increases as the processing time (clock number) becomes longer. Accordingly, it is preferable to adopt a method that requires only simpler processing and shorter processing time for this simple coding and simple decoding.

For example, the ADC 122 typically outputs pixel data (multispectral image data) of each unit pixel in a predetermined order in a one-dimensional arrangement (as a pixel data string). However, when buffering (retaining) of the multispectral image data is necessary during coding (compression), the processing time may increase by the time length of buffering. Accordingly, for simple coding and simple decoding, it is preferable to adopt a method capable of sequentially coding and decoding the pixel data string with the lowest necessity of buffering. For example, a method using DPCM (Differential Pulse Code Modulation) or a method using one-dimensional DCT (Discrete Cosine Transform) may be adopted for simple coding and simple decoding. Details of this point will be described below.

Needless to say, with improvement of the degree of integration or the like, a sophisticated coding and decoding method such as JPEG and MPEG may be adopted as the coding method of the coding unit 132 or the decoding method of the decoding unit 142 as long as the method can be implemented in the imaging element 101 or the signal processing unit 102 at low cost and can perform high-speed operation sufficient for reducing a delay time within an allowable range and obtain a sufficient compression rate.

<Coding Unit>

Figure 3A:
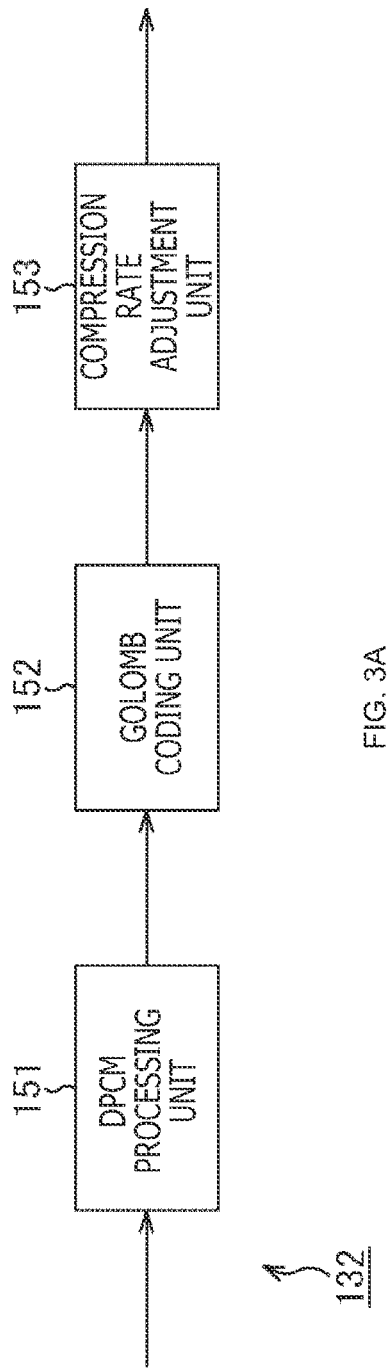
FIGS. 3A and 3B depict block diagrams illustrating an example of a main configuration of a coding unit.
Figure 3B:
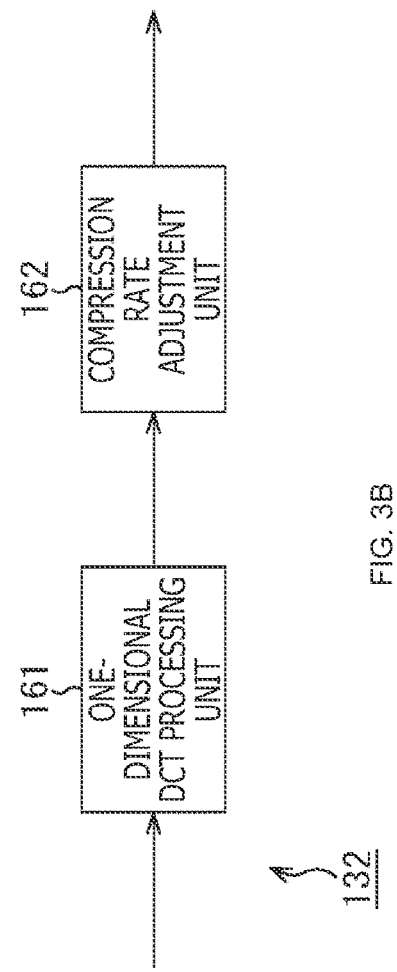

FIGS. 3A and 3B is a block diagram depicting an example of a main configuration of the coding unit 132 of FIG. 2. The configuration of the coding unit 132 may be any configuration. For example, the configuration of the coding unit 132 may be a configuration depicted in FIG. 3A or a configuration depicted in FIG. 3B. In a case of the example depicted in FIG. 3A, the coding unit 132 includes a DPCM processing unit 151, a golomb (Golomb) coding unit 152, and a compression rate adjustment unit 153.

The DPCM processing unit 151 performs DPCM processing which calculates a difference value in pixel data between a predetermined pair of pixels (two pixels) for pixel data supplied from the ADC 132 (pixel data string arranged one-dimensionally). The DPCM processing unit 151 supplies respective calculated difference values to the golomb coding unit 152.

The golomb coding unit 152 codes the respective difference values supplied from the DPCM processing unit 151, to generate golomb coding (Golomb Coding). The golomb coding unit 152 supplies the golomb coding (coded data) thus generated to the compression rate adjustment unit 153.

The compression rate adjustment unit 153 converts a compression rate of the coded data supplied from the golomb coding unit 152 into a predetermined compression rate by adjusting the compression rate. A method for adjusting this compression rate may be any method. For example, the compression rate adjustment unit 153 adjusts the compression rate by quantization or bit refinement. The compression rate adjustment unit 153 supplies the coded data subjected to adjustment of the compression rate to the transmission unit 133.

In such a manner, the coding unit 132 achieves coding at a fixed compression rate. Note that the compression rate may be variable. It is preferable, however, that the compression rate is fixed in a case where a maximum transferrable bandwidth of the communication interface (such as the bus 103) is fixed due to a hardware factor.

In a case of the example depicted in FIG. 3B, the coding unit 132 includes a one-dimensional DCT processing unit 161 and a compression rate adjustment unit 162.

The one-dimensional DCT processing unit 161 performs one-dimensional discrete cosine transform for the multispectral image data supplied from the ADC 122. The one-dimensional DCT processing unit 161 supplies the data subjected to the discrete cosine transform (hereinafter also referred to as transformed data) to the compression rate adjustment unit 162.

The compression rate adjustment unit 162 converts a compression rate of the transformed data supplied from the one-dimensional DCT processing unit 161 into a predetermined compression rate by adjusting the compression rate. A method for adjusting this compression rate may be any method. For example, the compression rate adjustment unit 162 extracts and discards an unnecessary high-band component from the transformed data such that the transformed data has a predetermined compression rate. The compression rate adjustment unit 162 supplies the transformed data subjected to the adjustment of the compression rate to the transmission unit 133 as coded data.

The transformed data supplied from the one-dimensional DCT processing unit 161 has been transformed into a frequency component. Accordingly, extraction for each frequency component is facilitated, and information is concentrated on a low-band component. In addition, a visual effect on image quality is smaller (deterioration of image quality is less conspicuous) in a high-band component. Accordingly, the compression rate adjustment unit 162 preferentially extracts and discards a higher-band component from transformed data as necessary, for example, and adjusts a data volume to be discarded. In this manner, the compression rate adjustment unit 162 is capable of easily adjusting the compression rate while reducing visual deterioration of image quality.

Note that two-dimensional discrete cosine transform is typically used for image compression or the like in some cases. However, two-dimensional discrete cosine transform requires more complicated processing than one-dimensional discrete cosine transform and may therefore increase a circuit scale. The one-dimensional DCT processing unit 161 is capable of obtaining transformed data more easily by performing one-dimensional discrete cosine transform for image data in comparison with the case of two-dimensional discrete cosine transform. In other words, reduction of a circuit scale increase of the coding unit 132 is achievable.

In the manner described above, the coding unit 132 implements coding at a fixed compression rate. Note that the compression rate may be variable. It is preferable, however, that the compression rate is fixed in a case where a maximum transferrable bandwidth of the communication interface (such as the bus 103) is fixed due to a hardware factor.

<Decoding Unit>

Figure 4A:
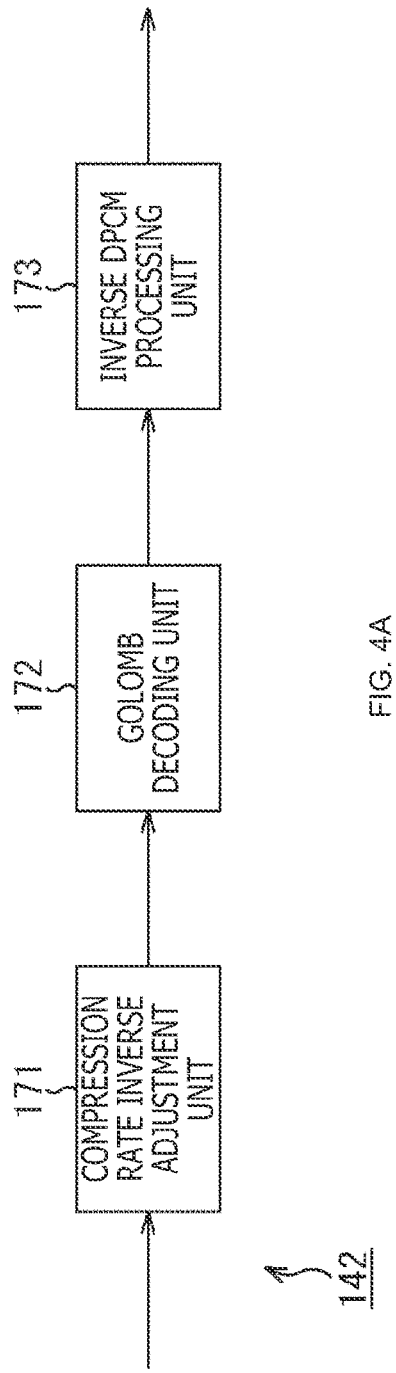
FIGS. 4A and 4B depict block diagrams illustrating an example of a main configuration of a decoding unit.
Figure 4B:
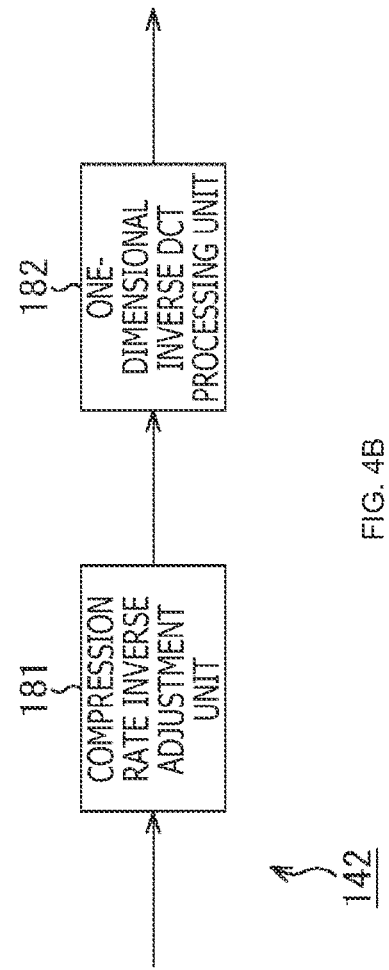

FIGS. 4A and 4B are block diagrams depicting an example of a main configuration of the decoding unit 142. The configuration of the decoding unit 142 may be any configuration. For example, the configuration of the decoding unit 142 may be a configuration depicted in FIG. 4A or a configuration depicted in FIG. 4B. In a case of the example depicted in FIG. 4A, the decoding unit 142 includes a compression rate inverse adjustment unit 171, a golomb decoding unit 172, and an inverse DPCM processing unit 173. The decoding unit 142 in this case decodes coded data generated by the coding unit 132 in FIG. 3A, by using a decoding method corresponding to the coding method of the coding unit 132 in FIG. 3A.

The compression rate inverse adjustment unit 171 performs an inverse process of the process performed by the compression rate adjustment unit 153, for the coded data supplied from the reception unit 141, to restore golomb coding generated by the golomb coding unit 152. The compression rate inverse adjustment unit 171 supplies the restored golomb coding to the golomb decoding unit 172.

The golomb decoding unit 172 performs decoding (also referred to as golomb decoding) for the golomb coding supplied from the compression rate inverse adjustment unit 171, by a method corresponding to the coding method of the golomb coding unit 152, to restore the difference value generated by the DPCM processing unit 151. The golomb decoding unit 172 supplies the restored difference value to the inverse DPCM processing unit 173.

The inverse DPCM processing unit 173 performs inverse DPCM processing (inverse processing of DPCM performed by the DPCM processing unit 151) for the difference value supplied from the golomb decoding unit 172, to restore respective pixel data. The inverse DPCM processing unit 173 supplies a set of the restored pixel data to the image processing unit 143 as multispectral image data.

In such a manner, the decoding unit 142 is capable of correctly decoding coded data generated by the coding unit 132. Specifically, the decoding unit 142 is capable of achieving simple coding of multispectral image data (RAW data) (and simple decoding of this coded data).

In a case of the example depicted in FIG. 4B, the decoding unit 142 includes a compression rate inverse adjustment unit 181 and a one-dimensional inverse DCT (also referred to as IDCT (Inverse Discrete Cosine Transform)) 182. The decoding unit 142 in this case decodes the coded data generated by the coding unit 132 in FIG. 3B, by using a decoding method corresponding to the coding method of the coding unit 132 in FIG. 3B.

The compression rate inverse adjustment unit 181 performs an inverse process of the process performed by the compression rate adjustment unit 162, for the coded data supplied from the reception unit 141, to restore transformed data generated by the one-dimensional DCT processing unit 161. The compression rate inverse adjustment unit 181 supplies the restored transformed data to the one-dimensional inverse DCT processing unit 182.

The one-dimensional inverse DCT processing unit 182 performs one-dimensional inverse DCT processing (inverse process of the one-dimensional DCT performed by the one-dimensional DCT processing unit 161) for the transformed data supplied from the compression rate inverse adjustment unit 181, to restore respective pixel data. The one-dimensional inverse DCT processing unit 182 supplies a set of the restored pixel data to the image processing unit 143 as multispectral image data.

In such a manner, the decoding unit 142 is capable of correctly decoding coded data generated by the coding unit 132. Specifically, the decoding unit 142 is capable of achieving simple coding of multispectral image data (RAW data) (and simple decoding of this coded data).

<Flow of Multispectral Image Capturing Process>

Next, a flow of a process executed by the imaging apparatus 100 of FIG. 2 will be described. The imaging apparatus 100 images an object and generates a multispectral image as a captured image by executing a multispectral image capturing process. An example of a flow of this multispectral image capturing process will be described with reference to a flowchart of FIG. 5.

With a start of the multispectral image capturing process, the imaging element 101 in step S101 executes a multispectral image generating process to image an object and generate coded data of a multispectral image (multispectral image data).

In step S102, the signal processing unit 102 executes a multispectral image signal process to decode the coded data of the multispectral image and perform signal processing for the multispectral image.

After completion of processing in step S102, the multispectral image capturing process ends.

<Flow of Multispectral Image Generating Process>

Next, an example of a flow of the multispectral image generating process executed in step S101 of FIG. 5 will be described with reference to a flowchart of FIG. 6.

With a start of the multispectral image generating process, the multispectral light reception unit 121 in step S111 images the object and generates a multispectral image.

In step S112, the ADC 122 performs A/D conversion for the multispectral image generated in step S111.

In step S113, the preprocessing unit 131 performs predetermined preprocessing for the multispectral image in the form of digital data generated in step S112.

In step S114, the coding unit 132 performs a simple coding process to code, by simple coding, the multispectral image subjected to the preprocess and generate coded data of the multispectral image.

In step S115, the transmission unit 133 transmits the coded data of the multispectral image generated in step S114 to the signal processing unit 102 (reception unit 141) via the bus 103.

Figure 5:
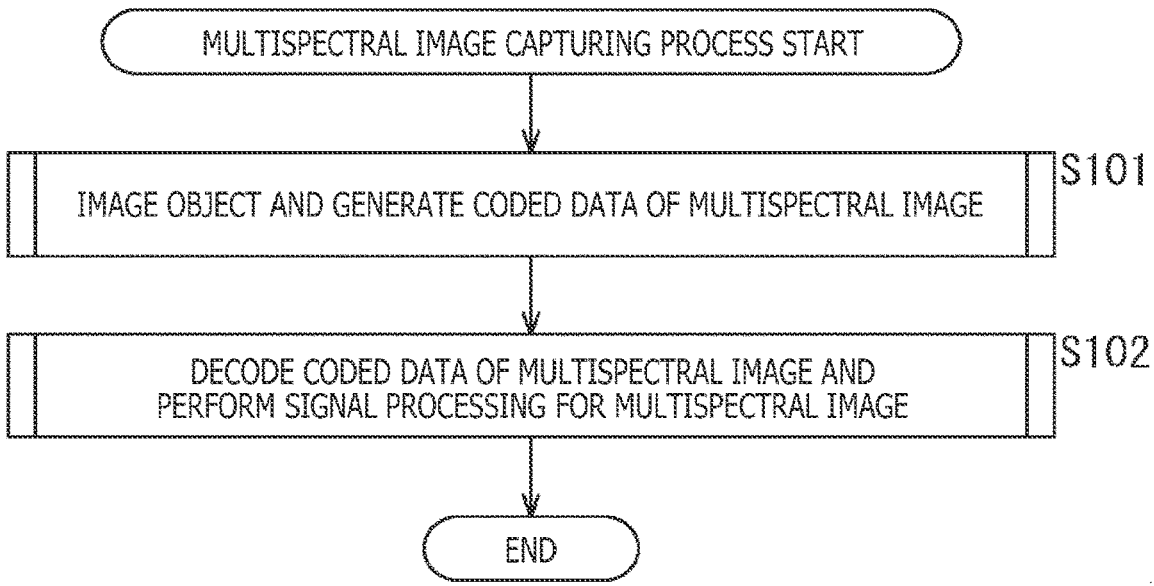
FIG. 5 is a flowchart explaining an example of a flow of a multispectral image capturing process.

After completion of processing in step S115, the multispectral image generating process ends, and the process returns to FIG. 5.

<Flow of Simple Coding Process>

Next, an example of a flow of the simple coding process executed in step S114 of FIG. 6 will be described with reference to a flowchart of FIG. 7. Described with reference to FIG. 7 is a case where the coding unit 132 has the configuration in FIG. 3A.

With a start of the simple coding process, the DPCM processing unit 151 in step S121 performs DPCM processing for a multispectral image.

In step S122, the golomb coding unit 152 performs golomb coding for respective difference values obtained by processing in step S121.

In step S123, the compression rate adjustment unit 153, for example, quantizes data or adds data for the golomb coding obtained by processing in step S122, to adjust a compression rate of coded data.

Figure 6:
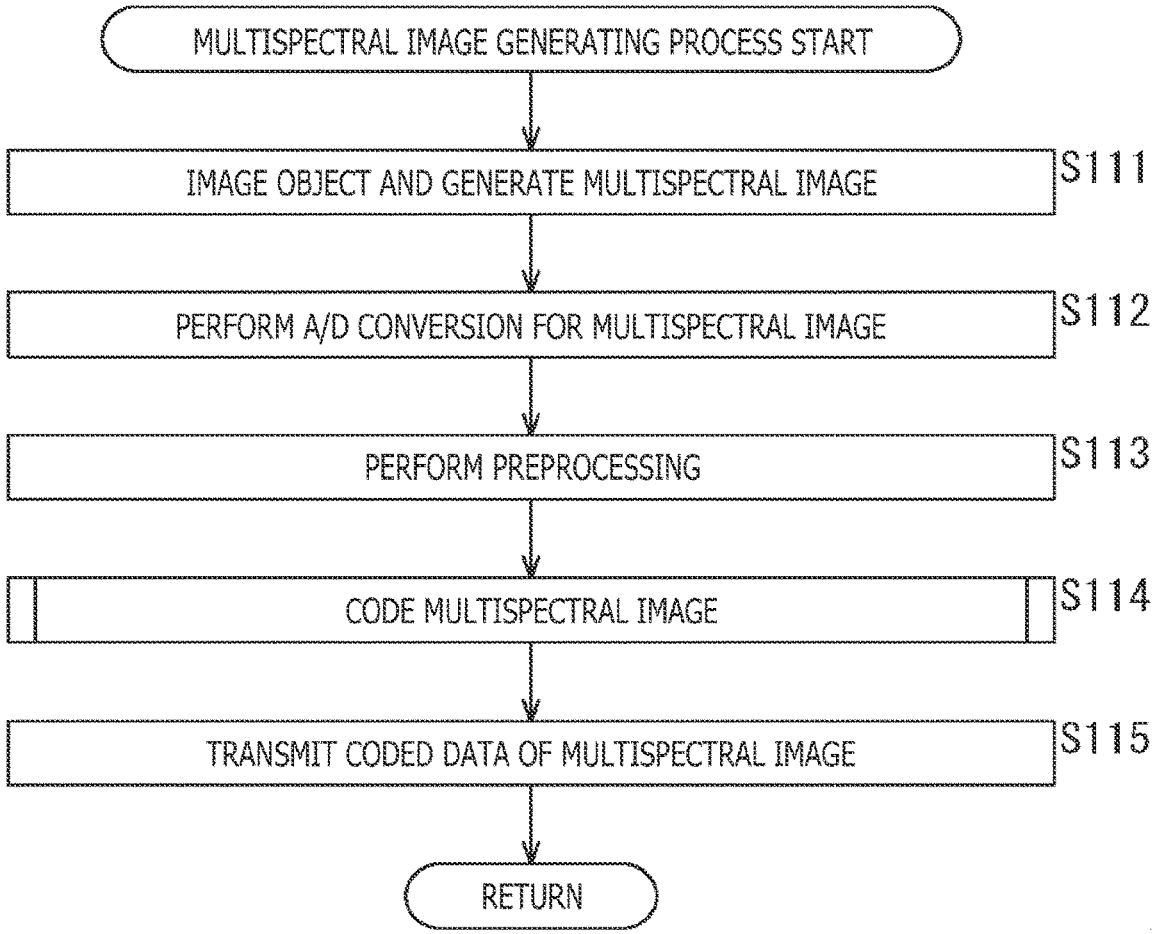
FIG. 6 is a flowchart explaining an example of a flow of a multispectral image generating process.
Figure 7:
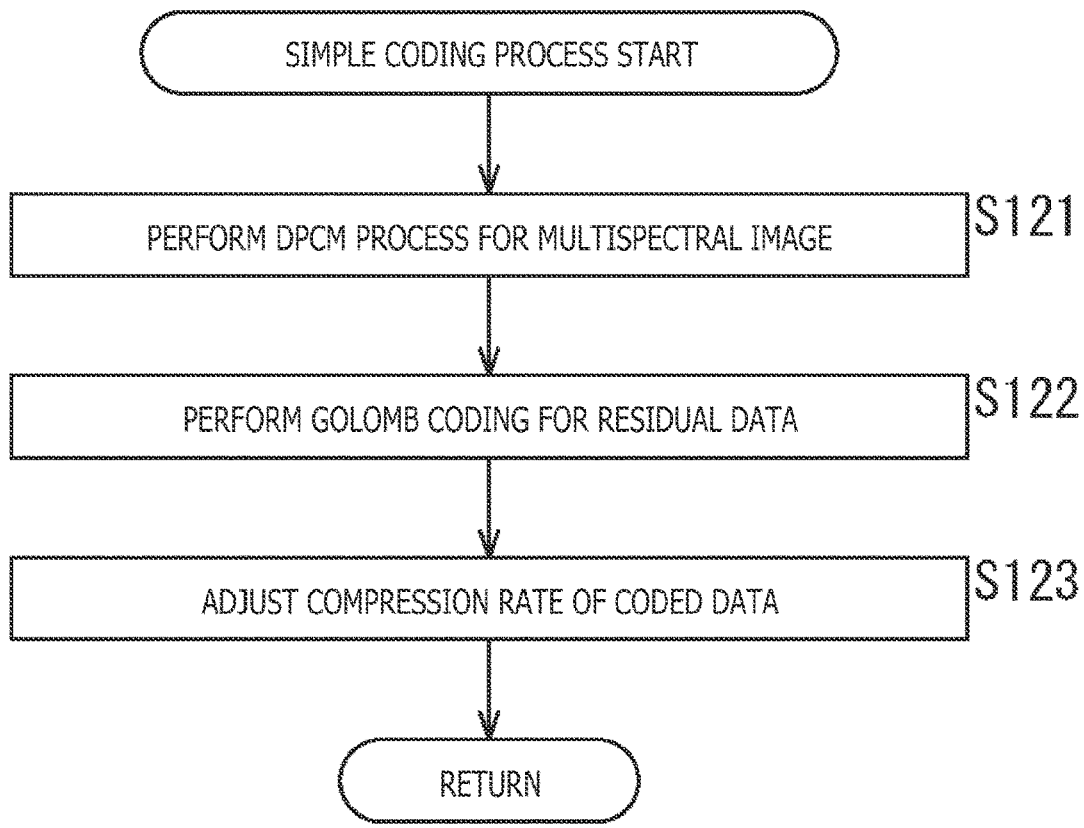
FIG. 7 is a flowchart explaining an example of a flow of a simple coding process.

After coded data of a predetermined compression rate is obtained by processing in step S123, the simple coding process ends, and the process returns to FIG. 6.

<Flow of Simple Coding Process>

Figure 8:
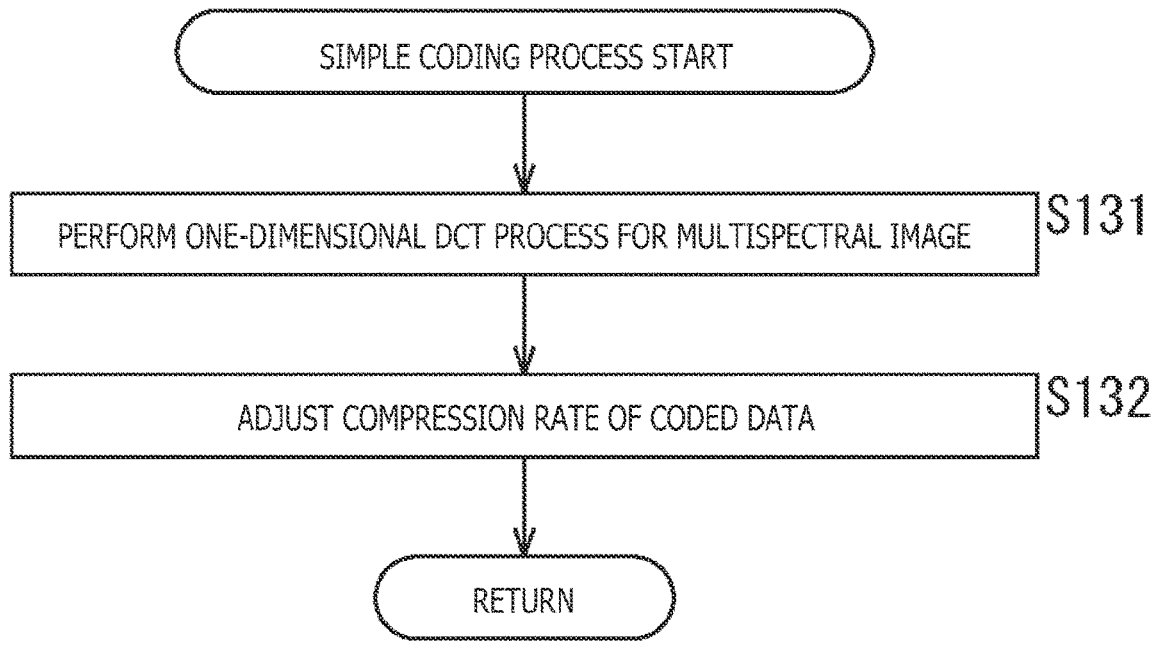
FIG. 8 is a flowchart explaining another example of the flow of the simple coding process.

Next, an example of a flow of the simple coding process executed in step S114 of FIG. 6 will be described with reference to a flowchart of FIG. 8. Described with reference to FIG. 8 is a case where the coding unit 132 has the configuration in FIG. 3B.

With a start of the simple coding process, the one-dimensional DCT processing unit 161 in step S131 performs one-dimensional discrete cosine transform for a multispectral image.

In step S132, the compression rate adjustment unit 162 discards a high-band component of the transformed data obtained by processing in step S131, for example, to adjust a compression rate and thus obtain coded data of the multispectral image.

After coded data of a predetermined compression rate is obtained by processing in step S132, the simple coding process ends, and the process returns to FIG. 6.

<Flow of Multispectral Image Signal Process>

Next, an example of a flow of the multispectral image signal process executed in step S102 of FIG. 5 will be described with reference to a flowchart of FIG. 9.

With a start of the multispectral image signal process, the reception unit 141 in step S141 receives coded data of a multispectral image transferred via the bus 103.

In step S142, the decoding unit 142 executes the simple decoding process to decode the coded data of the multispectral image received in step S141 and thereby restore the multispectral image.

In step S143, the image processing unit 143 performs image processing for the multispectral image restored in step S142.

After completion of processing in step S143, the multispectral image signal process ends, and the process returns to FIG. 5.

<Flow of Simple Decoding Process>

Next, an example of a flow of the simple decoding process executed in step S142 of FIG. 9 will be described with reference to a flowchart of FIG. 10. Described with reference to FIG. 10 is a case where the decoding unit 142 has the configuration in FIG. 4A.

With a start of the simple decoding process, the compression rate inverse adjustment unit 171 in step S151 performs inverse adjustment of the compression rate of the coded data of the multispectral image (i.e., inverse processing of processing in step S123 of FIG. 7) to restore golomb coding yet to be subjected to adjustment of the compression rate.

In step S152, the golomb decoding unit 172 performs golomb decoding for the respective golomb coding obtained by processing in step S151, to restore a difference value between pieces of pixel data.

In step S163, the inverse DPCM processing unit 173 performs inverse DPCM processing using the difference value obtained by processing in step S162 (i.e., inverse processing of processing in step S121 of FIG. 7). In other words, the inverse DPCM processing unit 173 restores pixel data of respective unit pixels by adding the difference values, for example.

Figure 9:
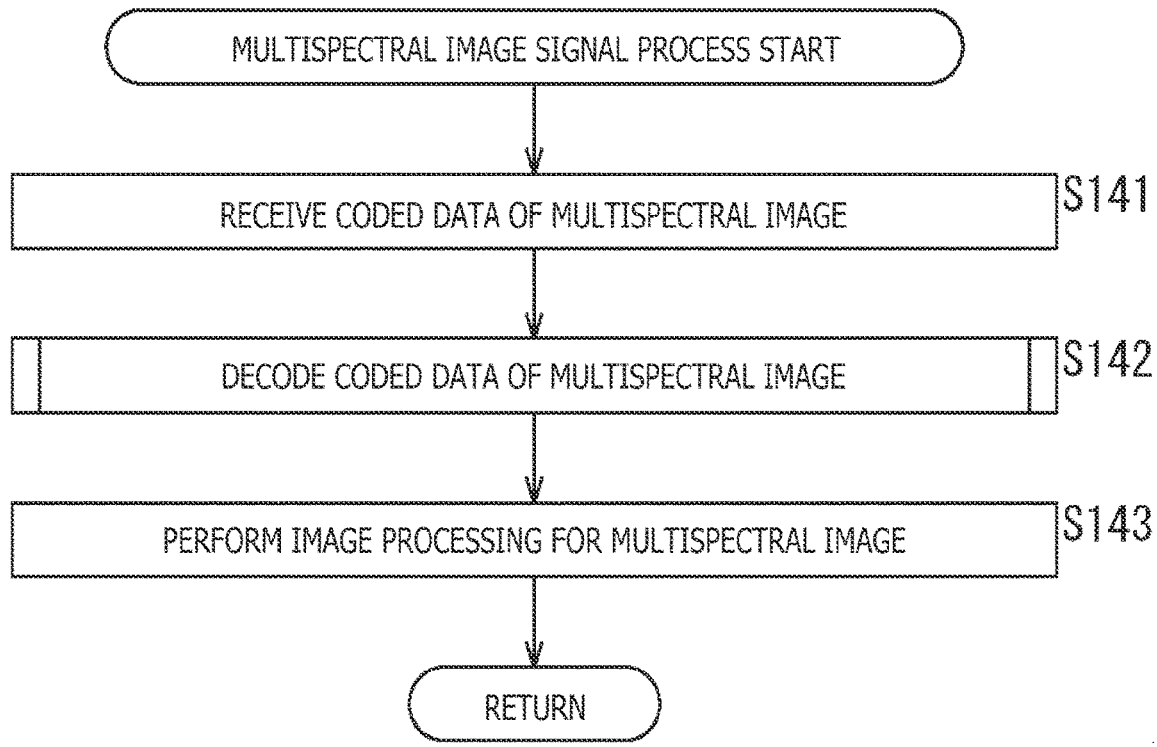
FIG. 9 is a flowchart explaining an example of a flow of a multispectral image signal process.
Figure 10:
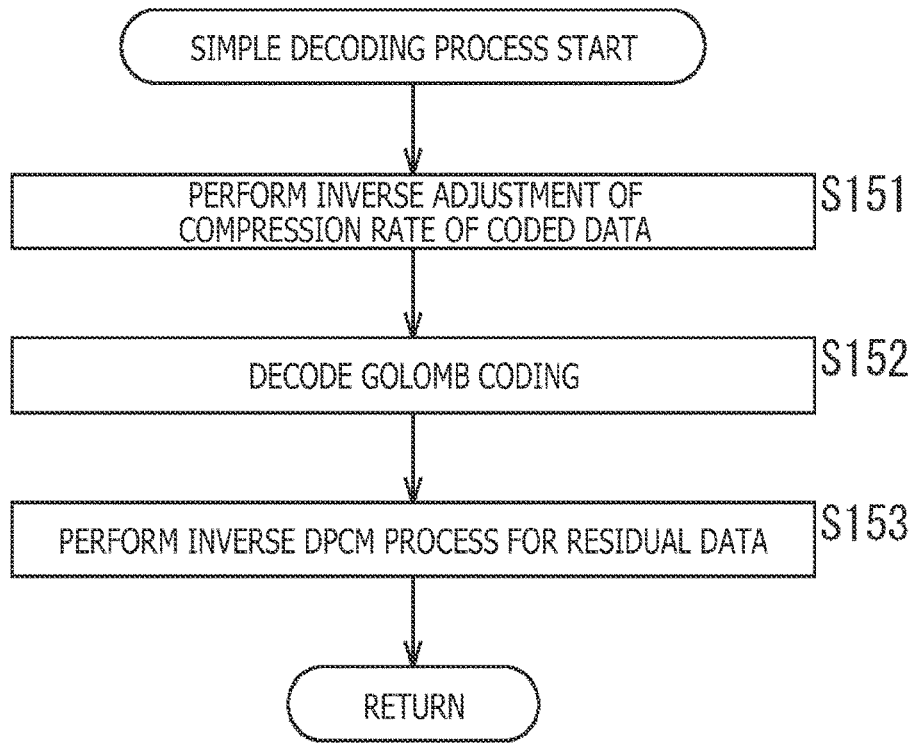
FIG. 10 is a flowchart explaining an example of a flow of a simple decoding process.

After a multispectral image is obtained by processing in step S163, the simple decoding process ends, and the process returns to FIG. 9.

<Flow of Simple Decoding Process>

Figure 11:
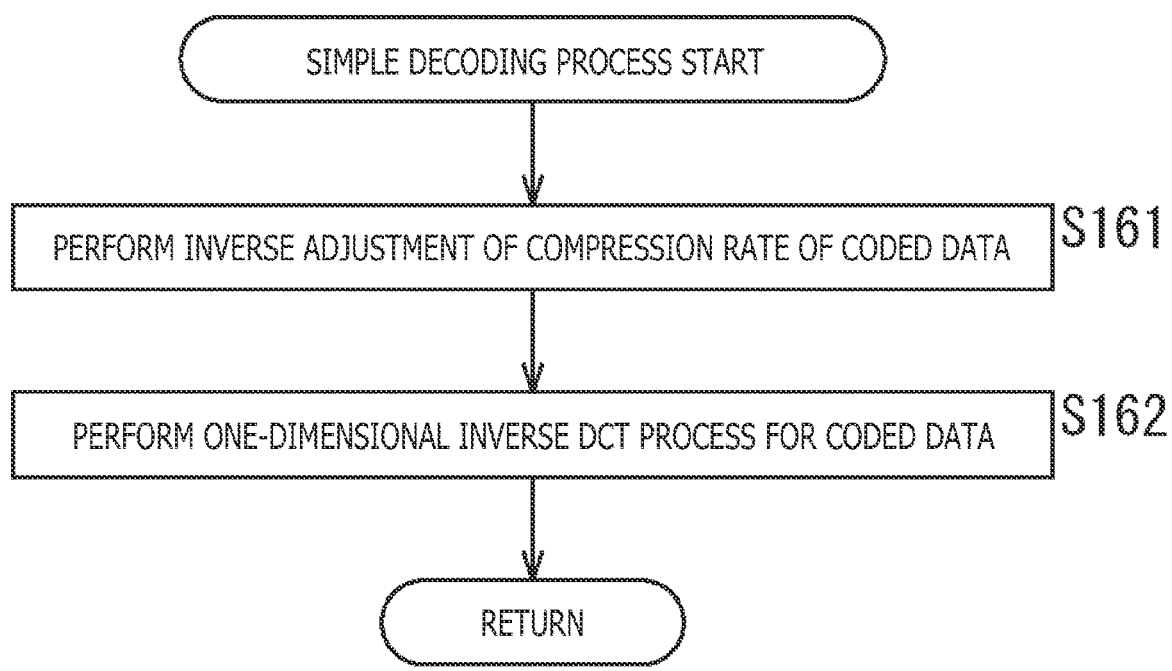
FIG. 11 is a flowchart explaining another example of the flow of the simple decoding process.

Next, an example of a flow of the simple decoding process executed in step S142 of FIG. 9 will be described with reference to a flowchart of FIG. 11. Described with reference to FIG. 11 is a case where the decoding unit 142 has the configuration in FIG. 4B.

With a start of the simple decoding process, the compression rate inverse adjustment unit 181 in step S161 performs inverse adjustment of the compression rate of the coded data (i.e., inverse processing of processing in step S132 of FIG. 8) to restore transformed data yet to be subjected to adjustment of the compression rate.

In step S172, the one-dimensional inverse DCT processing unit 182 performs one-dimensional inverse discrete cosine transform for the transformed data obtained by processing in step S161, to restore pixel data of the respective unit pixels (i.e., multispectral image).

After a multispectral image is obtained by processing in step S172, the simple decoding process ends, and the process returns to FIG. 9.

Reduction of an increase in a load imposed by processing of multispectral image data is achievable by executing the respective processes in the manner described above.

<Imaging Apparatus>

Note that the simple coding and simple decoding described above may be applied to a memory interface. For example, multispectral image data may temporarily be retained using a memory during preprocessing or image processing. At this time, multispectral image data may be coded and stored in the memory.

Figure 12:
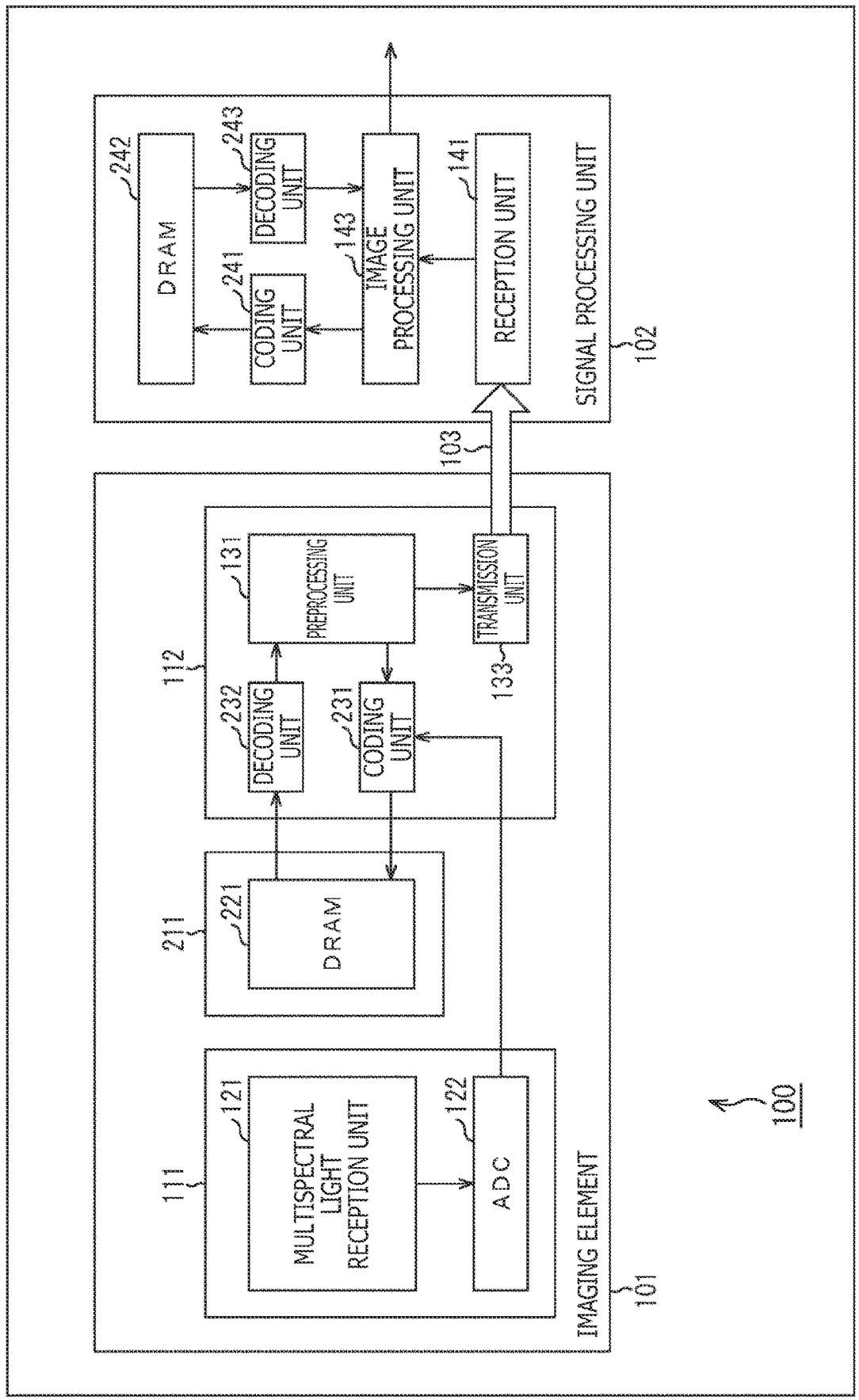
FIG. 12 is a block diagram depicting an example of a main configuration of an imaging apparatus achieving the method #1.

FIG. 12 is a block diagram depicting an example of a main configuration of the imaging apparatus 100 in such a case. The imaging element 101 in this case further includes a semiconductor substrate 211 in comparison with the example of FIG. 2. The semiconductor substrate 211 is sealed together with the semiconductor substrate 111 and the semiconductor substrate 112, and modularized (integrated). In such a case, the semiconductor substrate 211 may be either overlapped or not overlapped with the semiconductor substrate 111 and the semiconductor substrate 112.

A DRAM (Dynamic Random Access Memory) 221 is provided on the semiconductor substrate 211. The DRAM 221 is a storage medium which stores (temporarily retains) (coded data of) multispectral image data for which preprocessing is to be performed.

A coding unit 231 and a decoding unit 232 are provided on the semiconductor substrate 112, in place of the coding unit 132. The coding unit 231 is a processing unit having a function similar to the function of the coding unit 132, and codes multispectral image data supplied from the ADC 122 and the preprocessing unit 131, to generate coded data of the multispectral image data. The coding unit 231 supplies the generated coded data to the DRAM 221 and causes the DRAM 221 to store the coded data (writes the data to the DRAM 221). In other words, the coding unit 132 codes the multispectral image data for which preprocessing is to be performed and causes the DRAM 221 to store the coded data. A method of this coding by the coding unit 231 may be any method similarly to the coding unit 132. For example, the coding unit 231 may perform the simple coding (simple compression) described above.

The decoding unit 232 is a processing unit having a function similar to the function of the decoding unit 142, and reads and decodes coded data stored in the DRAM 221, to restore multispectral image data. The decoding unit 232 supplies the restored multispectral image data to the preprocessing unit 131. Specifically, the decoding unit 232 reads, from the DRAM 221, coded data of multispectral image data for which preprocess is to be performed, and decodes the coded data to cause the preprocessing unit 131 to perform preprocessing for the restored multispectral image data. A method of this decoding by the decoding unit 232 may be any method similarly to the decoding unit 142. For example, the decoding unit 232 may perform the simple decoding (simple decompression) described above.

The preprocessing unit 131 performs preprocessing for the multispectral image data supplied from the decoding unit 232. The preprocessing unit 131 supplies the multispectral image data subjected to the preprocessing to the transmission unit 133, and causes the transmission unit 133 to transmit the multispectral image data to the signal processing unit 102. Moreover, the preprocessing unit 131 supplies multispectral image data requiring further processing to the coding unit 231, and causes the DRAM 221 to store this data.

The transmission unit 133 transmits the multispectral image data (non-compressed multispectral image data) supplied from the preprocessing unit 131, to the signal processing unit 102 (reception unit 141) via the bus 103.

As described above, the DRAM 221 is disposed within the module. In this configuration, the imaging element 101 is allowed to output multispectral image data at any timing. Moreover, the preprocessing unit 131 is allowed to acquire multispectral image data at any timing. In this case, the multispectral image data is not required to be preprocessed in the order of supply. Accordingly, the preprocessing unit 131 is capable of performing a wider variety of processes than in the case of FIG. 2.

As described above, the coding unit 231 codes multispectral image data, and the decoding unit 232 decodes the coded data. Accordingly, a data volume stored in the DRAM 221 can be reduced. The DRAM 221 is therefore allowed to store a larger volume of data. In other words, a storage area of the DRAM 221 can be utilized more effectively.

Note that data written to the DRAM 221 and data read from the DRAM 221 are transferred via the memory interfaces such as the memory buses (an arrow between the coding unit 231 and the DRAM 221 and an arrow between the DRAM 221 and the decoding unit 232). The coding unit 231 codes (compresses) multispectral image data, and the decoding unit 232 decodes (decompresses) the coded data. In this manner, an increase in a load imposed on these memory interfaces can be reduced. Accordingly, reduction of a cost increase is achievable.

In other words, a larger volume of data can be written to the DRAM 221 or read from the DRAM 221 at a higher speed. In addition, the imaging element 101 is capable of preprocessing a larger volume of multispectral image data at a higher speed.

Particularly, in a case of a bus connecting circuits of semiconductor substrates different from each other, a via is provided as a part of the bus. When the bus thus configured is extended, a larger number of vias is required. However, when the number of vias increases, the circuit scale (area) remarkably increases. It is therefore preferable to reduce the number of vias to reduce a cost increase. Accordingly, as described above, the imaging element 101 is capable of reducing a cost increase more effectively by compressing multispectral image data and increasing usage efficiency of the bus.

The signal processing unit 102 includes a coding unit 241, a DRAM 242, and a decoding unit 243 in place of the decoding unit 142 in comparison with the case of FIG. 2.

The reception unit 141 receives multispectral image data transferred via the bus 103 and supplies the multispectral image data to the image processing unit 143.

The image processing unit 143 performs image processing for the multispectral image data supplied from the decoding unit 243. The image processing unit 143 is also capable of performing image processing for multispectral image data supplied from the reception unit 141. The image processing unit 143 supplies, to the coding unit 241, multispectral image data not processed and also multispectral image data for which image processing is to be further performed, and causes the DRAM 242 to store the respective multispectral image data. In addition, the image processing unit 143 outputs the multispectral image data for which image processing has been performed (for which image processing is not to be performed any more) to the outside of the imaging apparatus 100.

The DRAM 242 stores (temporarily retains) (coded data of) multispectral image data processed by the image processing unit 143.

The coding unit 241 is a processing unit having a function similar to the function of the coding unit 231, and codes multispectral image data stored in the DRAM 242, to generate coded data. The coding unit 241 supplies the coded data to the DRAM 242 and causes the DRAM 242 to store the coded data (writes the data to the DRAM 242). A method of this coding by the coding unit 231 may be any method similarly to the coding unit 231. For example, the coding unit 231 may perform the simple coding (simple compression) described above.

The decoding unit 243 is a processing unit having a function similar to the function of the decoding unit 232, and reads and decodes coded data stored in the DRAM 242, to restore multispectral image data. The decoding unit 243 supplies the restored multispectral image data to the image processing unit 143. Specifically, the decoding unit 243 reads, from the DRAM 242, coded data of multispectral image data for which image processing is to be performed, and decodes the coded data to cause the image processing unit 143 to perform image processing for the restored multispectral image data. A method of this decoding by the decoding unit 243 may be any method similarly to the decoding unit 232. For example, the decoding unit 243 may perform the simple decoding (simple decompression) described above.

The image processing unit 143 is allowed to acquire multispectral image data at any timing in the configuration equipped with the DRAM 242 as described above. In this case, image processing is not required to be performed for the multispectral image data in the order of supply. Accordingly, the image processing unit 143 is capable of performing a wider variety of processes than in the case of FIG. 2.

Moreover, the coding unit 241 codes multispectral image data, and the decoding unit 243 decodes the coded data. Accordingly, a data volume stored in the DRAM 242 can be reduced. The DRAM 242 is thus allowed to store a larger volume of data. In other words, a storage area of the DRAM 242 can be used more effectively. Further, an increase in a load imposed on the memory interface of the DRAM 242 can be reduced. Accordingly, reduction of a cost increase is achievable. The signal processing unit 102 is thus capable of performing image processing for a larger volume of multispectral image data at a higher speed.

Specifically, the imaging apparatus 100 is capable of reducing an effect of limitations imposed on the memory interface without increasing costs and is capable of increasing a resolution of images, increasing a processing speed from imaging to recording of still images, improving a continuous shooting number and a continuous shooting speed, increasing a frame rate of moving images, and improving such imaging performance as imaging for capturing moving images and still images.

<Flow of Multispectral Image Capturing Process>

Next, an example of a flow of a multispectral image capturing process executed by the imaging apparatus 100 of FIG. 12 will be described with reference to a flowchart of FIG. 13.

With a start of the multispectral image capturing process, the imaging element 101 in step S201 executes a multispectral image generating process to image an object and generate a multispectral image (multispectral image data).

In step S202, the signal processing unit 102 executes a multispectral image signal process to perform signal processing for the multispectral image.

After completion of processing in step S202, the multispectral image capturing process ends.

<Flow of Multispectral Image Generating Process>

Next, an example of a flow of the multispectral image generating process executed in step S201 of FIG. 13 will be described with reference to a flowchart of FIG. 14.

With a start of the multispectral image generating process, the multispectral light reception unit 121 in step S211 images the object and generates a multispectral image.

In step S212, the ADC 122 performs A/D conversion of the multispectral image generated in step S211.

In step S213, the coding unit 231 performs a simple coding process (e.g., the simple coding process described with reference to the flowcharts of FIG. 7 or 8) to perform simple coding for the multispectral image generated in step S212 and generate coded data of the multispectral image.

In step S214, the DRAM 221 stores coded data of the multispectral image generated in step S213.

In step S215, the preprocessing unit 131 (and the coding unit 231, the decoding unit 232, and the DRAM 221) performs preprocessing for the multispectral image.

In step S216, the transmission unit 133 transmits the multispectral image preprocessed in step S215 to the signal processing unit 102 (reception unit 141) via the bus 103.

Figure 13:
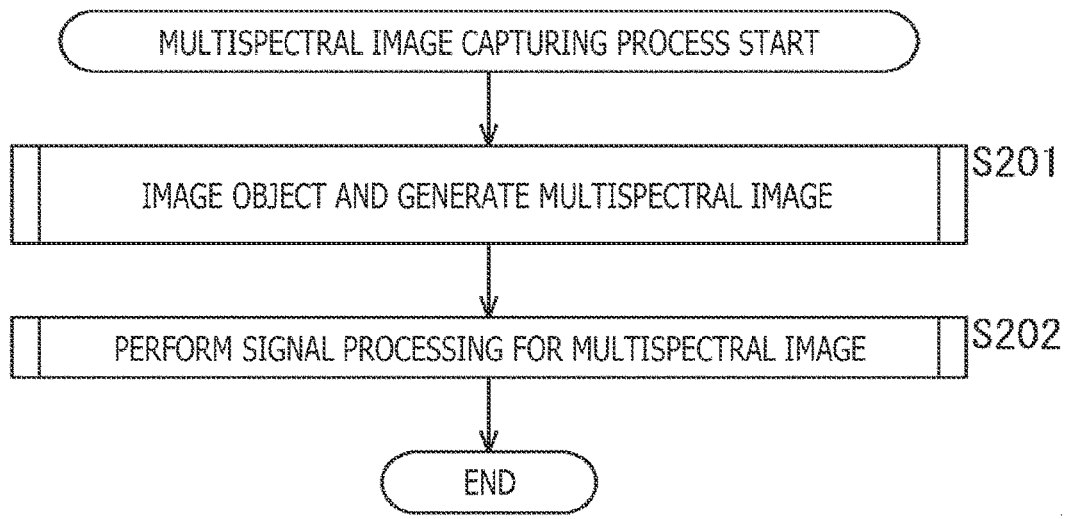
FIG. 13 is a flowchart explaining an example of a flow of a multispectral image capturing process.

After completion of processing in step S216, the multispectral image generating process ends, and the process returns to FIG. 13.

<Flow of Multispectral Image Preprocess>

Next, an example of a flow of a multispectral image preprocess executed in step S215 of FIG. 14 will be described with reference to a flowchart of FIG. 15.

With a start of the multispectral image preprocess, the preprocessing unit 131 in step S221 determines whether or not to read a multispectral image from the DRAM 221. In a case of a determination that the multispectral image is to be read, the process proceeds to step S222.

In step S222, the decoding unit 232 reads coded data of the multispectral image designated by the preprocessing unit 131 from the DRAM 221.

In step S223, the decoding unit 232 performs a simple decoding process (e.g., the simple decoding process described with reference to the flowchart of FIG. 10 or 11)

to achieve simple decoding for the coded data of the multispectral image read in step S222.

After completion of processing in step S223, the process proceeds to step S224. In addition, in a case of a determination that the multispectral image is not to be read from the DRAM 221 in step S221, the process proceeds to step S224.

In step S224, the preprocessing unit 131 performs preprocessing for the multispectral image. For example, the preprocessing unit 131 performs preprocessing for the multispectral image restored in step S223.

In step S225, the preprocessing unit 131 determines whether or not to store the multispectral image in the DRAM 221. In a case of a determination that the multispectral image is to be written to the DRAM 221, the process proceeds to step S226.

In step S226, the coding unit 231 performs a simple coding process (e.g., the simple coding process described with reference to the flowchart of FIG. 7 or 8) to achieve simple coding for the multispectral image and generate coded data of the multispectral image.

In step S227, the DRAM 221 stores coded data of the multispectral image generated in step S226.

After completion of processing in step S227, the process proceeds to step S228. In addition, in a case of a determination that the multispectral image is not to be written to the DRAM 221 in step S225, the process proceeds to step S228.

In step S228, the preprocessing unit 131 determines whether or not the preprocessing is completed. In a case of a determination that any preprocessing uncompleted data is present, the process returns to step S221 and performs subsequent processing. In addition, in a case of a determination that the preprocessing has been completed for all data in step S228, the multispectral image preprocess ends, and the process returns to FIG. 14.

<Flow of Multispectral Image Signal Process>

Next, an example of a flow of the multispectral image signal process executed in step S202 of FIG. 13 will be described with reference to a flowchart of FIG. 16.

With a start of the multispectral image signal process, the reception unit 141 in step S231 receives a multispectral image transferred via the bus 103.

In step S232, the image processing unit 143 (and the coding unit 241, the DRAM 242, and the decoding unit 243) performs a multispectral image process to achieve image processing for the multispectral image received in step S231.

After completion of processing in step S232, the multispectral image signal process ends, and the process returns to FIG. 13.

<Flow of Multispectral Image Process>

Next, an example of a flow of the multispectral image process executed in step S232 of FIG. 16 will be described with reference to a flowchart of FIG. 17.

With a start of the multispectral image process, the image processing unit 143 in step S241 determines whether or not to read a multispectral image from the DRAM 242. In a case of a determination that the multispectral image is to be read, the process proceeds to step S242.

In step S242, the decoding unit 243 reads coded data of the multispectral image designated by the image processing unit 143 from the DRAM 242.

In step S243, the decoding unit 243 performs a simple decoding process (e.g., the simple decoding process described with reference to the flowchart of FIG. 10 or 11) to achieve simple decoding for the coded data of the multispectral image read in step S242.

After completion of processing in step S243, the process proceeds to step S244. In addition, in a case of a determination that the multispectral image is not to be read from the DRAM 242 in step S241, the process proceeds to step S244.

In step S244, the image processing unit 143 performs image processing for the multispectral image. For example, the image processing unit 143 performs image processing for the multispectral image restored in step S243.

In step S245, the image processing unit 143 determines whether or not to store the multispectral image in the DRAM 242. In a case of a determination that the multispectral image is to be written to the DRAM 242, the process proceeds to step S246.

In step S246, the coding unit 241 performs a simple coding process (e.g., the simple coding process described with reference to the flowchart of FIG. 7 or 8) to achieve simple coding for the multispectral image and generate coded data of the multispectral image.

In step S247, the DRAM 242 stores coded data of the multispectral image generated in step S246.

After completion of processing in step S247, the process proceeds to step S248. In addition, in a case of a determination that the multispectral image is not to be written to the DRAM 242 in step S245, the process proceeds to step S248.

In step S248, the image processing unit 143 determines whether or not the image processing is completed. In a case of a determination that any image processing uncompleted data is present, the process returns to step S241 and performs subsequent processing. In addition, in a case of a determination that the image processing has been completed for all data in step S248, the multispectral image process ends, and the process returns to FIG. 16.

Reduction of an increase in a load imposed by processing of multispectral image data is achievable by executing the respective processes in the manner described above.

<Imaging Apparatus>

Note that the simple coding and simple decoding described above may be applied to both the communication interface and the memory interface. In other words, the configurations of FIGS. 2 and 12 may be combined in an appropriate manner.

Figure 18:
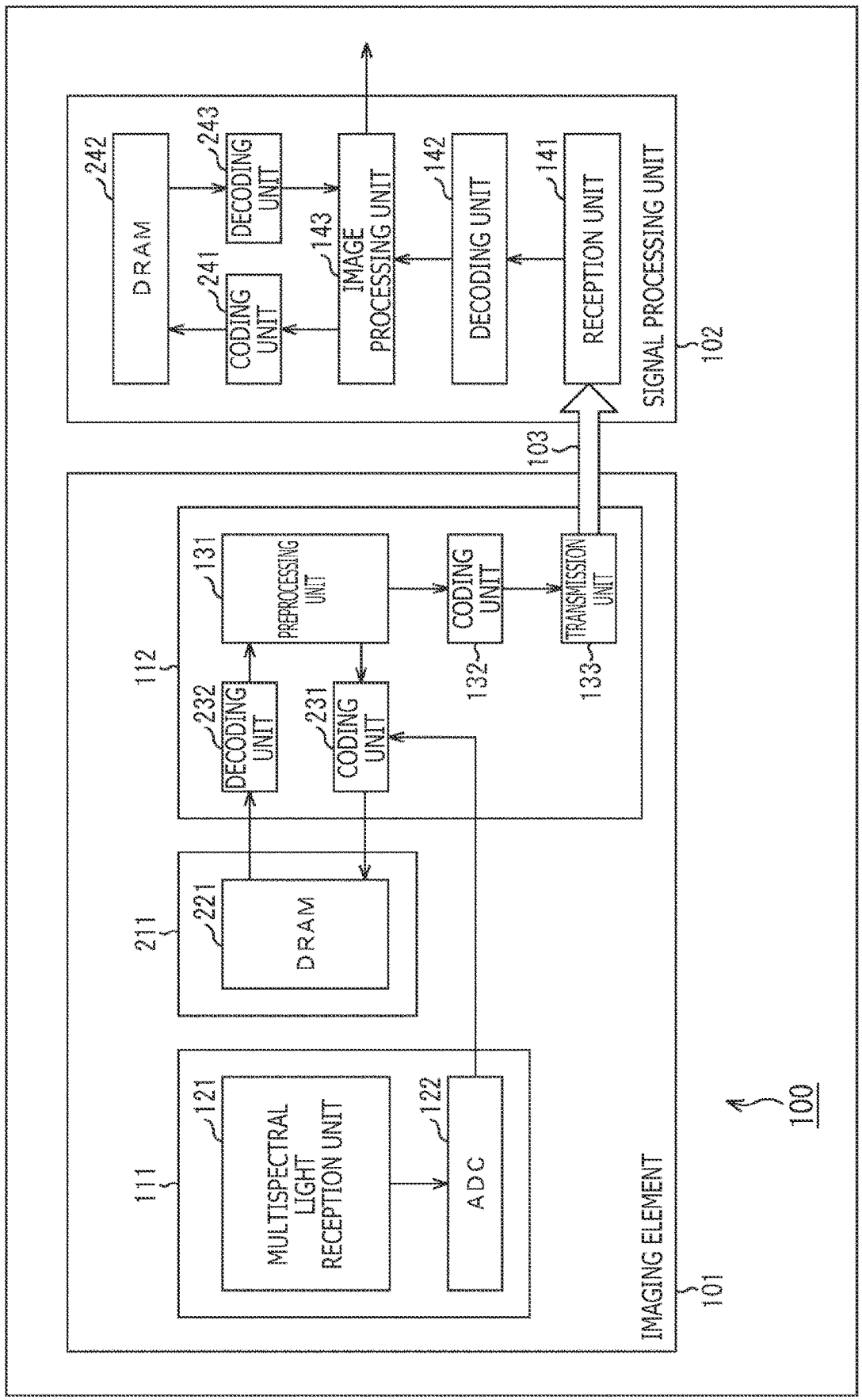
FIG. 18 is a block diagram depicting an example of a main configuration of an imaging apparatus achieving the method #1.

FIG. 18 is a block diagram depicting an example of a main configuration of the imaging apparatus 100 in such a case. In this configuration, the semiconductor substrate 112 of the imaging element 101 further includes a transmission unit 133 in comparison with the example of FIG. 12. Moreover, the signal processing unit 102 further includes the decoding unit 142.

The coding unit 132 codes the multispectral image data preprocessed by the preprocessing unit 131, to generate coded data, and then supplies the coded data to the transmission unit 133 to cause the transmission unit 133 to transmit the coded data to the signal processing unit 102 similarly to the case of FIG. 2. In this case, the coding method may be any method similarly to the above, such as the simple coding (simple compression) described above.

The transmission unit 133 transmits the coded data generated by the coding unit 132. In other words, similarly to the case of FIG. 2, the coded data of the multispectral image data is transferred via the bus 103. The reception unit 141 receives the coded data of the multispectral image data and supplies the coded data to the decoding unit 142, similarly to the case of FIG. 2.

The decoding unit 142 decodes the coded data of the multispectral image data supplied from the reception unit 141, by using a decoding method corresponding to the coding method of the coding unit 132, similarly to the case of FIG. 2. In this case, the decoding method may be any method similarly to above, such as the simple decoding (simple decompression) described above.

In such a manner, an increase in a load imposed on the communication interface used for processing of the multispectral image data can be reduced similarly to the case of FIG. 2. In addition, an increase in a load imposed on the memory interface used for processing of the multispectral image data can be reduced similarly to the case of FIG. 12.

Accordingly, the imaging apparatus 100 is capable of reducing an effect of limitations imposed on the communication interface and the memory interface without increasing costs and is capable of increasing a resolution of images, increasing a processing speed from imaging to recording of still images, improving a continuous shooting number and a continuous shooting speed, increasing a frame rate of moving images, and improving such imaging performance as imaging for capturing moving images and still images.

<Flow of Multispectral Image Generating Process>

Figure 19:
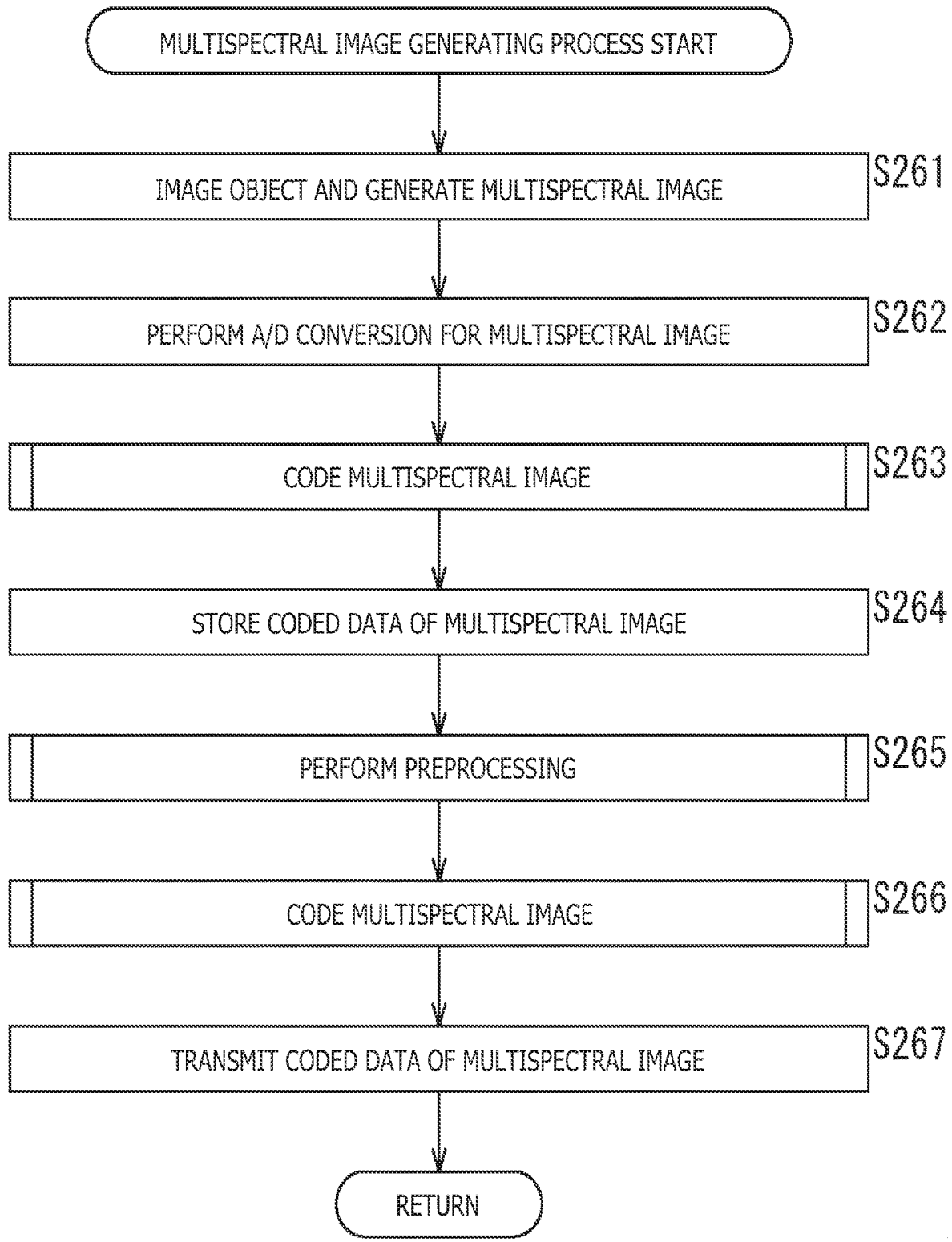
FIG. 19 is a flowchart explaining an example of a flow of a multispectral image generating process.

In this case, the imaging apparatus 100 performs the multispectral image capturing process similarly to the process described with reference to the flowchart of FIG. 5. An example of a flow of the multispectral image generating process executed in step S101 of FIG. 5 in this case will be described with reference to a flowchart of FIG. 19.

Figure 14:
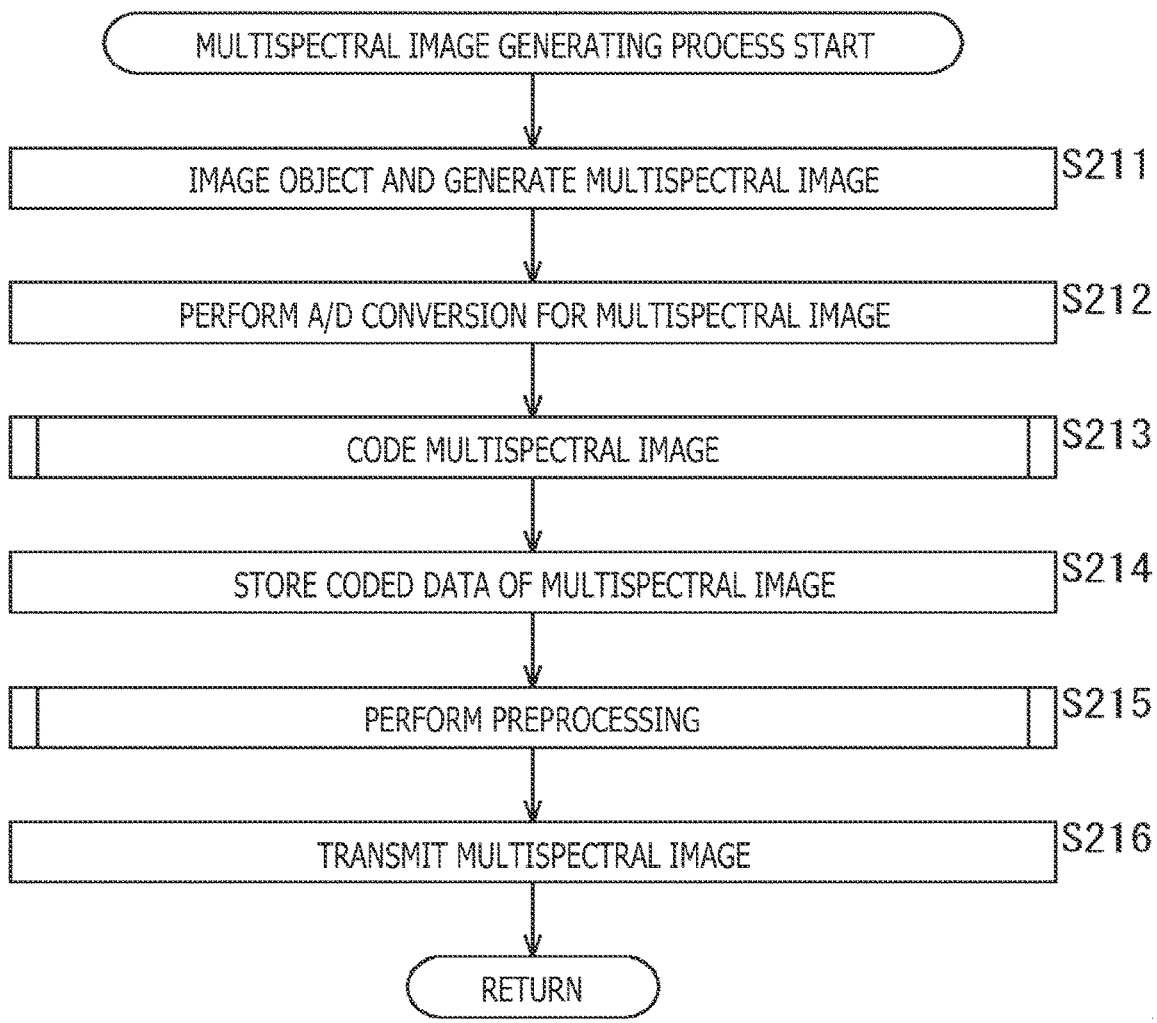
FIG. 14 is a flowchart explaining an example of a flow of a multispectral image generating process.
Figure 15:
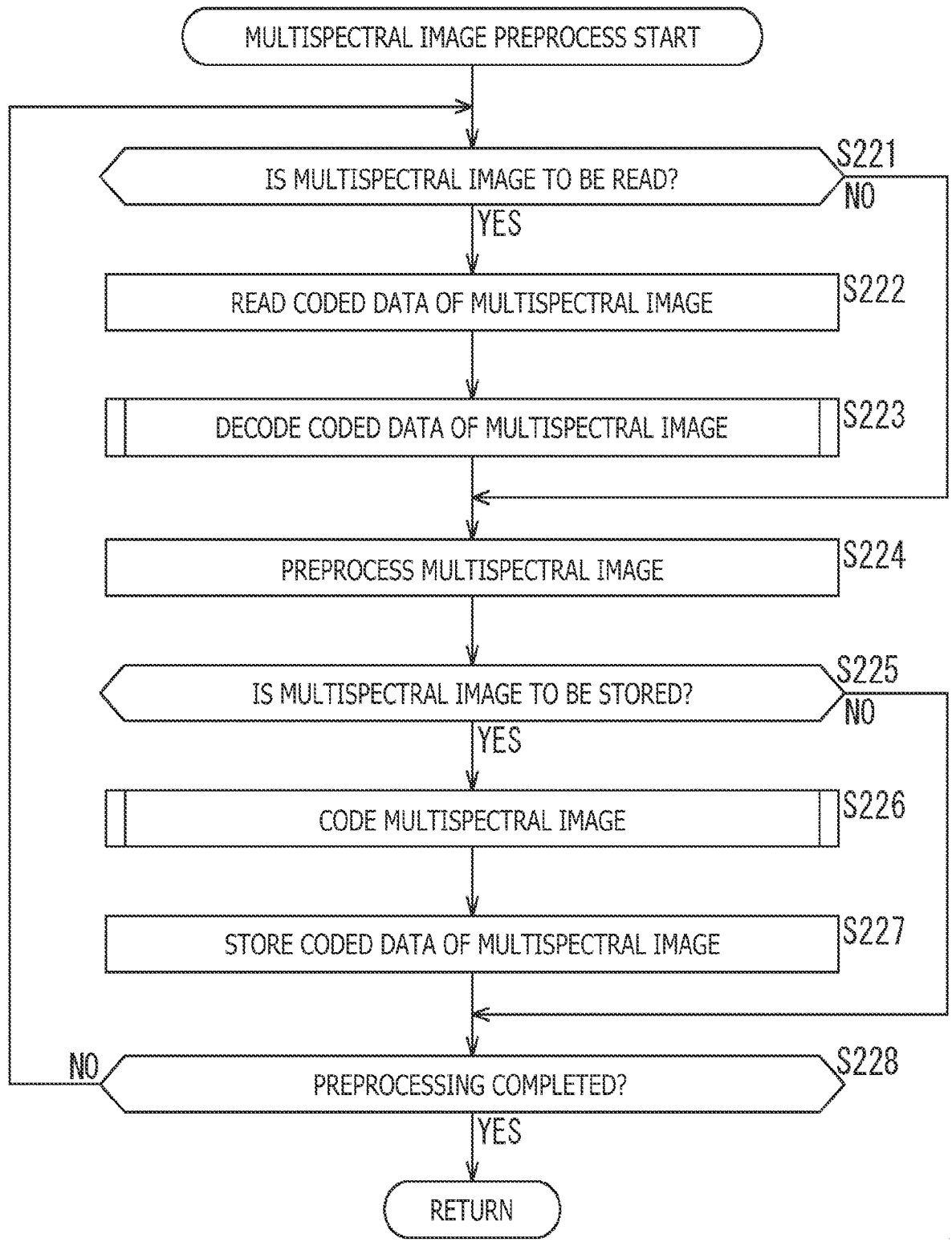
FIG. 15 is a flowchart explaining an example of a flow of a multispectral image preprocess.

With a start of the multispectral image generating process, the imaging element 101 executes respective processing from step S261 to step S265 similarly to respective processing in step S211 to S215 in FIG. 14.

After completion of processing in step S265, the imaging element 101 executes respective processing in step S266 and step S267 similarly to respective processing in step S114 and step S115.

After completion of processing in step S267, the multispectral image generating process ends, and the process returns to FIG. 5.

<Flow of Multispectral Image Signal Process>

Next, an example of a flow of the multispectral image signal process executed in step S102 of FIG. 5 in this case will be described with reference to a flowchart of FIG. 20.

With a start of the multispectral image signal process, the signal processing unit 102 executes respective processing in step S271 and step S272 similarly to respective processing in step S141 and S142 in FIG. 9.

Figure 16:
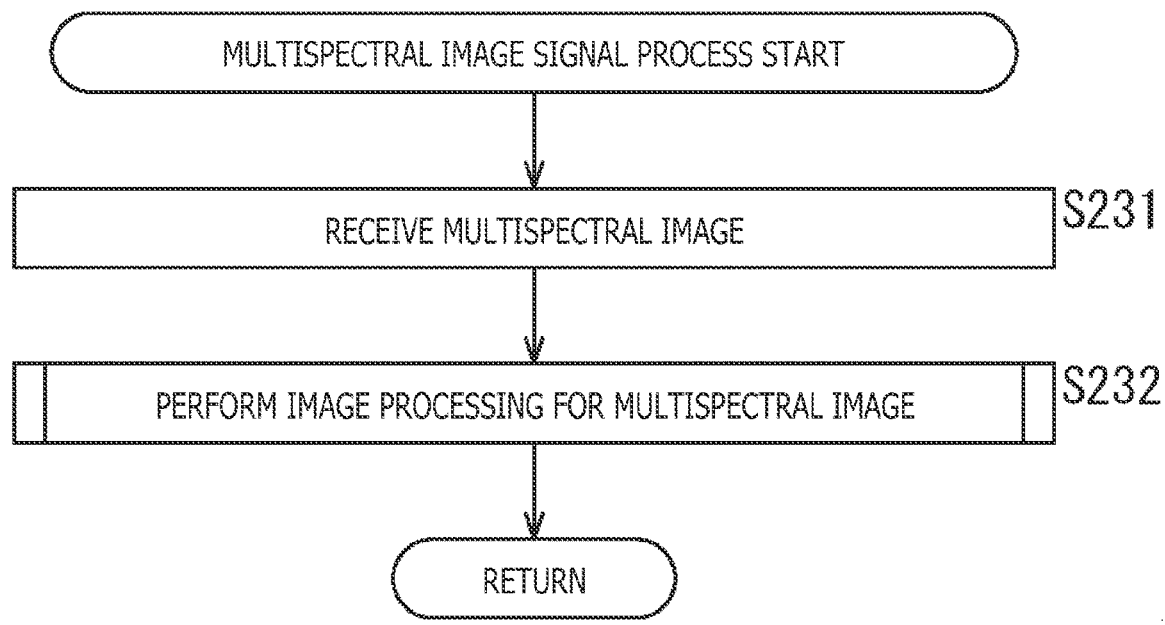
FIG. 16 is a flowchart explaining an example of a flow of a multispectral image signal process.
Figure 17:
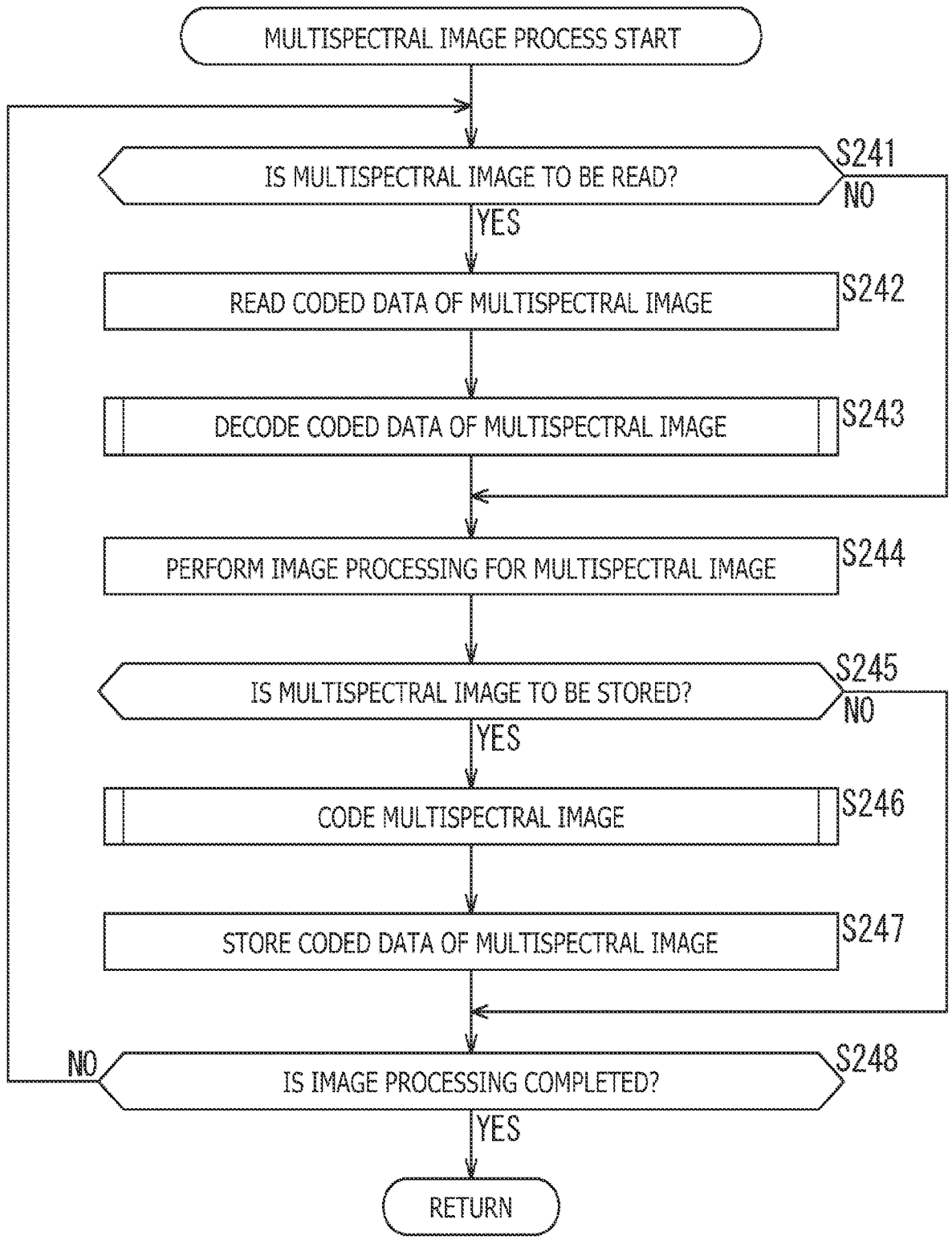
FIG. 17 is a flowchart explaining an example of a flow of a multispectral image signal process.

After completion of processing in step S272, the signal processing unit 102 executes processing in step S273 similarly to processing in step S232 in FIG. 16. In other words, the image processing unit 143 and the coding unit 241 to the decoding unit 243 perform the multispectral image process as described with reference to the flowchart of FIG. 17.

After completion of processing in step S273, the multispectral image signal process ends, and the process returns to FIG. 5.

Reduction of an increase in a load imposed by processing of multispectral image data is achievable by executing the respective processes in the manner described above.

4. Second Embodiment

Color Filter Arrangement Example of RGB Image

A Bayer array is an example of color filter arrangement patterns of respective pixels provided on a light reception unit of an imaging element which generates an RGB image as a captured image. Each of arrangement patterns 301 depicted in FIG. 21A represents an arrangement pattern of this Bayer array. In FIG. 21A, a small square to which a character R, G, or B is given for convenience of explanation indicates a color filter of one pixel. The color filter to which the character R is given indicates a color filter of an R (red) pixel, the color filter to which the character G is given indicates a color filter of a G (green) pixel, and the color filter to which the character B is given indicates a color filter of a B (blue) pixel. Each of ranges surrounded by thick frames indicates an arrangement pattern including these color filters.

Specifically, each of the arrangement patterns 301 includes color filters of two pixels (longitudinally) by two pixels (laterally). In a case of the arrangement pattern 301 (Bayer array), color filters R, G, G, and B are sequentially arranged in an order of an upper left, an upper right, a lower left, and a lower right. The arrangement patterns 301 thus configured are arranged in the pixel array of the light reception unit. Depicted in FIG. 21A is an example where the two arrangement patterns 301 (longitudinally) by two arrangement patterns 301 (laterally) are arranged. In an actual situation, however, the number of the arrangement patterns 301 corresponding to the scale of the pixel array are arranged in the pixel array of the light reception unit.

Figure 21B:
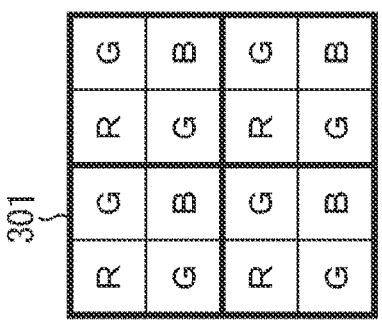
FIGS. 21A and 21B depict diagrams illustrating an example of coding of an RGB image.
Figure 21A:
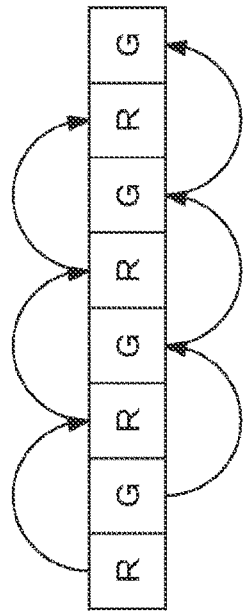

For example, in a case where image data (RGB image data) generated by the light reception unit which includes the pixel array containing the color filters having the arrangement patterns 301 thus configured is coded by simple coding using DPCM processing as in FIG. 3A, the coding unit (DPCM processing unit) used in this case calculates (predicts) a difference between pixels located two pixels away from each other (every other pixel) as indicated in FIG. 21B.

In addition, in a case where coded data of image data generated by s coding (RGB image data) is decoded by simple decoding using inverse DPCM processing as in FIG. 4A, for example, a decoding unit (inverse DPCM processing unit) used in this case restores pixel data of each pixel on the basis of a difference between pixels located two pixels away from each other (every other pixel) as indicated in FIG. 21B.

Accordingly, in this case, coding and decoding are performed using a difference between pieces of pixel data included in the same wavelength band.

Color Filter Arrangement Example 1 of
Multispectral Image

A prediction system used for coding of multispectral image data may correspond to different pixel patterns different from the pixel patterns of the imaging unit.

For example, the imaging unit may include a pixel array where plural pixel patterns each including five or more pixels arranged under a predetermined rule and performing photoelectric conversion of light in wavelength bands different from each other are arranged. In this case, the coding unit may perform simple coding for multispectral image data generated by the imaging unit, by using a system which codes different image data generated by a different imaging unit including a different pixel array where plural different pixel patterns different from the pixel patterns of the imaging unit in pixel arrangement and number of constituent pixels are arranged, with use of a difference in pixel data between a pair of pixels belonging to the above different pixel patterns different from each other and included in the same wavelength band.

For example, in the case of the imaging apparatus 100 (FIG. 2, 12, or 18) which generates the multispectral image described above as a captured image in the first embodiment, the coding unit of the imaging apparatus 100 (e.g., the coding unit 132, the coding unit 231, and the coding unit 241) may adopt a coding method similar to the method used in the case of the RGB image described above. Specifically, the DPCM processing unit 151 may calculate (predict) a difference in pixel data between pixels located two pixels away from the pixel (every other pixel).

Figures 22A, 22B:
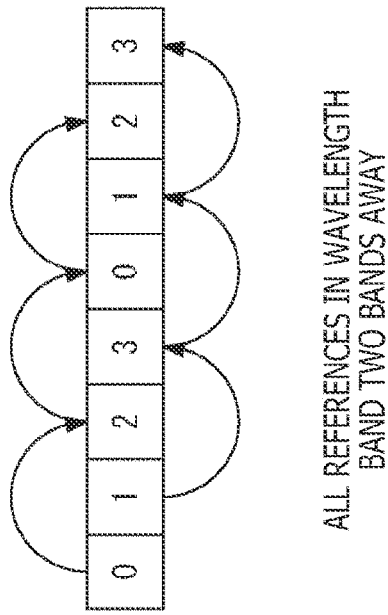
FIGS. 22A and 22B depict diagrams illustrating an example of coding of a multispectral image.

In FIGS. 22A and 22B, FIG. 22A depicts an example of arrangement patterns of filters arranged in the pixel array of the multispectral light reception unit 121 in a manner basically similar to the manner in FIG. 21. Specifically, each of small squares indicates a filter limiting a wavelength range of light entering one pixel, while each of ranges surrounded by thick frames indicates an arrangement pattern including these color filters.

Note that the filter of each of the pixels is given a numeral for identification of a wavelength band in the case of FIG. 22A. Specifically, an arrangement pattern 302 depicted in FIG. 22A includes filters in 16 types of wavelength band different from each other and identified by numerals of "0" to "15." These numerical values are given in an order of a wavelength band position (order of wavelength size). A smaller numerical value indicates a longer wavelength band, and a larger numerical value indicates a shorter wavelength band. For example, numerical values closer to each other indicate wavelength bands located closer to each other. Note that a range of each wavelength band (center wavelength and range size) may be any range.

As indicated in FIG. 22A, each of the arrangement patterns 302 includes filters of 16 types in incident light wavelength bands different from each other and arranged four filters (longitudinally) by four filters (laterally). The respective filters "0" to "15" are arranged in an order of raster scan for the arrangement of four filters by four filters. Specifically, pixels in wavelength bands located two bands away from each other (every other wavelength band) are arranged two pixels away from each other (every other pixel) in the lateral direction in the figure.

The arrangement patterns of the filters arranged in the pixel array of the multispectral light reception unit 121 have the arrangement patterns 302 described above, and the coding unit 132, the coding unit 231, and the coding unit 241 perform simple coding by a system similar to the system in the case of RGB image data (i.e., the DPCM processing unit 151 calculates (predicts) a difference in pixel data between pixels located two pixels away from each other (every other pixel)). In this case, a difference in pixel data between pixels in wavelength bands located two bands away from each other (every other wavelength band) is calculated and used for simple decoding as depicted in FIG. 22B.

In other words, in this case, a difference in pixel data between pixels in different wavelength bands is used for simple coding. Normally, in a case of pixels located sufficiently close to each other, a correlation between pixel values increases as wavelength bands are closer to each other. Accordingly, prediction accuracy in the prediction described above lowers in comparison with the case of RGB image described above.

However, simple coding for multispectral image data can be performed using a coding system corresponding to RGB images (i.e., existing coding system). Accordingly, a cost increase produced by development, manufacture, or the like can be reduced.

Decoding may similarly be performed. A prediction system used for decoding of coded data of multispectral image data may correspond to pixel patterns different from the pixel patterns of the imaging unit. For example, the imaging unit may include a pixel array which includes plural pixel patterns each including five or more pixels arranged under a predetermined rule and performing photoelectric conversion of light in wavelength bands different from each other. In this case, the coding unit may perform simple coding for multispectral image data generated by the imaging unit, by using a system which codes different image data generated by a different imaging unit including a different pixel array where plural different pixel patterns different from the pixel patterns of the imaging unit in pixel arrangement and number of constituent pixels are arranged, with use of a difference in pixel data between a pair of pixels belonging to the above different pixel patterns different from each other and included in the same wavelength band. In addition, the decoding unit may perform simple decoding for coded data generated by the coding unit, by using a system which decodes coded data of the above different image data with use of a difference in pixel data between a pair of pixels belonging to the above different pixel patterns different from each other and included in the same wavelength band.

For example, in the case of the imaging apparatus 100 (FIG. 2, 12, or 18) which generates the multispectral image described above as a captured image in the first embodiment, the decoding unit of the imaging apparatus 100 (e.g., the decoding unit 142, the decoding unit 232, and the decoding unit 243) may adopt a decoding method similar to the method used in the case of the RGB image described above. Specifically, the inverse DPCM processing unit 173 may use (predict) a difference in pixel data between pixels located two pixels away from each other (every other pixel).

The arrangement patterns of the filters arranged in the pixel array of the multispectral light reception unit 121 have the arrangement patterns 302 depicted FIG. 22B, and the decoding unit 142, the decoding unit 232, and the decoding unit 243 perform simple decoding by a system similar to the system in the case of RGB image data (i.e., the inverse DPCM processing unit 173 performs inverse DPCM processing for a difference value in pixel data between pixels located two pixels away from each other (every other pixel)). In this case, the difference in pixel data between pixels in wavelength bands located two bands away from each other (every other wavelength band) is used for simple decoding as depicted in FIG. 22B.

In other words, in this case, a difference in pixel data between pixels in different wavelength bands is used for simple decoding. Accordingly, prediction accuracy lowers in comparison with the case of RGB image as described above.

However, simple decoding for coded data of multispectral image data can be performed using a decoding system corresponding to RGB images (i.e., existing decoding system). Accordingly, a cost increase produced by development, manufacture, or the like can be reduced.

Color Filter Arrangement Example 2 of Multispectral Image

Further, the imaging unit may be designed such that the pixel patterns match a prediction system of an existing coding unit (in a manner achieving more approximation in a feasible range). For example, the imaging unit may have a pixel pattern which includes 16 pixels photoelectrically converting light included in wavelength bands different from each other and arranged such that two pixels photoelectrically converting light in adjacent wavelength bands are arranged two pixels away from each other. In this case, the coding unit may perform simple coding for multispectral image data generated by the imaging unit, with use of a difference in pixel data between a pair of pixels arranged two pixels away from each other.

Figures 23A, 23B:
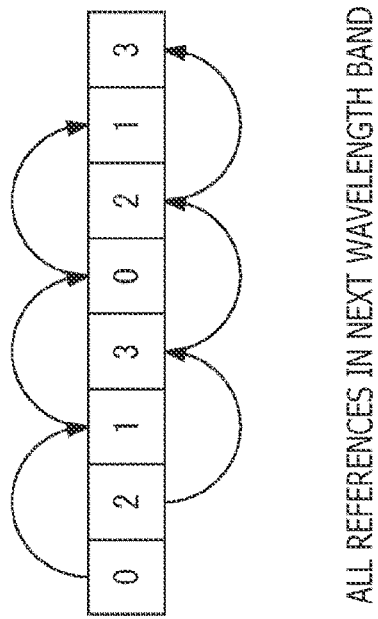
FIGS. 23A and 23B depict diagrams illustrating an example of coding of a multispectral image.

For example, according to the imaging apparatus 100 (FIG. 2, 12, or 18) which generates the multispectral image described above as a captured image in the first embodiment, in a case where the coding unit (i.e., the coding unit 132, the coding unit 231, and the coding unit 241) of the imaging apparatus 100 adopts a coding method similar to the coding method in the case of RGM images described above (i.e., the DPCM processing unit 151 calculates a difference in pixel data between a pixel and a pixel located two pixels away from the pixel (every other pixel)), the arrangement patterns of the filters arranged in the pixel array of the multispectral light reception unit 121 may be the arrangement patterns 303 depicted in FIG. 23A.

In FIGS. 23A and 23B, FIG. 23A depicts an example of arrangement patterns of filters arranged in the pixel array of the multispectral light reception unit 121 in a manner basically similar to the manner in FIG. 22A. In the case of the arrangement pattern 303 depicted in FIG. 23A, a filter "0," a filter "2," a filter "1," a filter "3," a filter "4," a filter "6," a filter "5," a filter "7," a filter "8," a filter "10," a filter "9," a filter "11," a filter "12," a filter "14," a filter "13," and a filter "15" are arranged in an order of raster scan for an arrangement of four filters (longitudinally) by four filters (laterally). Specifically, pixels in adjoining wavelength bands (wavelength bands next to each other) are arranged two pixels away from each other (every other pixel) in the lateral direction of the figure.

The arrangement patterns of the filters arranged in the pixel array of the multispectral light reception unit 121 have the arrangement patterns 303 described above, and the coding unit 132, the coding unit 231, and the coding unit 241 perform simple coding by a system similar to the system in the case of RGB image data (i.e., the DPCM processing unit 151 calculates (predicts) a difference in pixel data between pixels located two pixels away from each other (every other pixel)). In this case, a difference in pixel data between pixels in adjoining wavelength bands (wavelength bands next to each other) is calculated and used for simple coding as depicted in FIG. 23B.

In other words, in this case, a difference in pixel data between pixels in different wavelength bands is used for simple coding similarly to the case of the arrangement pattern 302. However, a difference in pixel data between pixels closer to each other than in the case of the arrangement pattern 302 is allowed to be used. Accordingly, prediction accuracy in this case improves more than in the case of the arrangement pattern 302.

Decoding may similarly be performed. The imaging unit may be designed such that the pixel patterns match a prediction system of an existing decoding unit (in a manner achieving more approximation in a feasible range). For example, the imaging unit may have a pixel pattern which includes 16 pixels photoelectrically converting light included in wavelength bands different from each other and arranged such that two pixels photoelectrically converting light in adjacent wavelength bands are arranged two pixels away from each other. In this case, the coding unit may perform simple coding for multispectral image data generated by the imaging unit, with use of a difference in pixel data between a pair of pixels arranged two pixels away from each other. In addition, the decoding unit may perform simple decoding for the coded data generated by the coding unit, with use of a difference in pixel data between a pair of pixels arranged two pixels away from each other.

For example, according to the imaging apparatus 100 (FIG. 2, 12, or 18) which generates the multispectral image described above as a captured image in the first embodiment, in a case where the decoding unit (i.e., the decoding unit 142, the decoding unit 232, and the decoding unit 243) of the imaging apparatus 100 adopts a decoding method similar to the decoding method in the case of RGM images described above (i.e., the inverse DPCM processing unit 173 performs inverse DPCM processing for a difference value in pixel data between pixels located two pixels away from each other (every other pixel)), the arrangement patterns of the filters arranged in the pixel array of the multispectral light reception unit 121 may be the arrangement patterns 303 depicted in FIG. 23A.

The arrangement patterns of the filters arranged in the pixel array of the multispectral light reception unit 121 have the arrangement patterns 303 depicted above, and the decoding unit 142, the decoding unit 232, and the decoding unit 243 perform simple decoding by a system similar to the system in the case of RGB image data (i.e., the inverse DPCM processing unit 173 performs inverse DPCM processing for a difference value in pixel data between pixels located two pixels away from each other (every other pixel)). In this case, a difference in pixel data between pixels in adjoining wavelength bands (wavelength bands next to each other) is used for simple decoding as depicted in FIG. 23B.

In other words, in this case, a difference in pixel data between pixels in different wavelength bands is used for simple decoding similarly to the case of the arrangement pattern 302. However, a difference in pixel data between pixels closer to each other than in the case of the arrangement pattern 302 is allowed to be used. Accordingly, prediction accuracy in this case improves more than in the case of the arrangement pattern 302.

Color Filter Arrangement Example 3 of Multispectral Image

Note that a method which calculates (predicts) a difference in plural directions (two-dimensionally) may be adopted for coding and decoding of RGB image data. For example, as depicted in FIG. 24A, there is a method which calculates (predicts) a difference in three directions of a longitudinal direction, a lateral direction, and an oblique direction. Each of the coding unit (e.g., the coding unit 132, the coding unit 231, and the coding unit 241) and the decoding unit (e.g., the decoding unit 142, the decoding unit 232, and the decoding unit 243) of the imaging apparatus 100 may adopt such a method.

In this case, when the filters arranged in the pixel array of the multispectral light reception unit 121 have the arrangement patterns 302 as depicted in FIG. 24B, the DPCM processing unit 151 calculates a difference in pixel data between pixels in wavelength bands located two bands away from each other for the horizontal direction (lateral direction in the figure), calculates a difference in pixel data between pixels in wavelength bands located eight bands away from each other for the vertical direction (longitudinal direction in the figure), and calculates a difference in pixel data between pixels in wavelength bands located six or ten bands away from each other for the oblique direction.

Similarly, the inverse DPCM processing unit 173 performs inverse DPCM processing for a difference value in pixel data between pixels in wavelength bands located two bands away from each other for the horizontal direction (lateral direction in the figure), performs inverse DPCM processing for a difference value in pixel data between pixels in wavelength bands located eight bands away from each other for the vertical direction (longitudinal direction in the figure), and performs inverse DPCM processing for a difference value in pixel data between pixels in wavelength bands located six or ten bands away from each other for the oblique direction.

Accordingly, used for simple coding and simple decoding are a difference in pixel data between pixels in wavelength bands located two bands away from each other in the horizontal direction (lateral direction in the figure), a difference in pixel data between pixels in wavelength bands located eight bands away from each other for the vertical direction (longitudinal direction in the figure), and a difference in pixel data between pixels in wavelength bands located six or ten bands away from each other for the oblique direction.

FIG. 25 depicts an example of arrangement patterns of filters arranged in the pixel array of the multispectral light reception unit 121 in a manner basically similar to the manner in FIG. 22A. In the case of the arrangement pattern 304 depicted in FIG. 25, a filter "0," a filter "4," a filter "1," a filter "5," a filter "8," a filter "12," a filter "9," a filter "13," a filter "2," a filter "6," a filter "3," a filter "7," a filter "10," a filter "14," a filter "11," and a filter "15" are arranged in an order of raster scan for an arrangement of four filters (longitudinally) by four filters (laterally).

When the filters arranged in the pixel array of the multispectral light reception unit 121 have the arrangement patterns 304, the DPCM processing unit 151 calculates a difference in pixel data between pixels in wavelength bands located next to each other for the horizontal direction (lateral direction in the figure), a difference in pixel data between pixels in wavelength bands located two bands away from each other for the vertical direction (longitudinal direction in the figure), and a difference in pixel data between pixels in wavelength bands located next to each other or three bands away from each other for the oblique direction.

Similarly, the inverse DPCM processing unit 173 performs inverse DPCM processing for a difference value in pixel data between pixels in wavelength bands located next to each other for the horizontal direction (lateral direction in the figure), performs inverse DPCM processing for a difference value in pixel data between pixels in wavelength bands located two bands away from each other for the vertical direction (longitudinal direction in the figure), and performs inverse DPCM processing for a difference value in pixel data between pixels in wavelength bands located next to each other or three bands away from each other for the oblique direction.

Accordingly, used for simple coding and simple decoding are, for the horizontal direction (lateral direction in the figure), a difference in pixel data between pixels in wavelength bands located next to each other for the horizontal direction (lateral direction in the figure), a difference in pixel data between pixels in wavelength bands located two bands away from each other for the vertical direction (longitudinal direction in the figure), and a difference in pixel data between pixels in wavelength bands located next to each other or three bands away from each other for the oblique direction.

Accordingly, by designating the arrangement patterns 304 as the arrangement patterns of the filters arranged in the pixel array of the multispectral light reception unit 121, prediction accuracy improves more than in the case of the arrangement patterns 302.

Color Filter Arrangement Example 4 of Multispectral Image

Note that a method which changes a prediction direction according to a wavelength band (i.e., a method not equalizing prediction directions of all pixels) may be adopted for coding and decoding of RGB image data. For example, for an R pixel and a B pixel, a difference is calculated (predicted) for each of three directions of the longitudinal, lateral, and oblique directions as depicted in FIG. 26A. For a G pixel, a difference is calculated (predicted) for three directions in total of the lateral and the two oblique directions as depicted in FIG. 26B. Each of the coding unit (e.g., the coding unit 132, the coding unit 231, and the coding unit 241) and the decoding unit (e.g., the decoding unit 142, the decoding unit 232, and the decoding unit 243) of the imaging apparatus 100 may adopt such a method.

In this case, when the filters arranged in the pixel array of the multispectral light reception unit 121 have the arrangement patterns 302 as depicted in FIG. 26C, the DPCM processing unit 151 calculates, for pixels at positions corresponding to R pixels and B pixels, a difference in pixel data between pixels in wavelength bands located two bands away from each other for the horizontal direction (lateral direction in the figure), a difference in pixel data between pixels in wavelength bands located eight bands away from each other for the vertical direction (longitudinal direction in the figure), and a difference in pixel data between pixels in wavelength bands located six or ten bands away from each other for the oblique direction.

On the other hand, the DPCM processing unit 151 calculates, for pixels at positions corresponding to G pixels, a difference in pixel data between pixels in wavelength bands located two bands away from each other for the horizontal direction (lateral direction in the figure) and a difference in pixel data between pixels in wavelength bands located in a range from one to 11 bands away from each other for the oblique direction.

Similarly, the inverse DPCM processing unit 173 performs, for pixels at positions corresponding to R pixels and B pixels, inverse DPCM processing for a difference value in pixel data between pixels in wavelength bands located two bands away from each other for the horizontal direction (lateral direction in the figure), inverse DPCM processing for a difference value in pixel data between pixels in wavelength bands located eight bands away from each other for the vertical direction (longitudinal direction in the figure), and inverse DPCM processing for a difference value in pixel data between pixels in wavelength bands located six or ten bands away from each other for the oblique direction.

On the other hand, the inverse DPCM processing unit 173 performs, for pixels at positions corresponding to G pixels, inverse DPCM processing for a difference value in pixel data between pixels in wavelength bands located two bands away from each other for the horizontal direction (lateral direction in the figure) and inverse DPCM processing for a difference value in pixel data between pixels in wavelength bands located in a range from one to 11 bands away from each other for the oblique direction.

Accordingly, for pixels at positions corresponding to R pixels and B pixels, used for simple coding and simple decoding are a difference in pixel data between pixels in wavelength bands located two bands away from each other for the horizontal direction (lateral direction in the figure), a difference in pixel data between pixels in wavelength bands located eight bands away from each other for the vertical direction (longitudinal direction in the figure), and a difference in pixel data between pixels in wavelength bands located six or ten bands away from each other for the oblique direction. For pixels at positions corresponding to G pixels, used for simple coding and simple decoding are a difference in pixel data between pixels in wavelength bands located two bands away from each other for the horizontal direction (lateral direction in the figure) and a difference in pixel data between pixels in wavelength bands located in a range from one to 11 bands away from each other for the oblique direction.

FIG. 27 depicts an example of arrangement patterns of filters arranged in the pixel array of the multispectral light reception unit 121 in a manner basically similar to the manner in FIG. 22A. In the case of the arrangement pattern 305 depicted in FIG. 27, a filter "0," a filter "6," a filter "1," a filter "7," a filter "4," a filter "12," a filter "5," a filter "13," a filter "2," a filter "8," a filter "3," a filter "9," a filter "10," a filter "14," a filter "11," and a filter "15" are arranged in an order of raster scan for an arrangement of four filters (longitudinally) by four filters (laterally).

When the filters arranged in the pixel array of the multispectral light reception unit 121 have the arrangement patterns 305 described above, the DPCM processing unit 151 calculates, for pixels at positions corresponding to R pixels and B pixels, a difference in pixel data between pixels in wavelength bands located next to each other for the horizontal direction (lateral direction in the figure), a difference in pixel data between pixels in wavelength bands located two bands away from each other for the vertical direction (longitudinal direction in the figure), and a difference in pixel data between pixels in wavelength bands located next to or three bands away from each other for the oblique direction.

On the other hand, the DPCM processing unit 151 calculates, for pixels at positions corresponding to G pixels, a difference in pixel data between pixels in wavelength bands located next to each other for the horizontal direction (lateral direction in the figure) and a difference in pixel data between pixels in wavelength bands located in a range from one to five bands away from each other for the oblique direction.

Similarly, the inverse DPCM processing unit 173 performs, for pixels at positions corresponding to R pixels and B pixels, inverse DPCM processing for a difference value in pixel data between pixels in wavelength bands located next to each other for the horizontal direction (lateral direction in the figure), inverse DPCM processing for a difference value in pixel data between pixels in wavelength bands located two bands away from each other for the vertical direction (longitudinal direction in the figure), and inverse DPCM processing for a difference value in pixel data between pixels in wavelength bands located next to or three bands away from each other for the oblique direction.

On the other hand, the inverse DPCM processing unit 173 performs, for pixels at positions corresponding to G pixels, inverse DPCM processing for a difference value in pixel data between pixels in wavelength bands located next to each other for the horizontal direction (lateral direction in the figure) and inverse DPCM processing for a difference value in pixel data between pixels in wavelength bands located in a range from one to five bands away from each other for the oblique direction.

Accordingly, for pixels at positions corresponding to R pixels and B pixels, used for simple coding and simple decoding are a difference in pixel data between pixels in wavelength bands located next to each other for the horizontal direction (lateral direction in the figure), a difference in pixel data between pixels in wavelength bands located two bands away from each other for the vertical direction (longitudinal direction in the figure), and a difference in pixel data between pixels in wavelength bands located next to each other or three bands away from each other for the oblique direction. For pixels at positions corresponding to G pixels, used for simple coding and simple decoding are a difference in pixel data between pixels in wavelength bands located next to each other for the horizontal direction (lateral direction in the figure) and a difference in pixel data between pixels in wavelength bands located in a range from one to five bands away from each other for the oblique direction.

Accordingly, by designating the arrangement patterns 305 as the arrangement patterns of the filters arranged in the pixel array of the multispectral light reception unit 121, prediction accuracy improves more than in the case of the arrangement patterns 302.

<Flow of Simple Coding Process>

The simple coding process in each case of the arrangement patterns described in the present embodiment is performed in a manner basically similar to the manner of the case of the first embodiment (FIG. 7). More specifically, as presented in a flowchart of FIG. 28, the DPCM processing unit 151 in step S301 calculates (performs DPCM processing for calculating) a difference between the respective pixel values of a multispectral image and pixel values of different pixels having a positional relation similar to that of a Bayer array.

Respective processing in steps S302 and S303 is executed similarly to corresponding processing of the case of FIG. 7 (respective processing in steps S122 and S123).

In such a manner, multispectral image data can be coded using an existing coding system. Accordingly, reduction of a cost increase is achievable.

Figure 28:
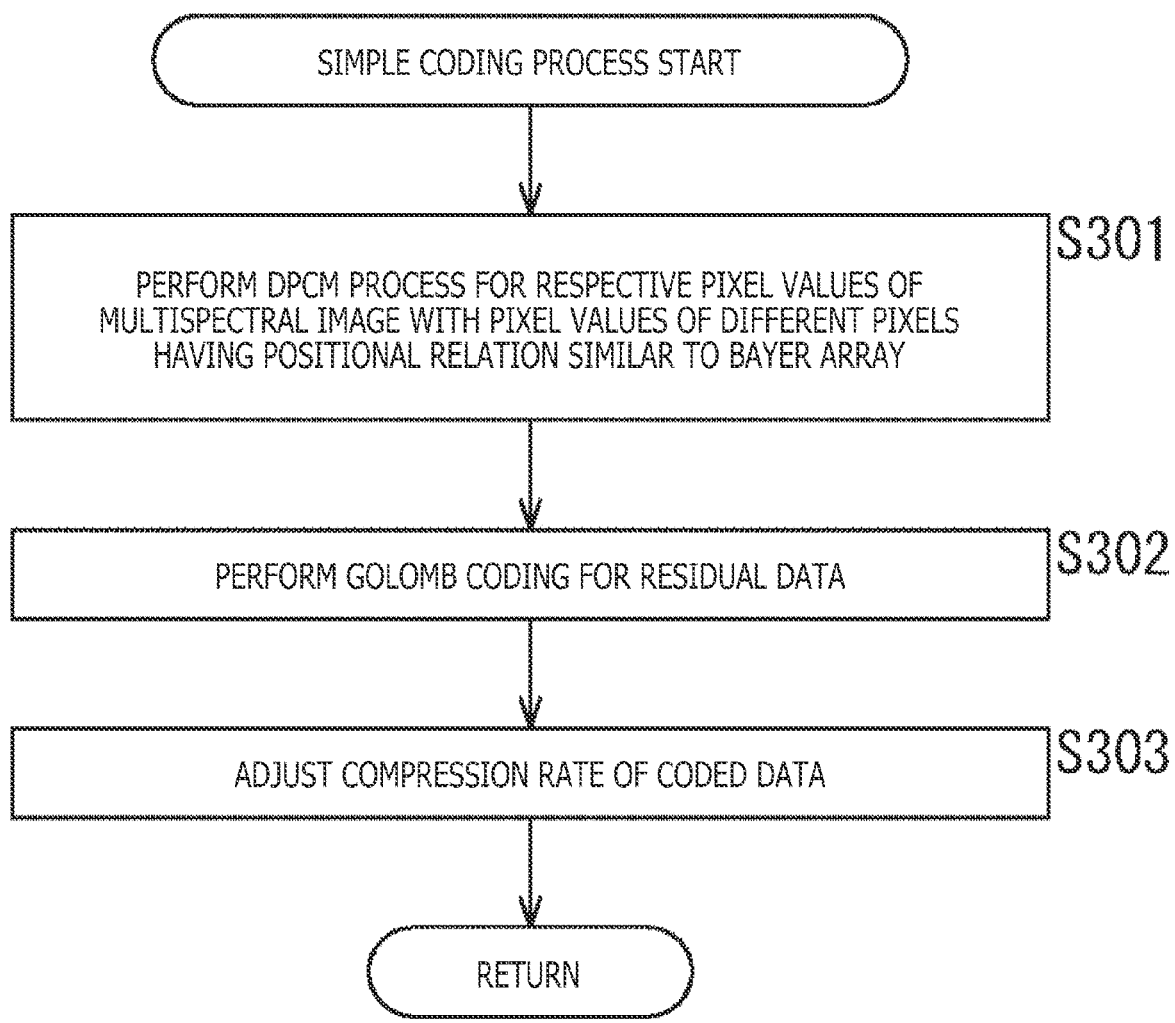
FIG. 28 is a flowchart explaining an example of a flow of a simple coding process.

Note that the simple decoding process is also only required to be performed in a manner basically similar to the manner of the case in the first embodiment (FIG. 10) (more specifically, the inverse DPCM process in step S153 is performed similarly to step S301 of FIG. 28). Accordingly, the same description is omitted. In such a manner, coded data of multispectral image data can be decoded using an existing decoding system. Accordingly, reduction of a cost increase is achievable.

<Imaging Apparatus>

Figure 29:
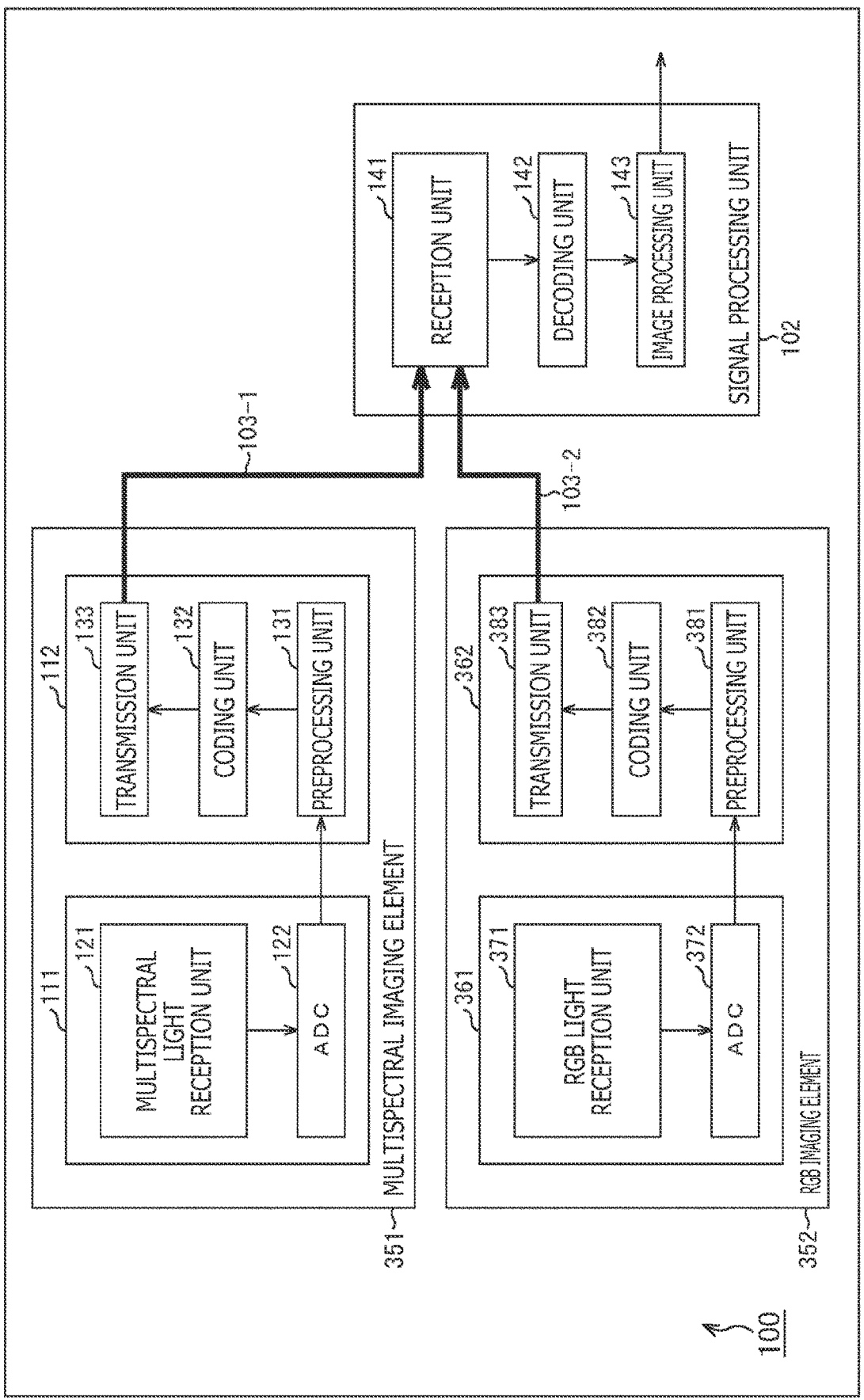
FIG. 29 is a block diagram depicting an example of a main configuration of an imaging apparatus.

According to the configuration described above, coded data of multispectral image data generated by respective imaging units having pixel patterns different from each other is decodable by a common decoding unit, for example. For example, as depicted in FIG. 29, the imaging apparatus 100 may include a multispectral imaging element 351, which generates a multispectral image as a captured image, and an RGB imaging element, which generates an RGB image as a captured image.

The multispectral imaging element 351 is an element similar to the imaging element 101 described in the first embodiment and has a configuration and a function similar to those of the imaging element 101, to perform processes similar to those of the imaging element 101. The transmission unit 133 of the multispectral imaging element 351 supplies coded data of multispectral image data generated by the coding unit 132 to the reception unit 141 of the signal processing unit 102 via a bus 103-1.

In addition, an RGB imaging element 352 has a function similar to that of the multispectral imaging element 351 except that a processing target is an RGB image, and performs similar processes. The RGB imaging element 352 has a semiconductor substrate 361 and a semiconductor substrate 362. The semiconductor substrate 361 includes an RGB light reception unit 371 and an ADC 372. In addition, the semiconductor substrate 362 includes a preprocessing unit 381, a coding unit 382, and a transmission unit 383.

The RGB light reception unit 371 which is a processing unit similar to the multispectral light reception unit 121 images an object and generates an RGB image as a captured image. The RGB light reception unit 371 supplies the generated data of the RGB image (RGB image data) to the ADC 372. The ADC 372 which is a processing unit similar to the ADC 122 converts the RGB image data supplied from the RGB light reception unit 371 into digital data, and supplies the digital data to the preprocessing unit 381.

The preprocessing unit 381 which is a processing unit similar to the preprocessing unit 131 performs predetermined preprocessing for the RGB image data supplied from the ADC 372, and supplies the processed RGB image data to the coding unit 382. The coding unit 382 which is a processing unit similar to the coding unit 132 performs simple coding for the RGB image data supplied from the preprocessing unit 381, to generate coded data, and supplies the generated coded data to the transmission unit 383. The transmission unit 383 which is a processing unit similar to the transmission unit 133 supplies the coded data of the RGB image to the reception unit 141 of the signal processing unit 102 via a bus 103-2.

The imaging apparatus 100 further includes the signal processing unit 102. The signal processing unit 102 processes both the multispectral image data generated by the multispectral imaging element 351 and the RGB image data generated by the RGB imaging element 352.

Specifically, the reception unit 141 processes both the coded data of the multispectral image generated by the multispectral imaging element 351 and the coded data of the RGB image generated by the RGB imaging element 352. The decoding unit 142 performs simple coding for both the received coded data of the multispectral image and the received coded data of the RGB image by the same coding system.

Accordingly, the number of the signal processing units 102 (decoding units 142) can be reduced more than in a case where the signal processing unit 102 (decoding unit 142) is provided for each imaging element. Accordingly, reduction of a cost increase is achievable.

While the imaging apparatus 100 includes two imaging elements in the example of FIG. 29, the number of imaging elements included in the imaging apparatus 100 may be any number, such as three or more. In addition, while FIG. 29 presents the example of the signal processing unit 102 (decoding unit 142) provided in common, the coding unit 132 may be provided in common. For example, plural light reception units (plural types of light reception units) may be provided within one imaging element, and the one coding unit 132 may code image data generated by the respective light reception units and having wavelength components different from each other. In such a manner, the number of the coding units 132 can be reduced. Accordingly, reduction of a cost increase is achievable.

APPLICATION EXAMPLES

Note that the arrangement patterns of the filters arranged in the pixel array of the multispectral light reception unit 121 may be any patterns and are not limited to the examples of the arrangement patterns 302 to 305 described above. For example, the number of the wavelength bands of the filters constituting the arrangement patterns may be any number equal to or larger than four. In addition, each shape of the arrangement patterns may be any shape other than the shape of four by four described above.

5. Third Embodiment

<Prediction Method of Multispectral Image>

Multispectral image data may be coded or decoded by a system which uses a difference between pieces of pixel data by a method corresponding to an arrangement of color filters in the imaging unit.

For example, the imaging unit may include a pixel array which includes plural pixel patterns each including five or more pixels arranged under a predetermined rule and performing photoelectric conversion of light in wavelength bands different from each other. In this case, the coding unit may perform simple coding for multispectral image data generated by the imaging unit, with use of a difference in pixel data between a pair of pixels belonging to pixel patterns different from each other and included in the same wavelength band. In such a manner, a decrease in coding efficiency can be reduced.

In addition, for example, the imaging unit may include a pixel array which includes plural pixel patterns each including five or more pixels arranged under a predetermined rule and performing photoelectric conversion of light in wavelength bands different from each other. In this case, the coding unit may perform simple coding for multispectral image data generated by the imaging unit, with use of a difference in pixel data between a pair of pixels belonging to pixel patterns different from each other and included in the same wavelength band. In addition, the decoding unit may perform simple decoding for the coded data generated by the coding unit, with use of a difference in pixel data between a pair of pixels belonging to pixel patterns different from each other and included in the same wavelength band. In such manner, a decrease in coding efficiency can be reduced.

For example, in the case of the imaging apparatus 100 (FIG. 2, 12, or 18) which generates the multispectral image described above as a captured image in the first embodiment, the coding unit (e.g., the coding unit 132, the coding unit 231, and the coding unit 241) of the imaging apparatus 100 may perform simple coding by a method corresponding to arrangement patterns of the filters arranged in the pixel array of the multispectral light reception unit 121 (the arrangement patterns for the multispectral image). Specifically, the DPCM processing unit 151 may calculate (predict) a difference in pixel data at pixel intervals corresponding to the arrangement patterns.

In addition, the decoding unit (e.g., the decoding unit 142, the decoding unit 232, and the decoding unit 243) of the imaging apparatus 100 may perform simple decoding by a method corresponding to the arrangement patterns of filters arranged in the pixel array of the multispectral light reception unit 121 (the arrangement patterns for the multispectral image). Specifically, the inverse DPCM processing unit 173 may perform inverse DPCM processing for a difference value of pixel data at pixel intervals corresponding to the arrangement patterns.

Figures 30A, 30B:
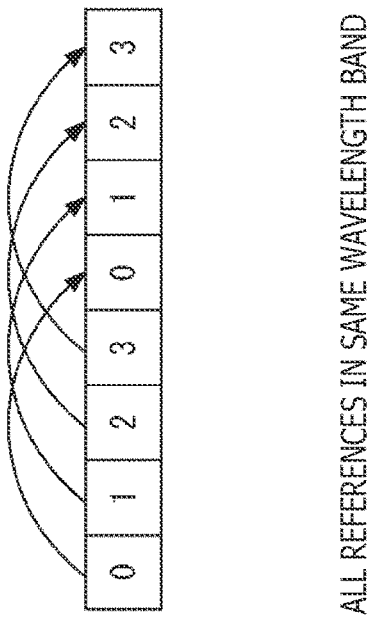
FIGS. 30A and 30B depict diagrams illustrating an example of coding of a multispectral image.

For example, in the imaging apparatus 100 (FIG. 2, 12, or 18) which generates the multispectral image described above as a captured image in the first embodiment, it is assumed that the filters arranged in the pixel array of the multispectral light reception unit 121 have arrangement patterns 401 depicted in FIG. 30A.

As depicted in FIG. 30B, the DPCM processing unit 151 calculates a difference in pixel data between a pair of pixels belonging to pixel patterns different from each other and included in the same wavelength band. Similarly, the inverse DPCM processing unit 173 performs inverse DPCM processing for a difference value in pixel data between a pair of pixels belonging to pixel patterns different from each other and included in the same wavelength band.

In this case, a difference in pixel data between pixels in different wavelength bands is thus used for simple coding and simple decoding. Accordingly, prediction accuracy in this case improves more than prediction accuracy achieved by the use of a difference in pixel data between pixels in different wavelength bands. Reduction of a decrease in coding efficiency is therefore achievable.

<Flow of Simple Coding Process>

In this case, the simple coding process is performed in a manner basically similar to the manner of the case of the first embodiment (FIG. 7). More specifically, as presented in a flowchart of FIG. 31, the DPCM processing unit 151 in step S401 calculates (performs DPCM processing for calculating) a difference between respective pixel values of a multispectral image and pixel values of different pixels in the same wavelength band as the pixels of the multispectral image.

Respective processing in steps S402 and S403 is executed similarly to corresponding processing of the case of FIG. 7 (respective processing in steps S122 and S123).

In such a manner, a decrease in coding efficiency can be reduced.

Note that the simple decoding process is also only required to be performed in a manner basically similar to the manner of the case in the first embodiment (FIG. 10) (more specifically, the inverse DPCM process in step S153 is performed similarly to step S401 of FIG. 31). Accordingly, the same description is omitted. In such a manner, a decrease in coding efficiency can be reduced.

6. Fourth Embodiment

<Application of Plural Prediction Systems>

Plural types of system which calculate a difference between pieces of pixel data (performs prediction of pixel data) may be applied for performing coding and decoding of multispectral image data.

For example, the imaging unit may include a pixel array which includes plural pixel patterns each including five or more pixels arranged under a predetermined rule and performing photoelectric conversion of light in wavelength bands different from each other. In this case, the coding unit may perform simple coding for multispectral image data generated by the imaging unit, with use of differences in pixel data between plural pairs of pixels located at relative positions different from each other. In such a manner, prediction accuracy can be increased, and a decrease in coding efficiency can be reduced.

More specifically, for example, the coding unit may perform simple coding for multispectral image data generated by the imaging unit, with use of a difference in pixel data between a pair of pixels belonging to pixel patterns different from each other and included in the same wavelength band and a difference in pixel data between a pair of pixels adjacent to each other. In this manner, prediction accuracy can be increased, and a decrease in coding efficiency can be reduced.

In addition, for example, the imaging unit may include a pixel array which includes plural pixel patterns each including five or more pixels arranged under a predetermined rule and performing photoelectric conversion of light in wavelength bands different from each other. In this case, the coding unit may perform simple coding for multispectral image data generated by the imaging unit, with use of differences in pixel data between plural pairs of pixels located at relative positions different from each other. In addition, the decoding unit may perform simple decoding for the coded data generated by the coding unit, with use of differences in pixel data between plural pairs of pixels located at relative positions different from each other. In such a manner, prediction accuracy can be increased, and a decrease in coding efficiency can be reduced.

More specifically, for example, the coding unit may perform simple coding for multispectral image data generated by the imaging unit, with use of a difference in pixel data between a pair of pixels belonging to pixel patterns different from each other and included in the same wavelength band and a difference in pixel data between a pair of pixels adjacent to each other, and the decoding unit may perform simple decoding for the coded data generated by the coding unit, with use of a difference in pixel data between a pair of pixels belonging to pixel patterns different from each other and included in the same wavelength band and a difference in pixel data between a pair of pixels adjacent to each other. In such a manner, prediction accuracy can be increased, and a decrease in coding efficiency can be reduced.

Figures 32A, 32B:
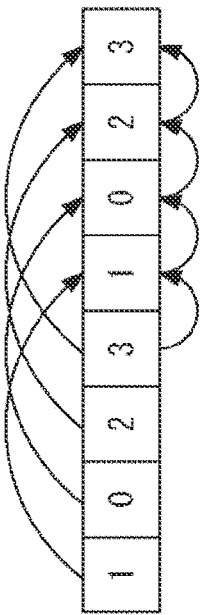
FIGS. 32A and 32B depict diagrams illustrating an example of coding of a multispectral image.

For example, in the case of the imaging apparatus 100 (FIG. 2, 12, or 18) which generates the multispectral image described above as a captured image in the first embodiment, it is assumed that the filters arranged in the pixel array of the multispectral light reception unit 121 have arrangement patterns 501 depicted in FIG. 32A.

In FIGS. 32A and 32B, FIG. 32A depicts an example of an arrangement pattern of filters arranged in the pixel array of the multispectral light reception unit 121 in a basically similar manner to that in FIG. 22A. In the case of the arrangement pattern 501 depicted in FIG. 32A, a filter "1," a filter "0," a filter "2," a filter "3," a filter "5," a filter "4," a filter "6," a filter "7," a filter "9," a filter "8," a filter "10," a filter "11," a filter "13," a filter "12," a filter "14," and a filter "15" are arranged in an order of raster scan for an arrangement of four filters (longitudinally) by four filters (laterally). Specifically, pixels in wavelength bands located next to or two bands away from each other are arranged next to each other in the lateral direction in the figure.

Moreover, the DPCM processing unit 151 of the coding unit (e.g., the coding unit 132, the coding unit 231, and the coding unit 241) of the imaging apparatus 100 is configured to calculate a difference in pixel data between pixels located next to each other and a difference between pixels located four pixels away from each other as depicted in FIG. 32B. Furthermore, the inverse DPCM processing unit 173 of the decoding unit (e.g., the decoding unit 142, the decoding unit 232, and the decoding unit 243) of the imaging apparatus 100 is configured to perform inverse DPCM processing for a difference value of pixel data between pixels located next to each other and a difference value of pixel data between pixels located four pixels away from each other as depicted in FIG. 32B.

In a case of application of a difference in pixel data between pixels located next to each other, a difference in pixel data between pixels in wavelength bands located next to or two bands away from each other can be used for simple coding and simple decoding. In addition, in a case of application of a difference in pixel data between pixels located four pixels away from each other, a difference in pixel data between pixels in the same wavelength band can be used for simple coding and simple decoding.

As described above, prediction accuracy can be improved by using plural prediction methods (references used for prediction). Accordingly, a decrease in coding efficiency can be reduced.

<Selection of Prediction System>

The plural systems described above may selectively be applied. For example, prediction accuracy of each system may be evaluated, and a system with a high evaluation may be selected. Any method may be used for this evaluation. For example, an evaluation may be made using SAD (Sum of Absolute Difference) (i.e., total of absolute values of respective differences). Specifically, SAD may be calculated for each of systems prepared beforehand, and a system with minimum SAD may be selected. A system with higher prediction accuracy is selectable in the manner described above. Accordingly, reduction of a decrease in coding efficiency is achievable.

Note that the inverse DPCM processing for simple decoding in this case is only required to be performed using a system corresponding to a prediction system selected for simple coding. Specifically, the DPCM processing unit 151 supplies information indicating a selected system to the inverse DPCM processing unit 173. The inverse DPCM processing unit 173 performs inverse DPCM processing on the basis of this information. In this manner, simple decoding can be performed correctly.

<Flow of Simple Coding Process>

An example of a flow of the simple coding process in this case will be described with reference to a flowchart in FIG. 33.

With a start of the simple coding process, the DPCM processing unit 151 in step S501 calculates SAD for each of prediction systems and selects a prediction system on the basis of the calculated SAD.

In step S502, the DPCM processing unit 151 performs DPCM processing using the prediction system selected in step S501. Respective processing in steps S503 and S504 is executed similarly to respective processing in steps S122 and S123 in FIG. 7. After completion of processing in step S504, the simple coding process ends.

A system with higher prediction accuracy is selectable in the manner described above. Accordingly, reduction of a decrease in coding efficiency is achievable.

Note that the simple decoding process is performed in a manner similar to the manner of the flowchart of FIG. 10. The inverse DPCM process in step S153 is performed by a system corresponding to the prediction system selected for the simple coding process.

<Calculation of Prediction Value>

Further, a prediction value may be calculated using results of plural prediction systems. For example, for simple coding, prediction may be performed using respective systems, and an average value of respective prediction results may be applied as a prediction value (difference value). For example, as presented in FIG. 34, a prediction value of a target pixel X of the DPCM process may be set to an average value of a prediction value P1 obtained from a reference pixel located four pixels away from the target pixel X and a prediction value P2 obtained from a reference pixel located next to the target pixel X (following Equation (1)).

$$\text{Prediction value of } X = (P1+P2) \gg 1 \quad (1)$$

Such method can increase the number of prediction systems (references). Accordingly, improvement of prediction accuracy and reduction of a decrease in coding efficiency are achievable.

Note that the inverse DPCM processing for simple decoding in this case is only required to be performed in a manner similar to the manner of the simple coding described above. Specifically, inverse DPCM processing is only required to be performed using an average value of respective prediction values. In such a manner, simple decoding can be performed correctly.

<Flow of Simple Coding Process>

An example of a flow of the simple coding process in such a case will be described with reference to a flowchart in FIG. 35.

With a start of the simple coding process, the DPCM processing unit 151 in step S521 performs DPCM processing for a multispectral image by using an average of prediction values of the respective prediction systems. Respective processing in steps S522 and S523 is executed similarly to respective processing in steps S122 and S123 in FIG. 7. After completion of processing in step S523, the simple coding process ends.

In such a manner, improvement of prediction accuracy and reduction of a decrease in coding efficiency are achievable.

Note that the simple decoding process is performed in a manner similar to the manner of the flowchart of FIG. 10. The inverse DPCM process in step S153 is performed using an average value of prediction values of respective prediction systems similarly to the case of the simple coding process.

While the example of the method which calculates an average has been described as an example of the calculation method of the prediction value hereinabove, the method of calculating the prediction value is not limited to this example and may be any method. For example, the sum total of the prediction values obtained by the respective prediction systems may be used, or an average of weighted respective prediction values may be calculated. Other any calculation results may be used. In addition, a central value, a maximum value, a minimum value, a mode value, or the like of prediction values obtained by respective prediction systems may be used.

<Selection of Wavelength Band Adaptive Prediction System>

In addition, a prediction system may be selected according to a wavelength band. For example, it is assumed that wavelength bands of filters of respective pixels are set as presented in graphs A to N in FIG. 36A. In such a case, prediction between pixels located at a short distance (pixel distance) may be adopted in the case of prediction between pixels in wavelength bands located at a short distance (wavelength distance), while prediction between pixels in the same wavelength band may be adopted for prediction in other wavelength bands.

Figure 36A:
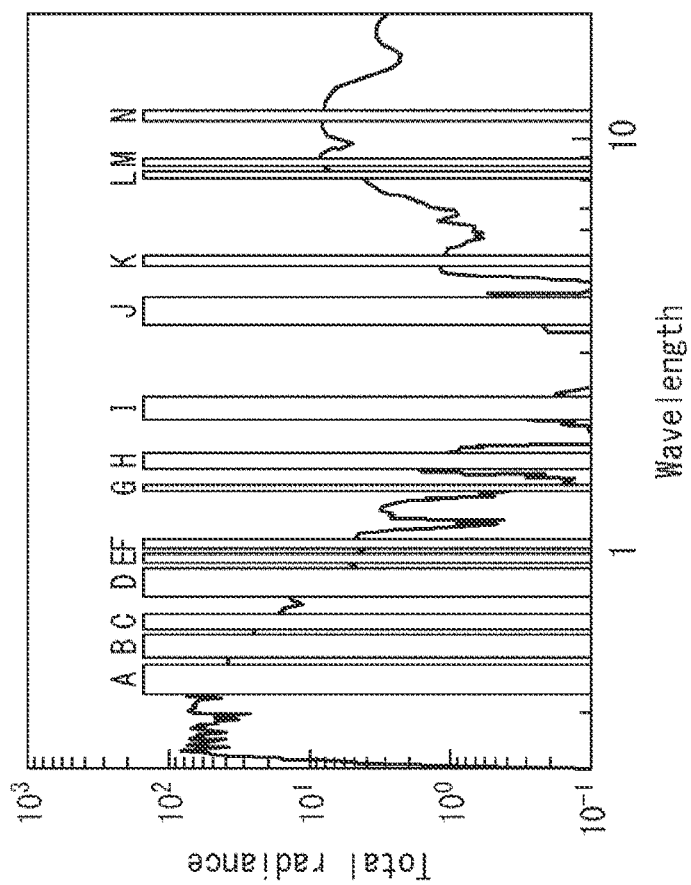
FIGS. 36A and 36B depict diagrams illustrating an example of coding of a multispectral image.

For example, in a case of FIG. 36A, prediction between pixels in wavelength bands A to C, prediction between pixels in wavelength bands D to F, prediction between pixels in wavelength bands G and H, and prediction between pixels in wavelength bands L and M are allowed. Prediction between pixels in the same wavelength band is adopted for other wavelength bands.

Figure 36B:
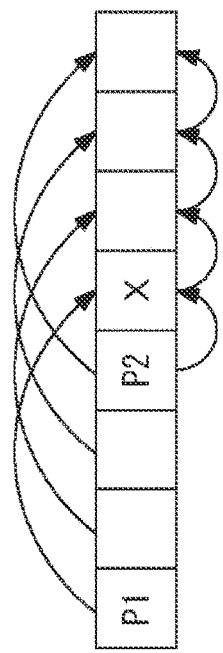

For example, in the case of use of a system for calculating a difference in pixel data between pixels located next to each other and a system for calculating a difference in pixel data between pixels located four pixels away from each other as depicted in FIG. 36B, a system for calculating a difference in pixel data between a processing target pixel and a pixel next to the processing target pixel (prediction between pixels in wavelength bands different from each other) is adopted in a case where the wavelength band of the pixel next to the processing target pixel and the wavelength band of the processing target pixel are located at a short wavelength distance (e.g., in the case of pixels having positional relations of the wavelength bands A to C, the wavelength bands D to F, the wavelength bands G and H, and the wavelength bands L and M). In the case of pixels having other positional relations, a system for calculating a difference in pixel data between the processing target pixel and a pixel located four pixels away from the processing target pixel (prediction between pixels in the same wavelength band) is adopted.

In a case of a short wavelength distance, a decrease in prediction accuracy is small. Accordingly, prediction between pixels located at a short pixel distance is adopted in consideration of a tendency that a correlation between pixels increases as a pixel distance decreases as an important factor. On the other hand, in a case of a long wavelength distance, a decrease in prediction accuracy increases even at a short pixel distance. Accordingly, prediction between these wavelength bands is prohibited. In other words, prediction between pixels in the same wavelength band is adopted for prediction other than prediction between pixels in wavelength bands at a short wavelength distance from each other. In such a manner, reduction of a decrease in prediction accuracy and reduction of a decrease in coding efficiency are achievable.

Note that the inverse DPCM processing for simple decoding in this case may be performed using a system corresponding to a prediction system selected for simple coding. Specifically, similarly to the case of the DPCM processing unit 151, the inverse DPCM processing unit 173 selects a prediction system according to a wavelength band and performs inverse DPCM processing. In such a manner, simple decoding can be performed correctly.

<Flow of Simple Coding Process>

Figure 37:
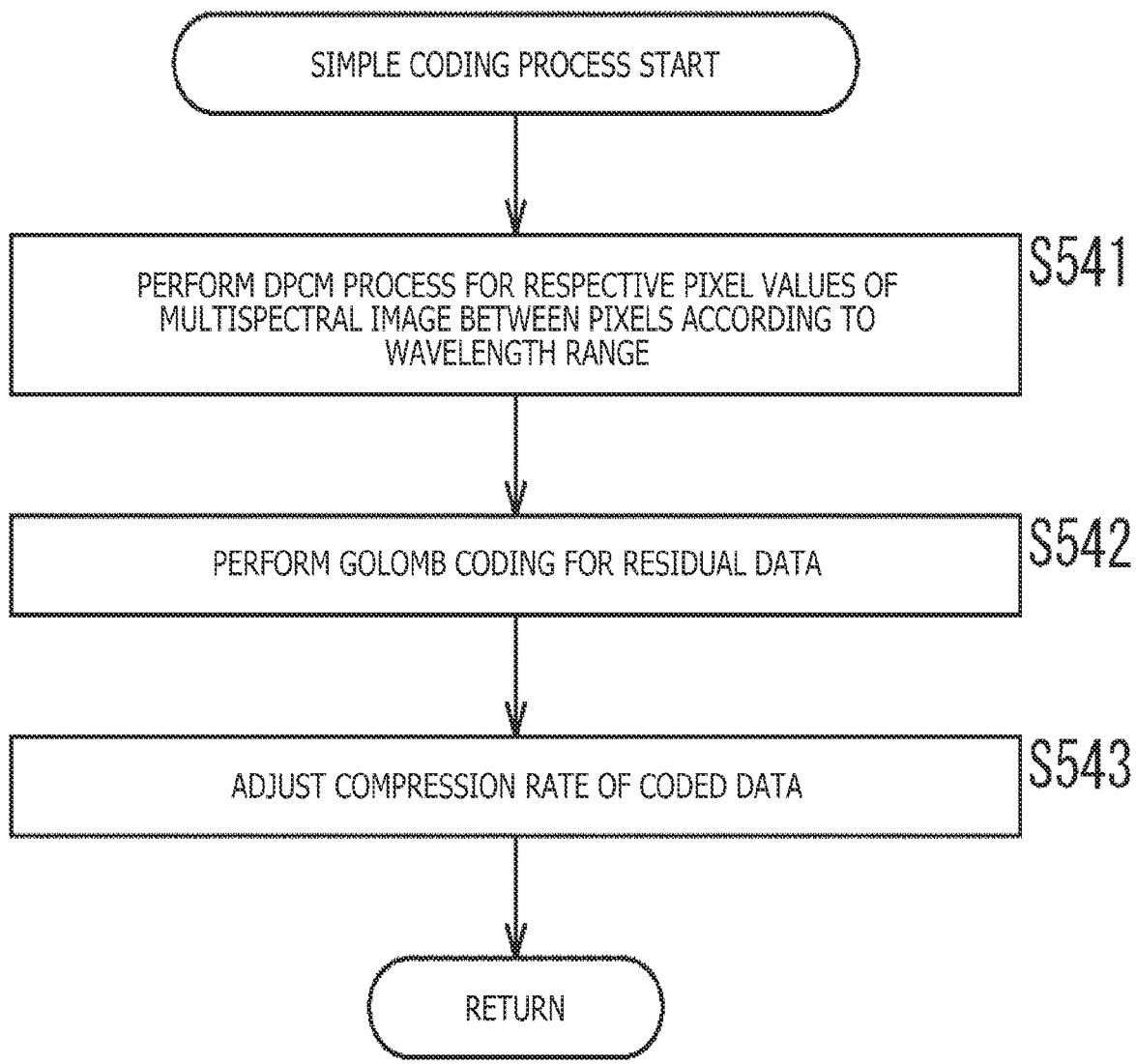
FIG. 37 is a flowchart explaining an example of a flow of a simple coding process.

An example of a flow of the simple coding process in such a case will be described with reference to a flowchart in FIG. 37.

With a start of the simple coding process, the DPCM processing unit 151 in step S541 performs DPCM processing for respective pixel values of a multispectral image between pixels according to wavelength bands of the pixels. Respective processing in steps S542 and S543 is executed similarly to respective processing in steps S122 and S123 in FIG. 7. After completion of processing in step S543, the simple coding process ends.

In such a manner, reduction of a decrease in prediction accuracy and reduction of a decrease in coding efficiency are achievable.

Note that the simple decoding process is performed in a manner similar to the manner of the flowchart of FIG. 10. The inverse DPCM process in step S153 is performed by a method corresponding to the wavelength band similarly to processing in step S541 of the simple coding process.

7. Supplementary Notes

<Wavelength Band of Multispectral Image>

The multispectral image described above in each of the embodiments may be any image as long as the image includes components in four or more wavelength bands. Accordingly, wavelengths of the components in the respective wavelength bands of the multispectral image may be any wavelengths. For example, the multispectral image may include components in wavelength bands of visible light or include none of these components. In addition, the multispectral image may include components in wavelength bands of invisible light or include none of these components.

Figure 38:
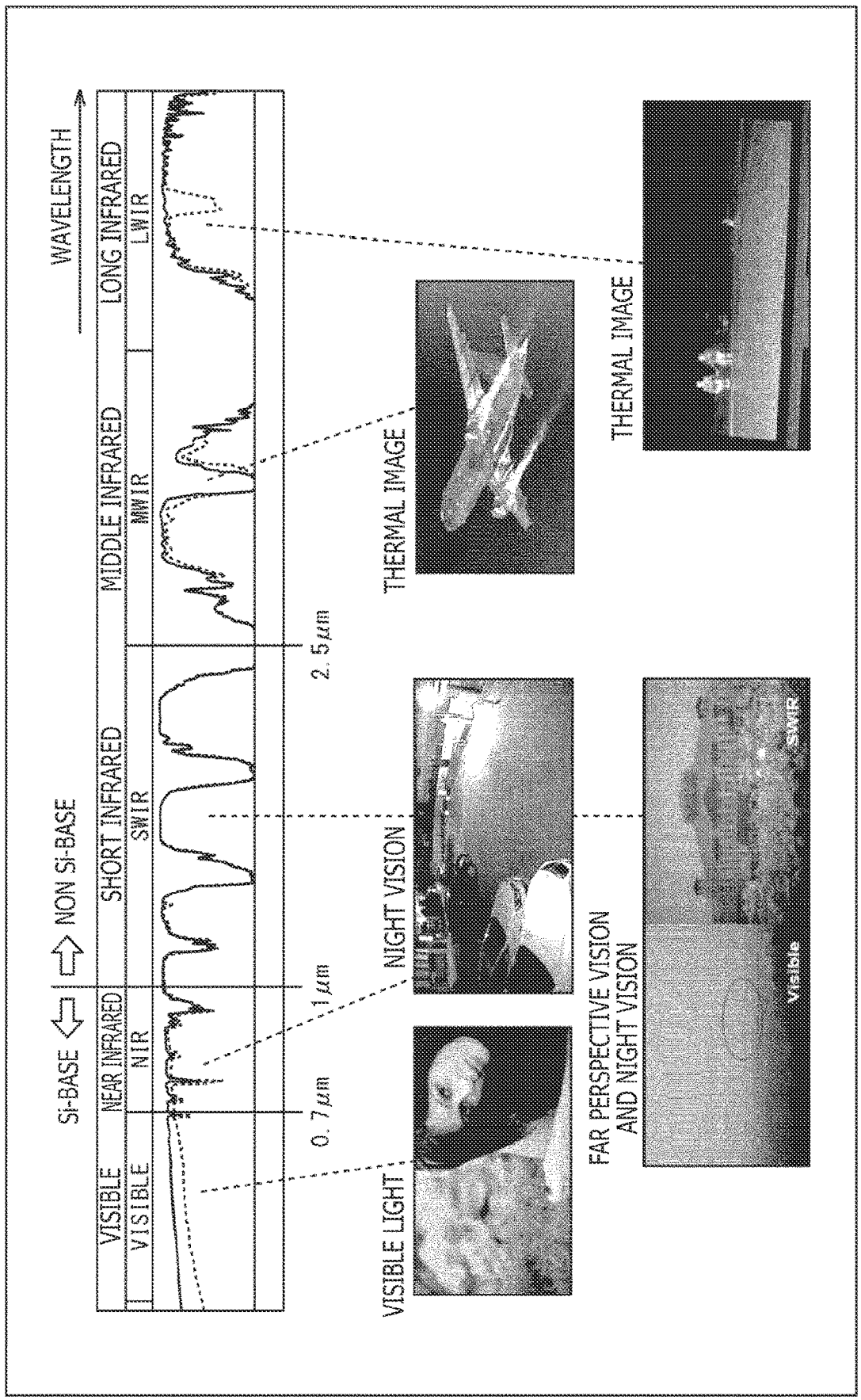
FIG. 38 is a diagram explaining use methods of wavelength bands.

For example, the multispectral image may include components in wavelength bands visible and acquirable by a CMOS (Complementary Metal Oxide Semiconductor) image sensor and in near infrared (NIR) wavelength bands in the respective wavelength bands depicted in FIG. 38.

<Computer>

A series of processes described above may be executed either by hardware or by software. In a case where the series of processes is executed by software, a program constituting the software is installed in a computer. Examples of the computer herein include a computer incorporated in dedicated hardware and a computer capable of executing various functions under various programs installed in the computer, such as a general-purpose personal computer.

FIG. 39 is a block diagram depicting a configuration example of hardware of a computer executing the series of processes described above under the program.

In a computer 900 depicted in FIG. 39, a CPU (Central Processing Unit) 901, a ROM (Read Only Memory) 902, and a RAM (Random Access Memory) 903 are connected to each other via a bus 904.

An input/output interface 910 is further connected to the bus 904. An input unit 911, an output unit 912, a storage unit 913, a communication unit 914, and a drive 915 are connected to the input/output interface 910.

The input unit 911 includes a keyboard, a mouse, a microphone, a touch panel, an input terminal, and the like, for example. The output unit 912 includes a display, a speaker, an output terminal, and the like, for example. The storage unit 913 includes a hard disk, a RAM disk, a non-volatile memory, and the like, for example. The communication unit 914 includes a network interface, for example. The drive 915 drives a removable medium 921 such as a magnetic disk, an optical disk, a magneto-optical disk, and a semiconductor memory.

According to the computer configured as above, the CPU 901 loads the program stored in the storage unit 913 into the RAM 903 via the input/output interface 910 and the bus 904, and executes the loaded program to perform the series of processes described above, for example. The RAM 903 also stores data necessary for the CPU 901 to execute various processes, as needed.

The program executed by the computer (CPU 901) is allowed to be recorded in the removable medium 921 such as a package medium and applied in this form. In such a case, the program is allowed to be installed in the storage unit 913 via the input/output interface 910 from the removable medium 921 attached to the drive 915.

Moreover, the program may be provided via a wired or wireless transfer medium such as a local area network, the Internet, and digital satellite broadcasting. In such a case, the program is allowed to be received by the communication unit 914 and installed in the storage unit 913.

Alternatively, the program may be installed in the ROM 902 or the storage unit 913 beforehand.

<Application Target of Present Technology>

The present technology is applicable to any image coding and decoding systems. Specifically, specifications of various processes associated with image coding and decoding are not limited to the examples described above and may be any specifications as long as no inconsistency with the present technology described above is produced.

In addition, while the present technology is applied to the imaging apparatus in the above description, the present technology may be applied to any apparatuses (electronic apparatuses) as well as the imaging apparatus. For example, the present technology is applicable to an image processing apparatus or the like which performs image processing for an image captured by high-digital-gain imaging performed by another apparatus.

Moreover, the present technology may be implemented as any configurations included in any apparatuses or apparatuses constituting any systems, such as a processor (e.g., video processor) as system LSI (large Scale Integration) or the like, a module including plural processors or the like (e.g., video module), a unit (e.g., video unit) including plural modules or the like, and a set (e.g., video set) including a unit to which other functions are further added (i.e., a configuration constituting a part of an apparatus).

Further, the present technology is also applicable to a network system including plural apparatuses. For example, the present technology is also applicable to a cloud service which provides services associated with images (moving images) for any terminals such as a computer, an AV (Audio Visual) apparatus, a portable information processing terminal, and an IoT (Internet of Things) device.

Note that a system, an apparatus, a processing unit, and others to which the present technology is applied can be used in any fields, such as transportation, medical treatments, crime prevention, agriculture, stock breeding, mining, beauty, plants, home appliances, meteorology, and nature monitoring. In addition, the present technology is applicable to any use applications.

For example, the present technology is applicable to a system or a device for providing appreciation content or the like. Moreover, for example, the present technology is also applicable to a system or a device used for transportation, such as monitoring traffic statuses and autonomous driving control. Further, for example, the present technology is applicable to a system or a device used for security. In addition, for example, the present technology is applicable to a system or a device used for automatic control of machines or the like. Further, for example, the present technology is applicable to a system or a device used for agriculture and stock breeding. Further, for example, the present technology is also applicable to a system or a device used for monitoring nature conditions such as volcanos, forests, and oceans, wildlife, and others. Furthermore, for example, the present technology is also applicable to a system or a device used for sports.

<Others>

Note that a "flag" in the present description refers to information for identifying plural states, including information used for identifying not only two states constituted by true (1) and false (0) states, but also three or more states. Accordingly, the "flag" may have two values constituted by 1 and 0, for example, or three or more values. The number of bits constituting the "flag" may be any number. The "flag" may thus be constituted by one bit or plural bits. Moreover, it is assumed that a bit stream includes not only identification information (including flag) but also difference information indicating a difference between the identification information and information as a certain reference. Accordingly, the "flag" and the "identification information" in the present description contain not only the corresponding information but also difference information indicating a difference from information as a reference.

Further, various kinds of information (e.g., metadata) concerning coded data (bit stream) may be transferred or recorded in any forms as long as the information is associated with the coded data. The term "associated" herein refers to a state where one data is made available (linked) during processing of other data, for example. Accordingly, respective pieces of data associated with each other may be combined into one piece of data or may be handled as separate pieces of data. For example, information associated with coded data (image) may be transferred via a transfer path different from a transfer path of this coded data (image). Moreover, for example, information associated with coded data (image) may be recorded in a recording medium different from a recording medium (or a different recording area of the same recording medium) of this coded data (image). Note that the "associated" state is not limited to a state of the entire data and may be a state of a part of the data. For example, an image and information associated with the image may be associated with each other in units of any frame, such as plural frames, one frame, or a part in a frame.

Note that each of terms such as "synthesize," "multiplex," "add," "integrate," "include," "store," "put into," "stick into," and "insert" in the present specification refers to combining plural pieces into one piece, such as combining coded data and metadata into one piece of data, and indicates one method of producing the "associated" state described above.

Further, embodiments of the present technology are not limited to the embodiments described above and may be modified in various manners without departing from the subject matters of the present technology.

In addition, for example, the present technology may be implemented as any configurations constituting apparatuses or systems, such as a processor as system LSI (Large Scale Integration) or the like, a module including plural processors or the like, a unit including plural modules or the like, and a set including a unit to which other functions are further added (i.e., a configuration constituting a part of an apparatus).

Note that a system in the present description refers to a collection of plural constituent elements (apparatuses, modules (parts), or the like). All of the constituent elements are not necessarily required to be included in an identical housing. Accordingly, both plural apparatuses accommodated in different housings and connected to each other via a network and one apparatus which includes plural modules accommodated in one housing are referred to as a system.

Moreover, for example, a configuration described as one apparatus (or processing unit) may be divided into plural apparatuses (or processing units). Conversely, a configuration described above as plural apparatuses (or processing units) may be combined into one apparatus (or processing unit). Further, needless to say, a configuration other than the configurations described above may be added to the respective apparatuses (or respective processing units). In addition, if configurations or operations as the entire system are substantially identical, a part of a configuration of a certain apparatus (or processing unit) may be included in a configuration of another apparatus (or another processing unit).

Moreover, for example, the present technology may have a configuration of cloud computing where one function is shared and processed by plural apparatuses in cooperation with each other via a network.

Further, for example, programs described above may be executed by any apparatus. In such a case, it is sufficient if the apparatus has a necessary function (e.g., a function block) and acquires necessary information.

In addition, for example, the respective steps described in the flowcharts described above may be executed by one apparatus or shared and executed by plural apparatuses. Moreover, in a case where one step includes plural processes, the plural processes included in the one step may be executed by one apparatus or shared and executed by plural apparatuses. In other words, plural processes included in one step may be executed as processes of plural steps. Conversely, processes described as plural steps may be combined and executed as one step.

Note that a program to be executed by a computer may be a program where processes of steps describing the program are executed in an order described in the present description in time series or separately executed in parallel or at necessary timing such as an occasion of a call. In other words, the processes of the respective steps may be executed in an order different from the order described above as long as no inconsistency is produced. Further, the processes of the steps describing the program may be executed in parallel with processes of other programs or may be executed in combination with other programs.

Note that plural aspects of the present technology presented in the present description may be practiced independently as separate aspects as long as no inconsistency is produced. Needless to say, any of the plural aspects of the present technology may be combined and practiced. For example, a part or all of the present technology described in any one of the embodiments may be combined with a part or all of the present technology described in any of the other embodiments. In addition, a part or all of any aspect of the present technology may be combined with other technologies not described above and practiced in this form.

Note that the present technology may also have the following configurations.

(1)
An image processing apparatus including:
a coding unit that performs simple coding at a fixed compression rate for multispectral image data including components in four or more wavelength bands.

(2)
The image processing apparatus according to (1), further including:
a transmission unit that transmits coded data generated by simple coding performed for the multispectral image data by the coding unit.

(3)
The image processing apparatus according to (1) or (2), further including:
a storage unit that stores the coded data generated by the simple coding performed for the multispectral image data by the coding unit.

(4)
The image processing apparatus according to any one of (1) to (3), further including:
an imaging unit that images an object and generates the multispectral image data, in which
the coding unit performs simple coding for the multispectral image data generated by the imaging unit.

(5)
The image processing apparatus according to (4), wherein
the imaging unit includes a pixel array where plural pixel patterns are arranged, each of the pixel patterns including five or more pixels, the pixels being arranged under a predetermined rule and photoelectrically converting light in wavelength bands different from each other, and
the coding unit performs simple coding for the multispectral image data generated by the imaging unit, by using a system that codes different image data generated by a different imaging unit including a different pixel array where plural different pixel patterns each different from the pixel patterns of the imaging unit in pixel arrangement and number of constituent pixels are arranged, with use of a difference in pixel data between a pair of pixels belonging to the different pixel patterns different from each other and included in an identical wavelength band.

(6)
The image processing apparatus according to (5), wherein
each of the pixel patterns of the imaging unit includes 16 pixels that photoelectrically convert light in wavelength bands different from each other and are arranged such that pixels photoelectrically converting light in adjoining wavelength bands are arranged two pixels away from each other, and
the coding unit performs simple coding for the multispectral image data generated by the imaging unit, with use of a difference in pixel data between a pair of pixels arranged two pixels away from each other.

(7)
The image processing apparatus according to any one of (4) to (6), wherein
the imaging unit includes a pixel array where plural pixel patterns are arranged, each of the pixel patterns including five or more pixels, the pixels being arranged under a predetermined rule and photoelectrically converting light in wavelength bands different from each other, and
the coding unit performs simple coding for the multispectral image data generated by the imaging unit, with use of a difference in pixel data between a pair of pixels belonging to the pixel patterns different from each other and included in an identical wavelength band.

(8)
The image processing apparatus according to any one of (4) to (7), wherein
the imaging unit includes a pixel array where plural pixel patterns are arranged, each of the pixel patterns including five or more pixels, the pixels being arranged under a predetermined rule and photoelectrically converting light in wavelength bands different from each other, and
the coding unit performs simple coding for the multispectral image data generated by the imaging unit, with use of differences in pixel data between plural pairs of pixels arranged at relative positions different from each other.

(9)
The image processing apparatus according to (8), wherein
the coding unit performs simple coding for the multispectral image data generated by the imaging unit, with use of a difference in pixel data between a pair of pixels belonging to the pixel patterns different from each other and included in an identical wavelength band and a difference in pixel data between a pair of pixels located adjacent to each other.

(10)
An image processing method including:
simple coding at a fixed compression rate for multispectral image data including components in four or more wavelength bands.

(11)
An image processing apparatus including:
a decoding unit that performs simple decoding for coded data generated by simple coding at a fixed compression rate for multispectral image data including components in four or more wavelength bands.

(12)
The image processing apparatus according to (11), further including:
a reception unit that receives the coded data, wherein the decoding unit performs simple decoding for the coded data received by the reception unit.

(13)
The image processing apparatus according to (11) or (12), further including:
a storage unit that stores the coded data, wherein the decoding unit performs simple decoding for the coded data read from the storage unit.

(14)
The image processing apparatus according to any one of (11) to (13), further including:
an imaging unit that images an object and generates the multispectral image data; and
a coding unit that performs simple coding at a fixed compression rate for the multispectral image data generated by the imaging unit, to generate the coded data, wherein
the decoding unit performs simple decoding for the coded data generated by the coding unit.

(15)
The image processing apparatus according to (14), wherein
the imaging unit includes a pixel array where plural pixel patterns are arranged, each of the pixel patterns including five or more pixels, the pixels being arranged under a predetermined rule and photoelectrically converting light in wavelength bands different from each other,
the coding unit performs simple coding for the multispectral image data generated by the imaging unit, by using a system that codes different image data generated by a different imaging unit including a different pixel array where plural different pixel patterns each different from the pixel patterns of the imaging unit in pixel arrangement and number of constituent pixels are arranged, with use of a difference in pixel data between a pair of pixels belonging to the different pixel patterns different from each other and included in an identical wavelength band, and
the decoding unit performs simple decoding for the coded data generated by the coding unit, by using a system that decodes coded data of the different image data with use of a difference in pixel data between a pair of pixels belonging to pixel patterns different from each other and included in an identical wavelength band.

(16)
The image processing apparatus according to (15), wherein
each of the pixel patterns of the imaging unit includes 16 pixels that photoelectrically convert light in wavelength bands different from each other and are arranged such that pixels photoelectrically converting light in adjoining wavelength bands are arranged two pixels away from each other,
the coding unit performs simple coding for the multispectral image data generated by the imaging unit, with use of a difference in pixel data between a pair of pixels arranged two pixels away from each other, and
the decoding unit performs simple decoding for the coded data generated by the coding unit, with use of a difference in pixel data between a pair of pixels arranged two pixels away from each other.

(17)
The image processing apparatus according to any one of (14) to (16), wherein
the imaging unit includes a pixel array where plural pixel patterns are arranged, each of the pixel patterns including five or more pixels, the pixels being arranged under a predetermined rule and photoelectrically converting light in wavelength bands different from each other,
the coding unit performs simple coding for the multispectral image data generated by the imaging unit, with use of a difference in pixel data between a pair of pixels belonging to the pixel patterns different from each other and included in an identical wavelength band, and
the decoding unit performs simple decoding for the coded data generated by the coding unit, with use of a difference in pixel data between a pair of pixels belonging to the pixel patterns different from each other and included in an identical wavelength band.

(18)
The image processing apparatus according to any one of (14) to (17), wherein
the imaging unit includes a pixel array where plural pixel patterns are arranged, each of the pixel patterns including five or more pixels, the pixels being arranged under a predetermined rule and photoelectrically converting light in wavelength bands different from each other,
the coding unit performs simple coding for the multispectral image data generated by the imaging unit, with use of differences in pixel data between plural pairs of pixels arranged at relative positions different from each other, and
the decoding unit performs simple decoding for the coded data generated by the coding unit, with use of differences in pixel data between plural pairs of pixels arranged at relative positions different from each other.

(19)
The image processing apparatus according to (18), wherein
the coding unit performs simple coding for the multispectral image data generated by the imaging unit, with use of a difference in pixel data between a pair of pixels belonging to the pixel patterns different from each other and included in an identical wavelength band and a difference in pixel data between a pair of pixels adjacent to each other, and
the decoding unit performs simple decoding for the coded data generated by the coding unit, with use of a difference in pixel data between a pair of pixels belonging to the pixel patterns different from each other and included in an identical wavelength band and a difference in pixel data between a pair of pixels adjacent to each other.

(20)
An image processing method including:
simple decoding for coded data generated by simple coding at a fixed compression rate for multispectral image data including components in four or more wavelength bands.

REFERENCE SIGNS LIST

100 Imaging apparatus, 101 Imaging element, 102 Signal processing unit, 103 Bus, 111 and 112 Semiconductor substrate, 121 Multispectral light reception unit, 122 ADC, 131 Preprocessing unit, 132 Coding unit, 133 Transmission unit, 141 Reception unit, 142 Decoding unit, 143 Image processing unit, 151 DPCM processing unit, 152 Golomb coding unit, 153 Compression rate adjustment unit, 161 One-dimensional DCT processing unit, 162 Compression rate adjustment unit, 171 Compression rate inverse adjustment unit, 172 Golomb decoding unit, 173 Inverse DPCM processing unit, 181 Compression rate inverse adjustment unit, 182 One-dimensional inverse DCT processing unit, 211 Semiconductor substrate, 221 DRAM, 231 Coding unit, 232 Decoding unit, 241 Coding unit, 242 DRAM, 243 Decoding unit, 351 Multispectral imaging element, 352 RGB imaging element, 361 and 362 Semiconductor substrate, 371 RGB light reception unit, 372 ADC, 381 Preprocessing unit, 382 Coding unit, 383 Transmission unit

The invention claimed is:

1. An image processing apparatus, comprising:
a pixel array configured to image an object and generate multispectral image data, wherein
the pixel array includes plural pixel patterns,
each of the plural pixel patterns including five or more pixels, and
the five or more pixels are arranged under a predetermined rule and photoelectrically converting light in wavelength bands different from each other; and
a Central Processing Unit (CPU) configured to perform simple coding at a fixed compression rate for the multispectral image data including components in four or more wavelength bands, wherein
the simple coding for the multispectral image data is performed by using a system that codes different image data generated by a different pixel array where plural different pixel patterns each different from the plural pixel patterns of the pixel array in pixel arrangement and number of constituent pixels are arranged, with use of a difference in pixel data between a pair of pixels belonging to the different pixel patterns different from each other and included in an identical wavelength band.

2. The image processing apparatus according to claim 1, further comprising:
a transmission unit configured to transmit coded data generated by the simple coding performed for the multispectral image data by the CPU.

3. The image processing apparatus according to claim 1, further comprising:
a storage unit configured to store coded data generated by the simple coding performed for the multispectral image data by the CPU.

4. The image processing apparatus according to claim 1, wherein
each of the pixel patterns of the pixel array includes 16 pixels that photoelectrically convert light in the wavelength bands different from each other and are arranged such that pixels, of the five or more pixels, photoelectrically converting light in adjoining wavelength bands are arranged two pixels away from each other, and
the CPU is further configured to perform the simple coding for the multispectral image data generated by the pixel array, with use of a difference in pixel data between a pair of pixels arranged two pixels away from each other.

5. An image processing method, comprising:
imaging, by a pixel array, an object and generating multispectral image data, wherein
the pixel array includes plural pixel patterns,
each of the plural pixel patterns including five or more pixels, and
the five or more pixels are arranged under a predetermined rule and photoelectrically converting light in wavelength bands different from each other; and
simple coding, by a Central Processing Unit (CPU), at a fixed compression rate for the multispectral image data including components in four or more wavelength bands, wherein
the simple coding for the multispectral image data is performed by using a system that codes different image data generated by a different pixel array where plural different pixel patterns each different from the plural pixel patterns of the pixel array in pixel arrangement and number of constituent pixels are arranged, with use of a difference in pixel data between a pair of pixels belonging to the different pixel patterns different from each other and included in an identical wavelength band.

6. An image processing apparatus, comprising:
a pixel array configured to image an object and generate multispectral image data, wherein
the pixel array includes plural pixel patterns,
each of the plural pixel patterns including five or more pixels, and
the five or more pixels are arranged under a predetermined rule and photoelectrically converting light in wavelength bands different from each other; and
a Central Processing Unit (CPU) configured to:
perform simple coding at a fixed compression rate for the multispectral image data generated by the pixel array, to generate coded data, and
perform simple decoding for the coded data generated by the simple coding at the fixed compression rate for multispectral image data including components in four or more wavelength bands, wherein
the simple coding for the multispectral image data is performed by using a system that codes different image data generated by a different pixel array where plural different pixel patterns each different from the plural pixel patterns of the pixel array in pixel arrangement and number of constituent pixels are arranged, with use of a difference in pixel data between a pair of pixels belonging to the different pixel patterns different from each other and included in an identical wavelength band, and
the simple decoding for the coded data is performed by using a system that decodes coded data of the different image data with use of the difference in pixel data between the pair of pixels belonging to the different pixel patterns different from each other and included in the identical wavelength band.

7. The image processing apparatus according to claim 6, further comprising:
a reception unit configured to receive the coded data, wherein
the CPU is further configured to perform the simple decoding for the coded data received by the reception unit.

8. The image processing apparatus according to claim 6, further comprising:
a storage unit configured to store the coded data, wherein
the CPU is further configured to perform the simple decoding for the coded data read from the storage unit.

9. The image processing apparatus according to claim 6, wherein
- each of the pixel patterns of the pixel array includes 16 pixels that photoelectrically convert light in the wavelength bands different from each other and are arranged such that pixels, of the five or more pixels, photoelectrically converting light in adjoining wavelength bands are arranged two pixels away from each other,
- the CPU is further configured to perform the simple coding for the multispectral image data generated by the pixel array, with use of a difference in pixel data between a pair of pixels arranged two pixels away from each other, and
- perform the simple decoding for the coded data, with use of the difference in pixel data between the pair of pixels arranged two pixels away from each other.

10. An image processing method, comprising:
- imaging, by a pixel array, an object and generate multispectral image data, wherein
  - the pixel array includes plural pixel patterns,
  - each of the plural pixel patterns including five or more pixels, and
  - the five or more pixels are arranged under a predetermined rule and photoelectrically converting light in wavelength bands different from each other; and
- simple coding, by a Central Processing Unit (CPU), at a fixed compression rate for the multispectral image data generated by the pixel array, to generate coded data, and
- simple decoding, by the CPU, for the coded data generated by the simple coding at the fixed compression rate for multispectral image data including components in four or more wavelength bands, wherein
  - the simple coding for the multispectral image data is performed by using a system that codes different image data generated by a different pixel array where plural different pixel patterns each different from the plural pixel patterns of the pixel array in pixel arrangement and number of constituent pixels are arranged, with use of a difference in pixel data between a pair of pixels belonging to the different pixel patterns different from each other and included in an identical wavelength band, and
  - the simple decoding for the coded data is performed by using a system that decodes coded data of the different image data with use of the difference in pixel data between the pair of pixels belonging to the different pixel patterns different from each other and included in the identical wavelength band.

* * * * *